(12) United States Patent
Wong et al.

(10) Patent No.: US 10,901,243 B2
(45) Date of Patent: Jan. 26, 2021

(54) GRAPHENE-BASED SEMICONDUCTOR CHIP FOR TUNABLE THZ PLASMON GENERATION

(71) Applicant: The Regents of the University of California, Oakland, CA (US)

(72) Inventors: Chee Wei Wong, Los Angeles, CA (US); Baicheng Yao, Los Angeles, CA (US); Yuan Liu, Los Angeles, CA (US); Xiangfeng Duan, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 77 days.

(21) Appl. No.: 16/308,383

(22) PCT Filed: Jun. 9, 2017

(86) PCT No.: PCT/US2017/036765
§ 371 (c)(1),
(2) Date: Dec. 7, 2018

(87) PCT Pub. No.: WO2017/214512
PCT Pub. Date: Dec. 14, 2017

(65) Prior Publication Data
US 2019/0137795 A1     May 9, 2019

Related U.S. Application Data

(60) Provisional application No. 62/347,823, filed on Jun. 9, 2016.

(51) Int. Cl.
*G02F 1/025* (2006.01)
*G02B 6/122* (2006.01)
(Continued)

(52) U.S. Cl.
CPC ............. *G02F 1/025* (2013.01); *G02B 6/122* (2013.01); *G02B 6/1226* (2013.01); *G02B 6/42* (2013.01); *G02F 1/011* (2013.01)

(58) Field of Classification Search
None
See application file for complete search history.

(56) References Cited

U.S. PATENT DOCUMENTS 8,554,022 B1 * 10/2013 Hochberg ............. H01L 31/028
                                                              385/1
8,816,787 B2 * 8/2014 Jenkins .................... H03B 7/06
                                                          331/115

(Continued)

FOREIGN PATENT DOCUMENTS

WO    2016046349 A1    3/2016
WO    2017214512 A1    12/2017

OTHER PUBLICATIONS

International Preliminary Report on Patentability for International Application PCT/US2017/036765, Report issued Dec. 11, 2018, dated Dec. 20, 2018, 7 Pgs.

(Continued)

*Primary Examiner* — Chad H Smith
(74) *Attorney, Agent, or Firm* — KPPB LLP

(57) ABSTRACT

Methods and apparatus for providing all-optically generated, on-chip propagated and high-efficiency tunable plasmons are described. The plasmon generating apparatus includes a graphene based silicon nitride waveguide (GSiNW) utilizing 'C+L' band light sources and detectors that take advantage of the surface 2nd nonlinearity on graphene. The optical generation is accomplished via one or more optical communication lasers through the difference-frequency generation process. The THz frequency and intensity is tunable via an external gate voltage. Using such a device the optical to THz conversion may be made at least an order of magnitude (Continued)

11 Claims, 39 Drawing Sheets

(51) Int. Cl.
  *G02B 6/42* (2006.01)
  *G02F 1/01* (2006.01)

(56) References Cited

U.S. PATENT DOCUMENTS

| | | | |
|---|---|---|---|
| 9,726,703 B2* | 8/2017 | Knap | G01J 3/42 |
| 2014/0056551 A1* | 2/2014 | Liu | G02F 1/025 385/2 |
| 2014/0319385 A1* | 10/2014 | Mikhailov | H01L 29/4238 250/493.1 |
| 2014/0346357 A1* | 11/2014 | Jarrahi | H01L 31/0224 250/338.4 |
| 2016/0064110 A1 | 3/2016 | Schmadel et al. | |
| 2018/0058931 A1* | 3/2018 | Jarrahi | H01L 31/09 |

OTHER PUBLICATIONS

International Search Report and Written Opinion for International Application No. PCT/US2017/036765, Search completed Aug. 29, 2017, dated Oct. 16, 2017, 18 Pgs.
"Refractive Index of Si3N4, Silicon Nitride, SiN, SiON", Filmetrics, Jun. 3, 2016, https://www.filmetrics.com/refractive-index-database/Si3N4/Silicon-Nitride-SiN-SiON.
Ansell et al., "Hybrid graphene plasmonic waveguide modulators", Nature Communications, Nov. 10, 2015, vol. 6, 8846, doi: 10.1038/ncomms9846.
Bonaccorso et al., "Graphene photonics and optoelectronics", Nature Photonics, vol. 4, Sep. 2010, pp. 611-622.
Brar et al., "Electronic modulation of infrared radiation in graphene plasmonic resonators", Nature Communications, May 7, 2015, vol. 6, No. 7032, 7 pgs, doi: 10.1038/ncomms8032.
De Oliveira et al., "Graphene based waveguide polarizers: in-depth physical analysis and relevant parameters", Scientific Reports, Nov. 19, 2015, vol. 5, 16949, doi: 10.1038/srep16949.
Freitag et al., "Photocurrent in graphene harnessed by tunable intrinsic plasmons", Nature Communications, vol. 4, No. 1951, Jun. 3, 2013, pp. 1-8.
Geim et al, "The rise of graphene", Nature Materials, Mar. 2007, vol. 6, pp. 183-191.
Grigorenko et al., "Graphene plasmonics", Nature Photonics, vol. 6, Nov. 5, 2012, pp. 749-758.
Gu et al., "Regenerative oscillation and four-wave mixing in graphene optoelectronics", Nature Photonics Jul. 15, 2012, vol. 6, pp. 554-559.
Gu et al., "Photonic and plasmonic guided modes in graphene-silicon photonic crystals", ACS Photonics, Oct. 5, 2015, vol. 2, No. 11, pp. 1552-1558, doi: 10.1021/acsphotonics.5b00209.
Hanson, "Dyadic Green's Functions and Guided Surface Waves for a Surface Conductivity Model of Graphene", Journal of Applied Physics, 2008, vol. 103, 064302.
Hendry et al., "Coherent Nonlinear Optical Response of Graphene", Physical Review Letters, Aug. 27, 2010, vol. 105, pp. 097401-1-097401-4.
Liu et al., "Plasmon resonance enhanced multicolour photodetection by graphene", Nature Communications, Dec. 6, 2011, vol. 2, No. 579, pp. 1-7.
Manzoni et al., "Second-order quantum nonlinear optical processes in single graphene nanostructures and arrays", New Journal of Physics, Aug. 17, 2015, vol. 17, 083031, doi: 10.1088/1367-2630/17/8/083031.
Ryzhii et al., "Terahertz photomixing using plasma resonances in double-graphene layer structures", Journal of Applied Physics 113, published online May 7, 2013.
Sensale-Rodriguez, "Graphene-insulator-graphene active plasmonic terahertz devices", Applied Physics Letters 103, Sep. 17, 2013.
Sun et al., "Direct generation of graphene plasmonic polaritons at THz frequencies via four wave mixing in the hybrid graphene sheets waveguides", Optics Express, Nov. 3, 2014, vol. 22, No. 23, pp. 27880-27891, doi: 10.1364/OE.22.027880.
Vakil et al, "Transformation optics using graphene", Science, Jun. 10, 2011, vol. 332, Issue 6035, pp. 1291-1294.
Wang et al., "High-responsivity graphene/siliconheterostructure waveguide photodetectors", Nature Photonics, vol. 7, Sep. 15, 2013, pp. 888-891.
Wunsch et al., "Dynamical polarization of graphene at finite doping", New Journal of Physics, Dec. 13, 2006, vol. 8, pp. 318-326, doi: 10.1088/1367-2630/8/12/318.
Yao et al., "Graphene based widely-tunable and singly-polarized pulse generation with random fiber lasers", Scientific Reports, Dec. 21, 2015, vol. 5, No. 18526, pp. 1-8.
Abajo, "Graphene nanophotonics", Science, Feb. 22, 2013, vol. 339, pp. 917-918, doi: 10.1126/science.1231119.
Abajo, "Graphene plasmonics: challenges and opportunities", ACS Photonics, Feb. 11, 2014, vol. 1, No. 3, pp. 135-152, doi: 10.1021/ph400147y.
Bao et al., "Broadband graphene polarizer", Nature Photonics, Jul. 2011, vol. 5, pp. 411-415, published online May 29, 2011, doi: 10.1038/nphoton.2011.102.
Barnes et al., "Surface plasmon subwavelength optics", Nature, Aug. 14, 2003, vol. 424, pp. 824-830, doi: 10.1038/nature01937.
Bostwick et al., "Observation of plasmarons in quasi-restanding doped graphene", Science, May 21, 2010, vol. 328, No. 5981, pp. 999-1002, doi: 10.1126/science.1186489.
Brar et al., "Highly confined tunable mid-infrared plasmonics in graphene nanoresonators", Nano Letters, Apr. 26, 2013, vol. 13, No. 6, pp. 2541-2547, doi: 10.1021/nl400601c.
Chakraborty et al., "Gain modulation by graphene plasmons in aperiodic lattice lasers", Science, Jan. 15, 2016, vol. 351, Issue 6270, pp. 246-248, doi: 10.1126/science.aad2930.
Chen et al., "Graphene-based plasmonic platform for reconfigurable terahertz nanodevices", ACS Photonics, Jul. 7, 2014, vol. 1, No. 8, pp. 647-654, doi: 10.1021/ph500046r.
Chen et al., "Optical coupling method utilizing a lensed fiber integrated with a long-period fiber grating", Applied Physics, Sep. 1, 2000, vol. 39, No. 25, pp. 4490-4500.
Chen et al., "Optical nano-imaging of gate-tunable graphene plasmons", Nature, Jul. 5, 2012, vol. 487, pp. 77-81, doi: 10.1038/nature11254.
Constant et al., "All-optical generation of surface plasmons in graphene", Nature Physics, Feb. 2016, vol. 12, pp. 124-127, published online Nov. 16, 2015, doi: 10.1038/nphys3545.
Cox et al., "Plasmon-enhanced nonlinear wave mixing in nanostructured graphene", ACS Photonics, Jan. 19, 2015, vol. 2, No. 2, pp. 306-312, doi: 10.1021/ph500424a.
Das et al., "Monitoring dopants by Raman scattering in an electrochemically top-gated graphene transistor", Nature Nanotechnology, Apr. 2008, vol. 3, pp. 210-215, published online Mar. 30, 2008, doi: 10.1038/nnano.2008.67.
Fei et al., "Gate-tuning of graphene plasmons revealed by infrared nano-imaging", Nature, Jun. 20, 2012, vol. 487, pp. 82-85, doi: 10.1038/nature11253.
Fei et al., "Infrared nanoscopy of Dirac plasmons at the graphene SiO2 interface", Nano Letters, Oct. 5, 2011, vol. 11, pp. 4701-4705, doi: 10.1021/nl202362d.
Gullans et al., "Single-photon nonlinear optics with graphene plasmons", Physical Review Letters, Dec. 11, 2013, vol. 111, 247401, pp. 1-6, doi: 10.1103/PhysRevLett.111.247401.
Holmes et al., "Measurements of thermal transport in low stress silicon nitride films", Applied Physics Letters, May 4, 1998, vol. 72, No. 18, pp. 2250-2252, doi: 10.1063/1.121269.
Hwang et al., "Plasmon modes of spatially separated double-layer graphene", Physical Review B, Nov. 6, 2009, vol. 80, pp. 205405-1-205405-5.

(56) References Cited

OTHER PUBLICATIONS

Hwang et al., "Plasmon-phonon coupling in graphene", Physical Review B, 2010, vol. 82, pp. 195406-1-195406-5.

Jablan et al., "Plasmonics in graphene at infrared frequencies", Physical Review B, Dec. 23, 2009, vol. 80, No. 24, pp. 245435-1-245435-7.

Ju et al., "Graphene plasmonics for tunable terahertz metamaterials", Nature Nanotechnology, Oct. 2011, vol. 6, pp. 630-634, published online Sep. 4, 2011, doi: 10.1038/nnano.2011.146.

Koppens et al., "Graphene Plasmonics: A platform for strong light-matter interactions", Nano Letters, Jul. 18, 2011, vol. 11, pp. 3370-3377, doi: 10.1021/nl201771h.

Li et al., "Graphene plasmon enhanced vibrational sensing of surface-adsorbed layers", Nano Letters, Feb. 14, 2014, vol. 14, No. 3, pp. 1573-1577, doi: 10.1021/nl404824w.

Luxmoore et al., "Strong coupling in the far-infrared between graphene plasmons and the surface optical phonons of silicon dioxide", ACS Photonics, Sep. 7, 2014, vol. 1, No. 11, pp. 1151-1155, doi: 10.1021/ph500233s.

Mikhailov, "Theory of the giant plasmon-enhanced second-harmonic generation in graphene and semiconductor two-dimensional electron systems", Physical Review B, Jul. 18, 2011, vol. 84, No. 4, 045432, 5 pgs., arXiv:1102.5216, Feb. 26, 2011.

Mikhailov et al., "New Electromagnetic Mode in Graphene", Physical Review Letters, Jul. 6, 2007, vol. 99, 016803, pp. 016803-1-016803-4.

Nair et al., "Fine structure constant defines visual transparency of graphene", Science, Jun. 6, 2008, vol. 320, No. 5881, pp. 1308, doi: 10.1126/science.1156965.

Ni et al., "Ultrafast optical switching of infrared plasmon polaritons in high-mobility graphene", Nature Photonics, Apr. 2016, vol. 10, pp. 244-247, published online, Mar. 28, 2016, doi: 10.1038/nphoton.2016.45.

Nikitin et al., "Real-space mapping of tailored sheet and edge plasmons in graphene nanoresonators", Nature Photonics, Apr. 2016, vol. 10, pp. 239-243, published online Mar. 21, 2016, doi: 10.1038/nphoton.2016.44.

Novoselov et al., "A roadmap for graphene", Nature, Oct. 11, 2012, vol. 490, pp. 192-200, doi: 10.1038/nature11458.

Ozbay, "Plasmonics: merging photonics and electronics at nanoscale dimensions science", Science, Jan. 13, 2006, vol. 311, No. 5758, pp. 189-193, doi: 10.1126/science.1114849.

Palomba et al., "Nonlinear excitation of surface plasmon polaritons by four-wave mixing", Physical Review Letters, Aug. 1, 2008, vol. 101, No. 5, 056802, pp. 056802-1-056802-4, doi: 10.1103/PhysRevLett.101.056802.

Phare et al., "Graphene electro-optic modulator with 30 GHz bandwidth", Nature Photonics, Aug. 2015, vol. 9, pp. 511-514, published online Jul. 13, 2015, doi: 10.1038/nphoton.2015.122.

Pietro et al., "Observation of Dirac plasmons in a topological insulator", Nature Nanotechnology, Aug. 2013, vol. 8, pp. 556-560, published online Jul. 21, 2013, doi: 10.1038/nnano.2013.134.

Profumo et al., "Double-layer graphene and topological insulator thin-film plasmons", Physical Review B, Feb. 29, 2012, vol. 85, 085443, 8 pgs., arXiv:1112.1610, Dec. 7, 2011.

Rodrigo et al., "Mid-infrared plasmonic biosensing with graphene", Science, Jul. 10, 2015, vol. 349, No. 6244, pp. 165-168, doi: 10.1126/science.aab2051.

Simkhovich et al., "Plasmon-enhanced four-wave mixing for super-resolution applications", Physical Review Letters, Feb. 7, 2014, vol. 112, 056802, pp. 056802-1-056802-5, doi: 10.1103/PhysRevLett.112.056802.

Stauber, "Plasmonics in Dirac systems: from graphene to topological insulators", Journal of Physics: Condensed Matter, Mar. 6, 2014, vol. 26, No. 12, 123201, 24 pgs., doi:10.1088/0953-8984/26/12/123201.

Sun et al., "Optical modulators with 2D layered materials", Nature Photonics, Apr. 2016, vol. 10, pp. 227-238, published online Mar. 31, 2016, doi: 10.1038/nphoton.2016.15.

Woessner et al., "Highly confined low-loss plasmons in graphene-boron nitride heterostructures", Nature Materials, Dec. 22, 2014, vol. 14, pp. 421-425, arXiv:1409.5674, Sep. 19, 2014, doi: 10.1038/nmat4169.

Yan et al., "Damping pathways of mid-infrared plasmons in graphene nanostructures", Nature Photonics, May 2013, vol. 7, pp. 394-399, published online Apr. 14, 2013, doi: 10.1038/nphoton.2013.57.

Yan et al., "Tunable infrared plasmonic devices using graphene/insulator.stacks", Nature Nanotechnology, May 2012, vol. 7, pp. 330-334, published online Apr. 22, 2012, doi: 10.1038/nnano.2012.59.

Yao et al., "Efficient Nonlinear Generation of THz Plasmons in Graphene and Topological Insulators", Physical Review Letters, Feb. 5, 2014, vol. 112, 055501, pp. 055501-1-055501-5.

Zhou et al., "Chemical vapour deposition growth of large single crystals of monolayer and bilayer graphene", Nature Communications, Jun. 27, 2013, vol. 4, No. 2096, pp. 1-8, doi: 10.1038/ncomms3096.

Zhu et al., "Silicon nitride gate dielectrics and band gap engineering in graphene layers", Nano Letters, Aug. 17, 2010, vol. 10, No. 9, pp. 3572-3576, doi: 10.1021/nl101832y.

\* cited by examiner

Step 1:

Step 2:

Step 3:

Step 6:

Step 5:

Step 4:

FIG. 19D
FIG. 19E
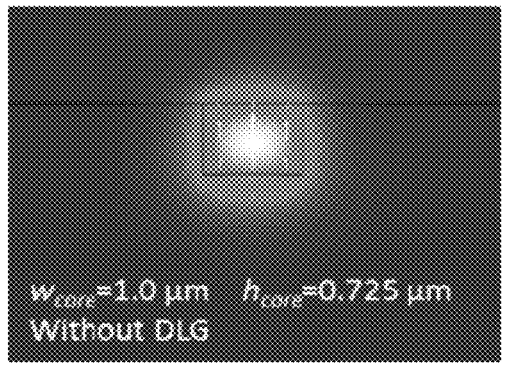
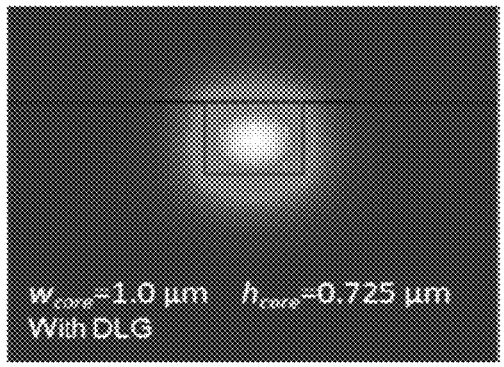
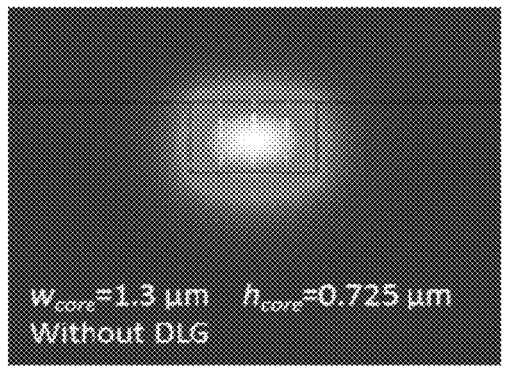
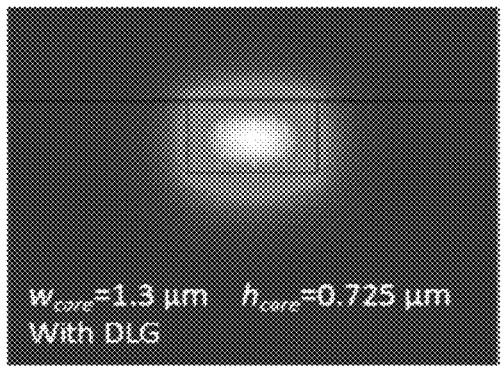
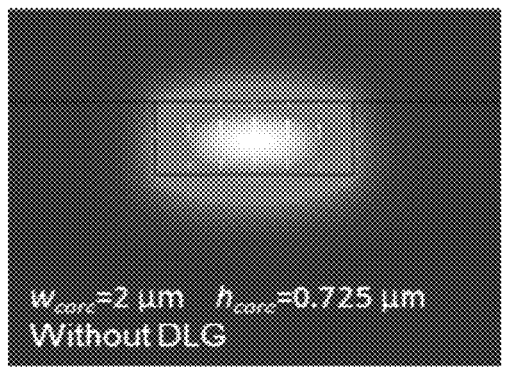
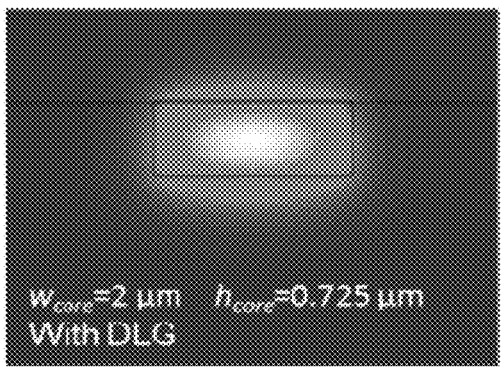

GRAPHENE-BASED SEMICONDUCTOR CHIP FOR TUNABLE THZ PLASMON GENERATION

CROSS-REFERENCE TO RELATED APPLICATIONS

This application is a national stage of PCT Patent Application No. PCT/US2017/036765, entitled "Graphene-Based Semiconductor Chip for Tunable THz Plasmon Generation" to Wong et al., filed Jun. 9, 2017, which claims priority to U.S. Patent Application No. 62/347,823, entitled "Graphene-Based Semiconductor Chip for Tunable THz Plasmon Generation" to Wong et al., filed Jun. 9, 2016, the disclosures of which are incorporated herein by reference in their entireties.

STATEMENT REGARDING FEDERALLY SPONSORED RESEARCH

This invention was made with Governmental support under Grant No. CBET-1438147 awarded by the National Science Foundation. The government has certain rights in the invention.

FIELD OF THE INVENTION

The invention is generally directed to tunable and efficient THz plasmon generation on-chip via graphene monolayers.

BACKGROUND

Graphene, a two-dimensional (2D) material with gapless band structure, has been a subject of intense scientific advances, arising from its exceptional optoelectronic properties. Among them, its surface plasmons (SPs) are some of the most scientifically attractive and technically potential, offering a compelling route to many useful photonic applications. In recent years, a variety of graphene plasmon based devices such as modulators, detectors, lasers, polarizers and sensors have been reported. (See, e.g., Brar, V., et al. Nature Commun. 6, 7032 (2014); Ansell, D., et al. Nature Commun. 6, 8846 (2015); Liu, Y., et al. Nature Comm. 2, 579 (2011); Freitag, et al. Nature Comm. 4, 1951 (2013); Wang, X., et al. Nature Photon. 7, 888-891 (2013); Chakraborty, S., et al. Science 351, 246-248 (2015); Bao, Q., et al. Nature Photon. 5, 411-414 (2011); Rodrigo, D., et al. Science 349, 165-168 (2015); and Li, Y., et al. Nano Lett. 14, 1573-1577 (2014), the disclosures of which are incorporated herein by reference.)

In contrast to conventional noble metals usually used in plasmonic devices, graphene demonstrates several unique superiorities, such as excellent electro-optic tunability, broadband large nonlinearities, crystalline stability and tight spatial confinement. (See, e.g., Barnes, W., et al. Nature 424, 824-830 (2003); Ozbay, E. Science 311, 189-193 (2006); Bostwick, A., et al. Science 328, 999-1002 (2010); Ju, L., et al. 6, 630-634 (2011); Hendry, E., et al. Phy. Rev. Lett. 105, 097401 (2010); Gu, T., et al. Nature Photon. 6, 554-559 (2012); and Nair, R., et al. Science 320, 1308-1310 (2008), the disclosure of which is incorporated herein by reference.) Due to its large dispersion, graphene plasmons are dormant in the terahertz and far-infrared domains, but with wavelengths much smaller than light of the same frequency. (See, e.g., Mikhailov, S. & Ziegler, K. Phys. Rev. Lett. 99, 016803 (2007); and Jablan, M., et al. Phys. Rev. B 80, 245435 (2009), the disclosures of which are incorporated herein by reference.) To generate and detect graphene plasmons experimentally, several specialized measurement methods have been developed, including using micro-nano scattering arrays, nano-imaging techniques, photonic crystal structures, and metal antennas. (See, e.g., Yan, H., et al. Nature Nanotech. 7, 330-334 (2012); Yan, H., et al. Nature Photon. 7, 394-399 (2013); Woessner, A., et al. Nature Mater. 14, 421-425 (2015); Nikitin, A., et al. Nature Photon. 10, 239-243 (2016); Ni, G., et al. Nature Photon. 10, 244-247 (2016); Gu, T., et al. ACS Photon. 2, 1552-1558 (2015); and Alonso-Gonzalez, P., et al. Science 334, 1369-1373 (2014), the disclosures of which are incorporated herein by reference.) However, limited by the complicated nanofabrication, sensitive free-space calibration, and lack of specific source and detectors, it is still a big challenge to achieve graphene plasmons in chip-scale integrated photonics and optoelectronics, where it is desirable to integrate all fields into planar waveguides, and avoid open optical paths.

SUMMARY OF THE INVENTION

In many embodiments the invention is directed to tunable graphene plasmon sources, methods of their operation and manufacture.

Some embodiments are directed to a plasmon source including:
  a graphene based silicon nitride waveguide;
  at least one light source in optical communication with said waveguide;
  a gate electrode in conductive communication with the waveguide;
  wherein the at least one light source is configured to emit at least a pump and a signal emission in opposite directions into the graphene based silicon nitride waveguide such that THz graphene plasmons are excited within the waveguide via enhanced difference frequency generation and emitted therefrom.

In other embodiments the THz frequency of the graphene plasmons are tunable via modulation by application of an external gate voltage through the gate electrode.

In still other embodiments the Fermi level of the gate electrode is maintained at around the Dirac point.

In yet other embodiments the apparatus further comprises a bandpass filter capable of configuring the plasmon source as a plasmon switcher.

In still yet other embodiments the waveguide includes:
  a silicon nitride bus;
  a bottom graphene layer disposed atop the bus connecting a drain and a source electrode; p1 an isolator/capacitance layer disposed atop the bottom graphene layer; and
  a top graphene layer disposed atop the isolator/capacitance layer connecting a gate electrode.

In still yet other embodiments the width of the silicon nitride bus is at least 1000 nm and the height is at least 725 nm.

In still yet other embodiments the silicon nitride is contained within an oxide material.

In still yet other embodiments the isolator/capacitance layer comprises alumina.

In still yet other embodiments the pump and signal emissions are polarized.

In still yet other embodiments the light source is a picosecond laser.

Some other embodiments are directed to methods of forming a plasmon waveguide including:

providing a chip comprising a graphene based silicon nitride waveguide deposited on a silicon substrate;

etching the chip such that a light source in optical communication with said waveguide provides creates a strong light-graphene interaction;

depositing a bottom graphene layer atop the etched ship;

depositing conductive source-drain electrode pads in connection with the bottom graphene layer;

depositing an insulator/capacitance layer atop the bottom graphene layer; and depositing a top graphene layer atop the insulator/capacitance layer.

In other embodiments the silicon nitride waveguide is disposed within a SiO2 cladding disposed on a silicon substrate.

In still other embodiments the etching comprises one of either chemical etching or plasma dry etching.

In yet other embodiments the chemical etching comprises buffer oxide etching.

In still yet other embodiments after etching, the distance between the silicon nitride and the top surface of the waveguide is less than about 20 nm.

In still yet other embodiments the bottom graphene layer is deposited by chemical vapor deposition followed by wet transfer.

In still yet other embodiments the insulator/capacitance layer is deposited by atomic layer deposition.

In still yet other embodiments the source/drain electrode pads are deposited by e-beam evaporation.

Still other embodiments are directed to methods of forming a plasmon source including:

forming a graphene based silicon nitride waveguide;

connecting the top graphene layer of the waveguide to a gate electrode; and placing at least one light source configured to emit at least a pump and a signal emission in opposite directions into the graphene based silicon nitride waveguide such that THz graphene plasmons are excited within the waveguide via enhanced difference frequency generation and emitted therefrom.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIGS. 19A to 19E provide diagrams and data of exemplary mode distributions in accordance with embodiments, where 19A provides a sectional view of the silicon nitride waveguide without graphene coverage; 19B provides a sectional view of the silicon nitride waveguide with graphene-$Al_2O_3$-graphene coverage; 19C provides an effective index dispersion of the fundamental TM mode in the silicon nitride waveguide, meshed in the f-$w_{core}$ map; 19D provides simulated electric field distributions of the fundamental TM modes in the silicon nitride waveguides, with $w_{core}$=1 µm, 1.3 µm and 2 µm; and 19E provides simulated electric field distributions of the fundamental TM modes in the graphene based silicon nitride waveguides, with $w_{core}$=1 µm, 1.3 µm and 2 µm, and where in 19E, the graphene is assumed of $E_F$=0.1 eV.

DETAILED DESCRIPTION

Turning now to the drawings and data, methods and apparatus for providing all-optically generated, on-chip propagated and high-efficiency tunable plasmons are described. In many embodiments the plasmon generating apparatus includes a graphene based silicon nitride waveguide (GSiNW) utilizing 'C+L' band light sources and detectors that take advantage of the surface 2nd nonlinearity on graphene. In various embodiments the optical generation is accomplished via one or more optical communication lasers through the difference-frequency generation process. In other embodiments the THz frequency and intensity is tunable via an external gate voltage. Using such a device the optical to THz conversion may be made at least an order of magnitude more efficient than prior THz sources, and can be used to make chip-scale room-temperature THz sources, switches, modulators and detectors based on graphene.

Graphene plasmons have depicted an exciting prospect in optics and electronics. As a plasmonic media, graphene offers distinctive electro-optic tunability, which is of great potential in further integrated photonics. By using near-field approaches, gate tunable THz plasmons have been excited and imaged on graphene based substrates. Thus, to generate, confine and control graphene plasmons on optoelectronic chips would be revolutionarily promising, but still remains elusive, as a challenge both in principle and practice. Accordingly, many embodiments are directed to method and apparatus for all-optically generated, on-chip propagated and high-efficiency tunable plasmons using graphene.

Embodiments for Plasmon Generation

Figure 1A:
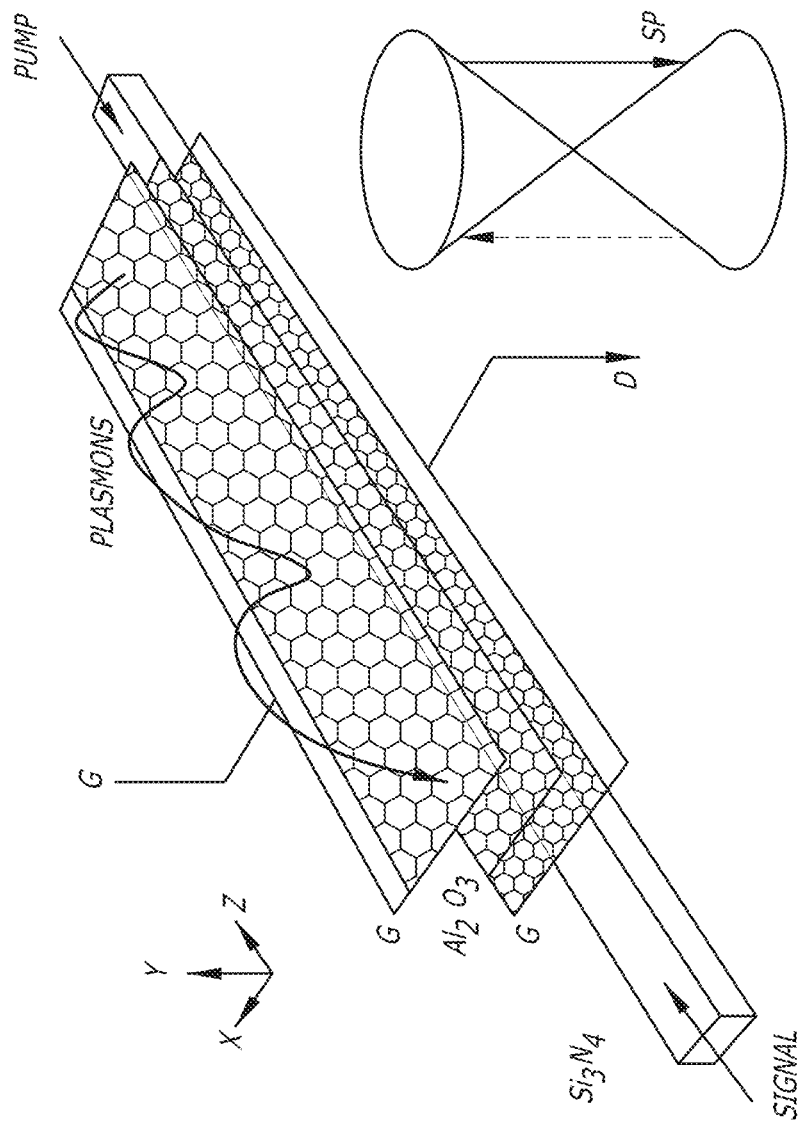
FIG. 1A provides a three-dimensional schematic illustration of a plasmon apparatus in accordance with embodiments.

FIG. 1A shows a three-dimensional schematic of a GSiNW structure in accordance with embodiments. From bottom to top, the GSiNW, in accordance with embodiments, may be comprised of a silicon nitride bus, a bottom layer graphene connecting the Drain & Source, a layer of alumina working as isolator/capacitance, and another layer of top graphene connecting the Gate. In this architecture, the graphene layers are used as active electrodes, but also 2nd order nonlinearity providers, and plasmonic waveguides. In various embodiments, the GSiNW structure comprises a graphene-$Al_2O_3$-graphene hybrid deposited above a silicon nitride core. In such embodiments, DFG plasmons could be electrically modulated via gating, for example, as shown in the inset where a photon of the pump transfers to a signal photon and a plasmon.

Figure 1B:
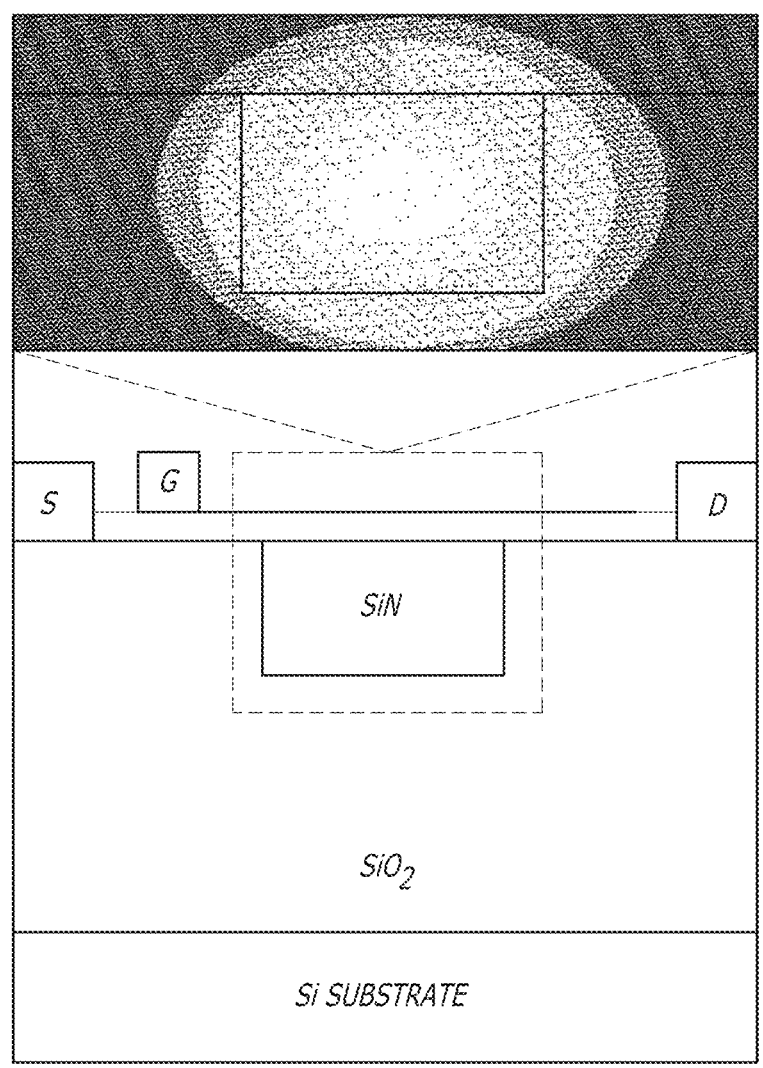
FIG. 1B provides a sectional view of a plasmon apparatus in accordance with embodiments.

A sectional schematic of the GSiNW in accordance with embodiments is shown in FIG. 1B. In such embodiments, by applying an external gate electrical field (VG), the Fermi-level (EF) of the two graphene layers may be modulated electrically. For example, in many embodiments of the GSiNW, the bottom and top layer graphene has the same EF~50 meV when VG=0. Related to those bottom gating schemes it is possible to tune the Fermi-level of the graphene layers in the GSiNW widely by using a small voltage (±4 V). Moreover, unlike graphene based TE polarizers, embodiments of the graphene-$Al_2O_3$-graphene-$Si_3N_4$ structure supports TM mode, which allows for plasmonic generation. Finally, by using the finite element method, it is also possible to provide a simulated electric field distribution of the fundamental mode in the GSiNW.

In some embodiments, a silicon nitride core with characteristic width (e.g. 1000 nm) and height (e.g., ~725 nm) is buried in thick oxide (e.g., ~2.73 μm) to ensure optical-loss acceptable. Such a silicon nitride waveguide may be etched from a commercial nitride chip, by using buffer oxide etching (BOE). In such embodiments, the graphene-$Al_2O_3$-graphene hybrid may be assembled on the nitride core adjacently, enabling effective light-graphene interaction along the waveguide. Although many suitable designs and configurations may be used, in various embodiments the $SiO_2$ may have a thickness of ~3.7 μm, the $Si_3N_4$ core a width of ~1 μm and a height of ~725 nm, a graphene thickness of ~0.4 nm, and an $Al_2O_3$ thickness of ~30 nm. In such embodiments, a simulated electric field distribution of the fundamental TM mode in the GSiNW (Fermi level of the top/bottom graphene) is assumed to be ~0.05 eV, with an optical frequency fixed at ~193 THz.

Figure 1C:
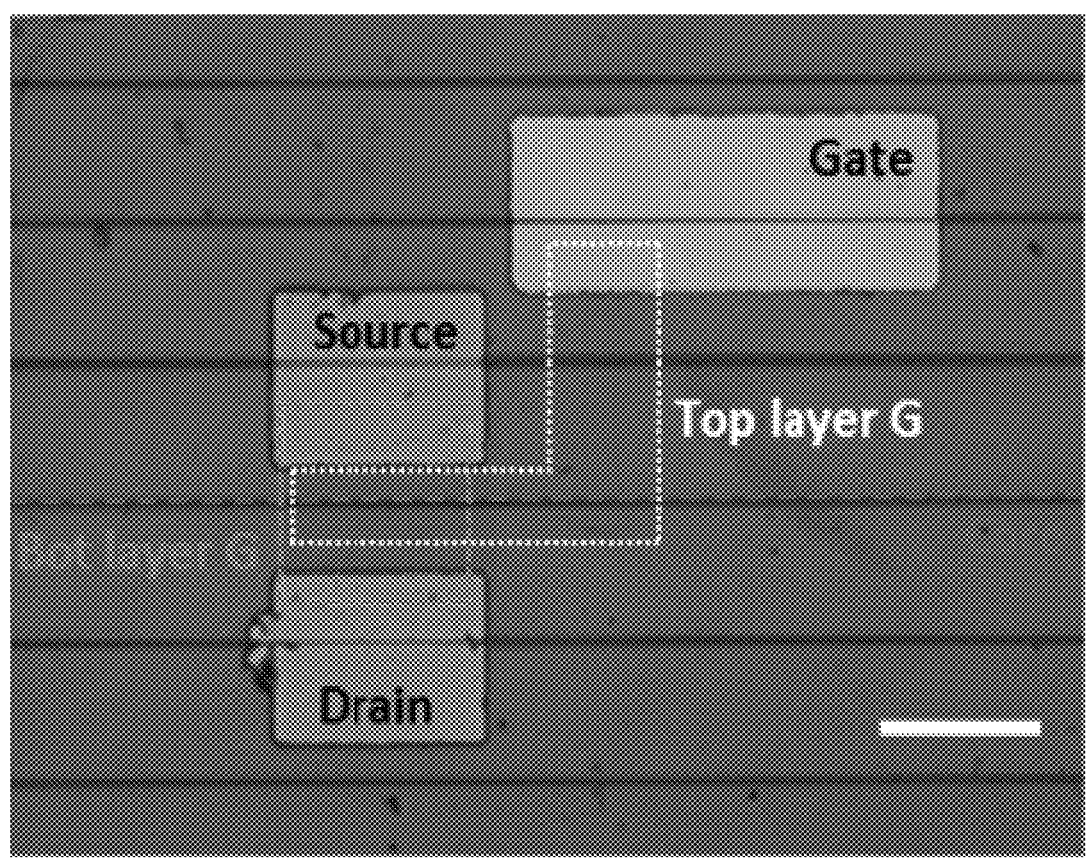
FIG. 1C provides a top-view optical microscope image of a plasmon apparatus in accordance with embodiments.

A top-view optical microscope image of a GSiNW device in accordance with embodiments is provided in FIG. 1C (note the bar is 50 μm). As shown, the selected waveguide is marked by a dashed line, the bottom layer graphene is marked by a white dashed box, and the top layer graphene is marked by a dark dashed box. In various embodiments, the effective length of the graphene-$Al_2O_3$-graphene covered on a waveguide may be ~80 μm. Although the figure illustrates possible configurations of electrodes, it should be understood that many other configurations may be used, as will be understood by those skilled in the art.

Figure 2:
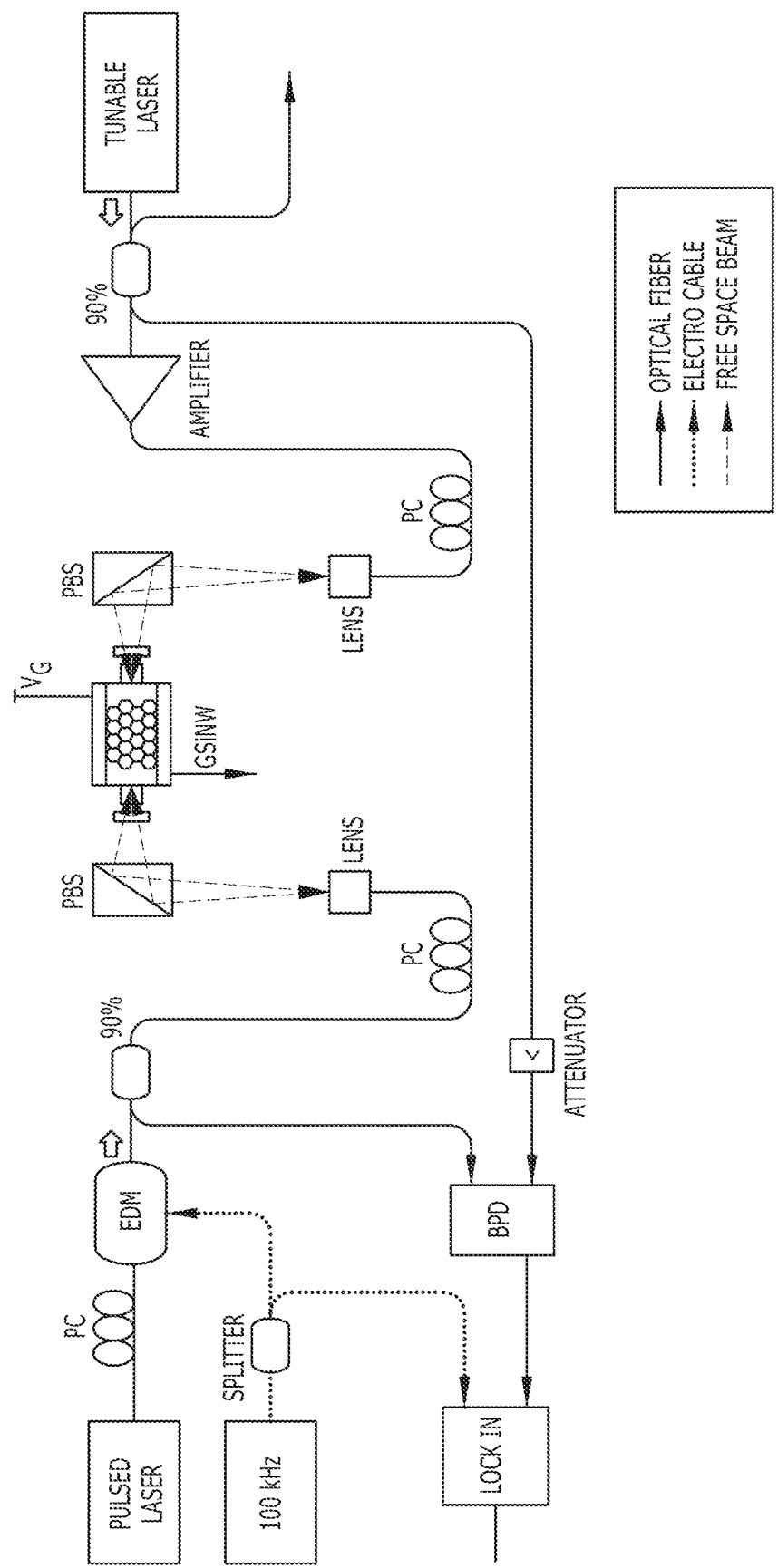
FIG. 2 provides a diagram of a plasmon apparatus incorporated with a high power picosecond laser in accordance with embodiments.

In many embodiments, during operation, the pump and signal may be launched in the GSiNW oppositely (as shown in FIG. 2). Once phase matching conditions have been satisfied, graphene plasmons may be excited via enhanced different frequency generation (DFG), as the inset of FIG. 1A illustrates. In this approach, the newly generated plasmon transmits in the same direction as the pump, with a THz frequency $f_{SP}$=fp-fs, but a very high momentum $k_{SP}$=kp+ks. Here fp, fs, kp, ks illustrate the frequency and momentum of the pump and the signal respectively.

FIG. 2 demonstrates the design of one such plasmon generator in accordance with certain arrangements. (Also, see the Exemplary Embodiments for additional information.) In embodiments of the arrangement provided in FIG. 2, the pump is launched into the GSiNW from the left side, while the signal is amplified then launched into the GSiNW from the right side. All the launched beams are TM polarized. As mentioned in FIG. 1A, once the DFG occurs, energy from a pump photon divides into a signal photon and a plasmon. This plasmonic generation process can be observed by monitoring the nonlinear enhancement of the signal at the left side. However, the conversion efficiency of graphene based DFG is only $10^{-5}$~$10^{-6}$, and it can be difficult to detect the weak enhancement of the signal induced by the DFG process directly. To extract and analyze information of the plasmons efficiently, several specific techniques may be applied, such as pump pre-modulation, balanced photon detection, and lock-in filtering/amplification. In many embodiments, the extracted signal from the lock-in amplifier is purely enhanced by the 100 kHz modulated pump via DFG, it directly reflects information of the generated plasmons.

Although many configurations of the plasmon generator shown in FIG. 2 may be provided in accordance with embodiments a high power picosecond laser (fp=195.8 THz, pulse duration 2.2 ps, repetition of 39 MHz, maximum peak power 500 W, PolarOnyx, USA) may be applied as the pump, and which may be sinusoidally modulated by a function generator (HP 3312A, USA), a broadband tunable CW laser (Tunable range 182.9 THz~202.7 THz, average power 10 mW, Santec 710, JPN) used as the signal, which is amplified by a band EDFA (1570 nm~1610 nm), two optical paths and balanced in an auto-balanced photodetector (125 kHz, New Focus 2017, USA), and finally processed by a DSP lock-in amplifier (Stanford Research Sys. SR830, USA). (Further details are provided in accordance with some embodiments are provided in the Exemplary Embodiments section, below.)

Figure 3:
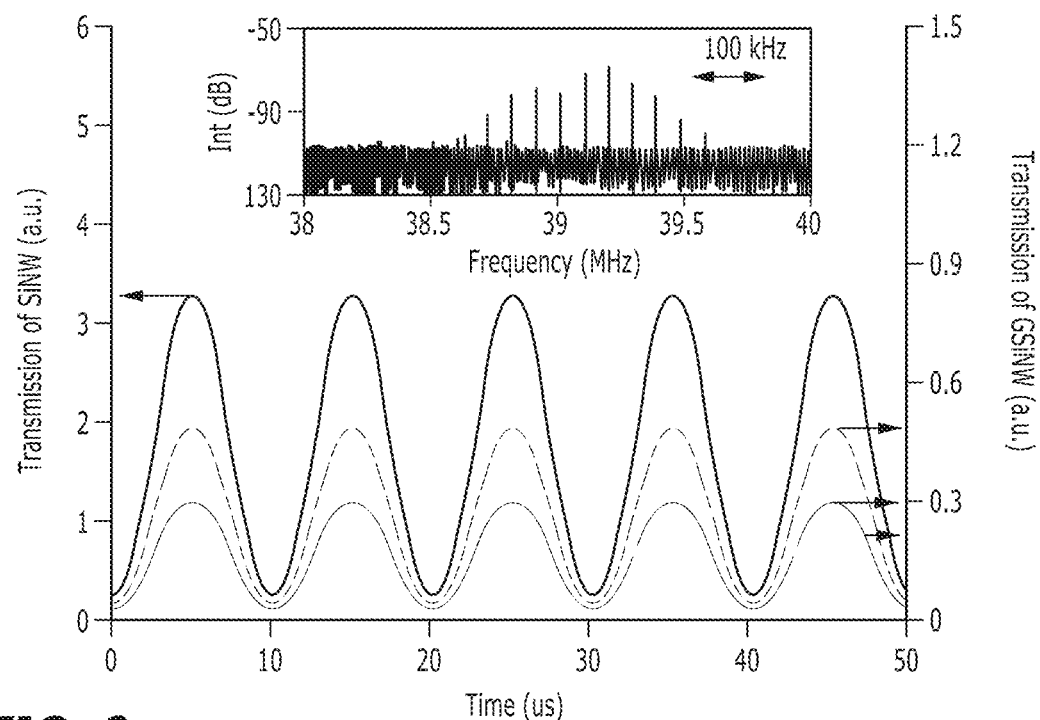
FIG. 3 provides data graphs of transmissions from a plasmon apparatus in accordance with embodiments, where the outer curve shows the SiNW without graphene layers, the inner curve shows the GSiNW, the white dashed curve illustrates the profile of the outer curve after a 11.6 dB linear loss, the black dashed curve illustrates the profile of the outer curve after a 9.9 dB linear loss (for saturated graphene); and the inset shows the electronic spectrum of the modulated pump, where the 39.1 MHz peak belongs to the pulsed laser, while the 100 kHz harmonics indicates the sinusoidal modulation.

FIG. 3 shows the transmission of a 100 kHz sinusoidally modulated pulsed pump, with a fixed peak power ~200 W and central wavelength 1532 nm using a plasmon apparatus in accordance with embodiments. As the electronic spectrum in the inset reflects, in various embodiments the pump may have a repetition rate of 39.1 MHz with 100 kHz harmonics. Because of the graphene based absorption saturation, the transmission of the high-peak-power pulsed pump is ~2.1 dB higher than a CW light with the same average power. Spectral transmissions of the GSiNW are shown in the exemplary embodiments. As previously mentioned, in many embodiments it may be helpful to increase the nonlinear conversion efficiency and decrease the thermal damage risk. The saturable absorption also changes the waveform of the modulated envelope, making it sharper. Moreover, when there is a CW signal in the waveguide that has already saturated the graphene, the pulse based saturable absorption may be suppressed, the envelope waveform would remain sinusoidal, as the black curve simulates.

Figure 4:
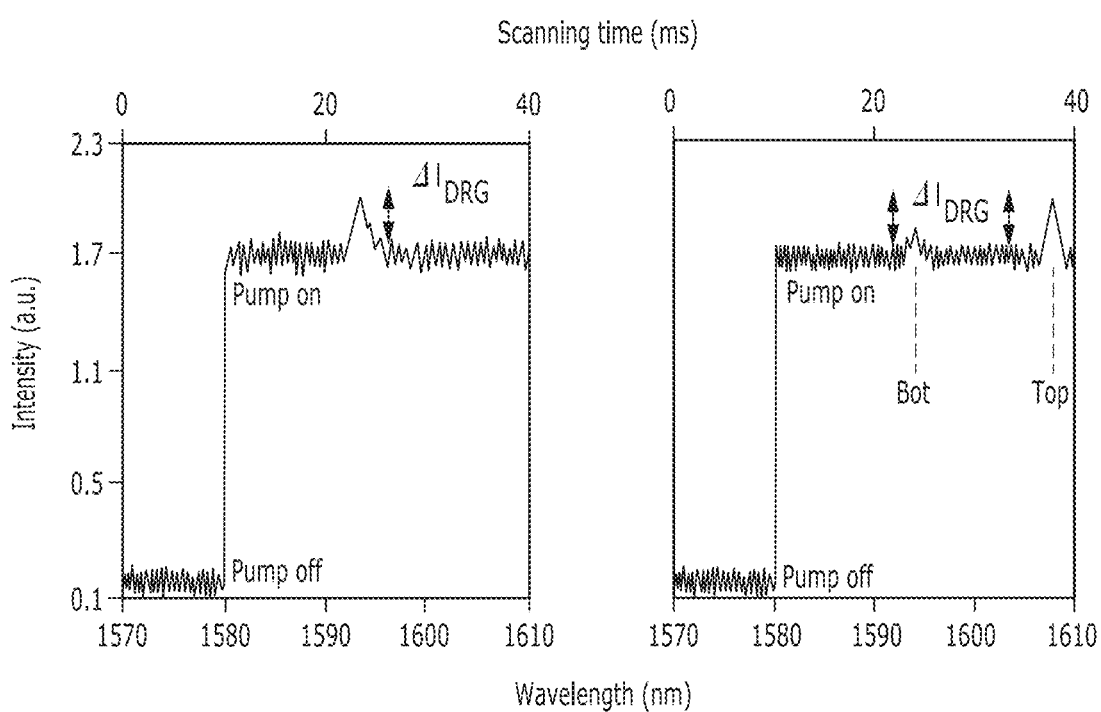
FIG. 4 provides data plots showing the DFG based signal enhancement on spectrum in accordance with embodiments, where (left panel) shows detected intensity after the lock-in amplifier is 0, and (Right panel) shows detected intensity by applying VG=−0.7 V, demonstrating two enhanced peaks (1593.7 nm and 1607.2 nm) corresponding to the bottom and top layer graphene plasmons.

A detection scheme for the DFG based plasmons in accordance with various embodiments is provided in FIG. 4. In some such embodiments, to find the right fs that satisfies the phase matching condition, the pump wavelength may be fixed at 1532 nm (195.8 THz), and then the CW signal laser can be scanned from 1570 nm to 1610 nm (191.08 THz to 186.34 THz), with scanning speed 1 nm/ms. Signal collected from the lock-in amplifier (after a 40 dB amplification) may then be demonstrated spectrally. When the pump is off, the output of the 100 kHz lock-in amplifier is 0. When the pump is turned on, the signal background is ~1.7 a.u. rather than 0, due to the residual saturable absorption based modulation, which is also amplified by the lock-in amplifier. During the scanning, once fs approaches the phase matched frequency (188.4 THz here), DFG occurs and the fs is enhanced via the nonlinear process. As a result, an additional peak with $\Delta I_{DFG}$=0.3 a.u. appears from the noise. The DFG based signal enhancement reflects the THz plasmon generation directly.

As an example, if $V_G$=0 V, the frequency of the generated is $f_{SP}$~7.5 THz. Moreover, when $V_G$≠0 V, the bottom (top) layer graphene supports different $f_{SP}$. For instance, when $V_G$=−0.7 V, two enhanced peaks are observed at 1593.7 nm (188.2 THz) and 1607.2 nm (186.7 THz). It suggests that $f_{SP}$ of the bottom (top) layer graphene plasmon is ~9.2 THz (~7.6 THz) respectively.

Embodiments for Gate Tunability

Figure 5A:
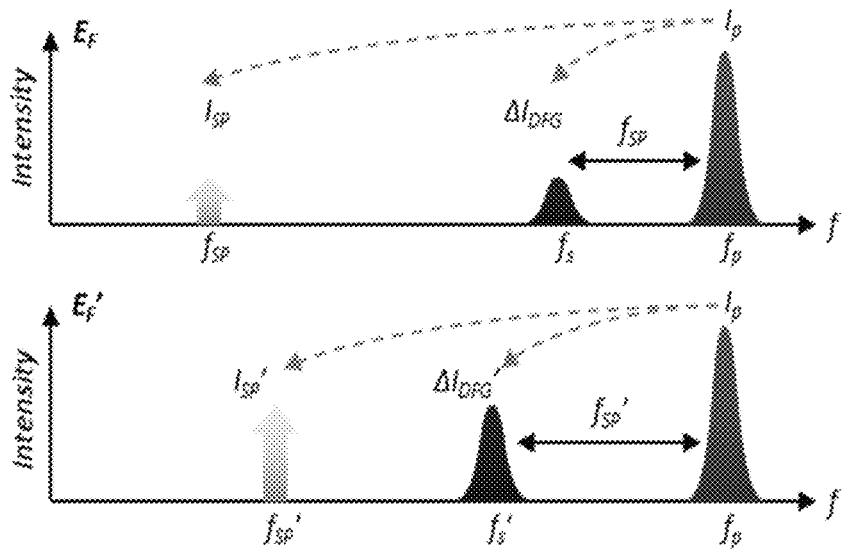
FIG. 5A provides data plots demonstrating the gate tunability of the DFG plasmons generated on graphene in accordance with embodiments.

The principle of gate tunable plasmon generation in the GSiNW is schematically shown in FIG. 5A. In the DFG process, a photon from the pump (fp) divides to be a photon enhancing the signal (fs) and a plasmon ($f_{SP}$), here fs=fp−$f_{SP}$, where $f_{SP}$ is determined by the Fermi level of graphene. When the Fermi level is tuned via changing the gate voltage (from $E_F$ to $E_{F'}$), $f_{SP}$ changes to be $f_{SP''}$. Correspondingly, the enhanced signal fs moves to fs'=fp−$f_{SP''}$, which is well observable during the scanning. Meanwhile, when $E_F$ changes, the effective 2nd nonlinear coefficient $x_{eff}^{(2)}$ of the graphene is also different, as shown in Eq. (1). Here $\hbar$ is the reduced Plank's constant, $\gamma$ is the scattering rate of graphene, R is the effective resistance of the GSiNW. (Additional details are provided in the Exemplary Embodiments)

$$\chi_{eff}^{(2)} = \frac{e^3}{4\pi\hbar^2} \frac{1}{k_{SP}\sqrt{f_s f_p}} \left[ \frac{\pi}{2} + \arctan\left( \frac{2\pi\sqrt{f_s f_p} - R|E_F|}{\hbar\gamma} \right) \right] \quad \text{(EQ. 1)}$$

Figure 5B:
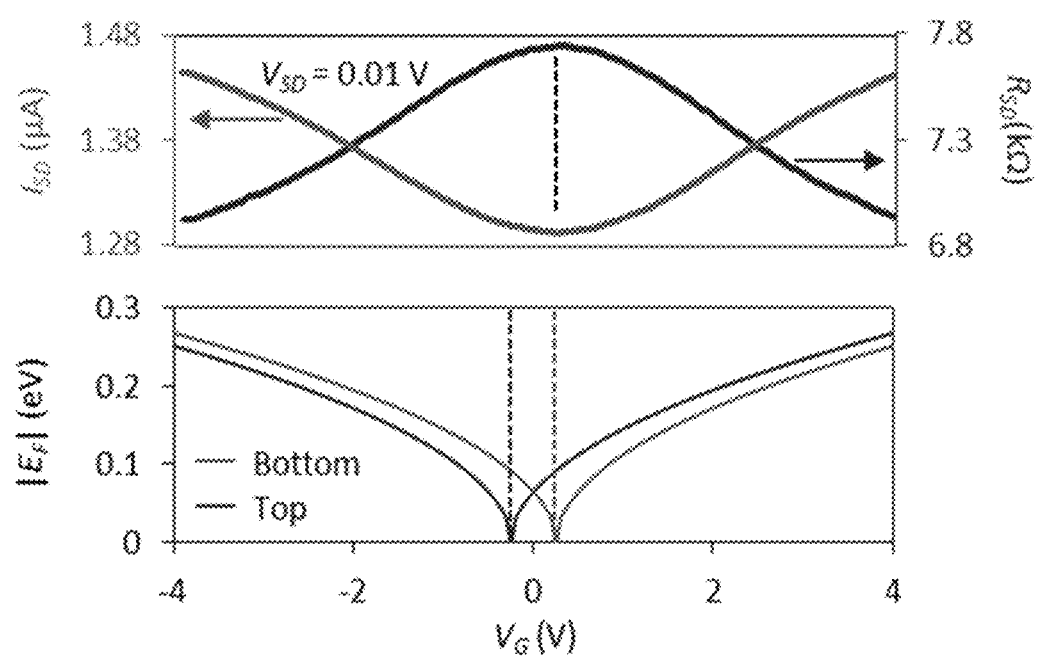
FIG. 5B, provides dataplots where the top panel shows the measured 'VG-ISD' correlation of the GSiNW, under a fixed VSD=0.01 V, and the bottom panel shows the Fermi level of the bottom layer graphene and the top layer graphene, based on the measured 'VG-ISD', in accordance with embodiments.

As a result, the enhanced intensity of signal ($\Delta I_{DFG}$) and the plasmon intensity ($I_{SP}$) would change as well. In exemplary embodiments of the GSiNW with a double-graphene system, under a $V_G$, ≠0 V, the Fermi level of the bottom or the top layer graphene ($E_{F,Bot}$, $E_{F,Top}$) is tuned independently, as $|E_{F,Bot}|=|E_0+E_G|$, $|E_{F,Top}|=|E_0-E_G|$. Here $E_0$=0.05 eV, $E_G$ is the Fermi level alteration determined by the gate injected electron density N, as $E_G=\hbar|vF|(\pi N)^{-1/2}$. Correlation of the $E_F$ and $V_G$ could be estimated by measuring the '$V_G$-$I_{SD}$' curve, as shown in FIG. 5B. Here $I_{SD}$ is the source-drain current, $R_{SD}$ is the source-drain resistance. In exemplary embodiments of the chip, when tuning $V_G$ in range of ±4 V, $I_{SD}$ changes in range of 1.29 μA to 1.47 μA, correspondingly, $R_{SD}$ is in range of 6.9Ω to 7.8 kΩ. When close to the Dirac point ($V_{Dirac}$=0.25 V), graphene has the highest resistance. Accordingly, $|E_F|$ is estimated to be tuned in a range of from 0~0.27 eV. When $V_G$ approaches 0.25 V (−0.25 V), $E_F$ of the bottom (top) graphene reaches the Dirac point. (Further details are provided in the Exemplary Embodiments.)

Figure 5C:
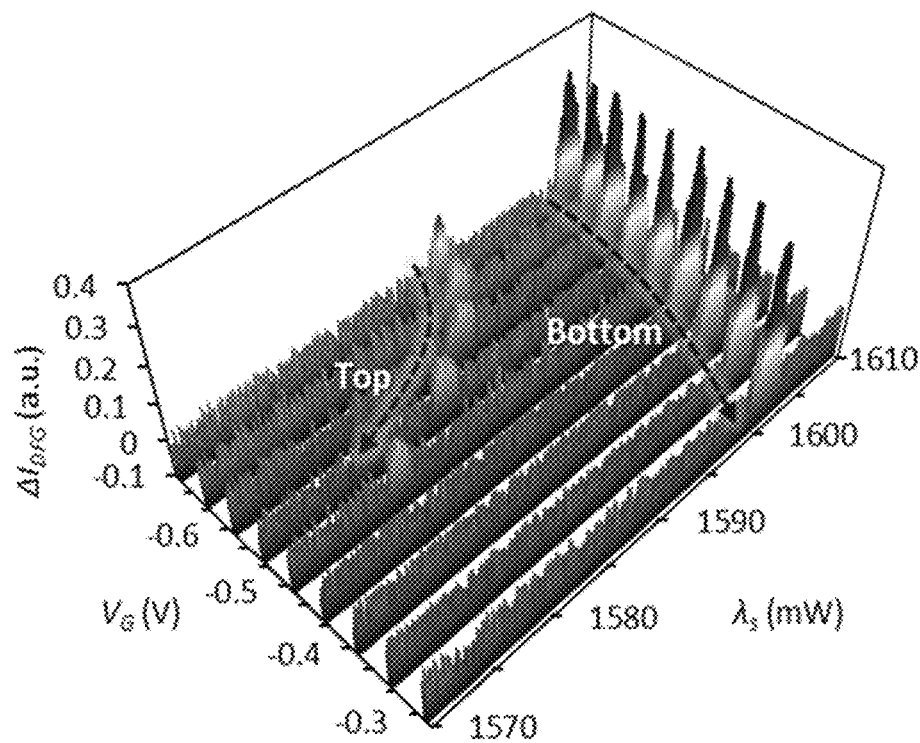
FIGS. 5C and 5D, provide measured spectra of the $\Delta$IDFG, in accordance with embodiments, where VG mapping step is 0.05 V and bottom and top layer peaks are marked by arrows.
Figure 5D:
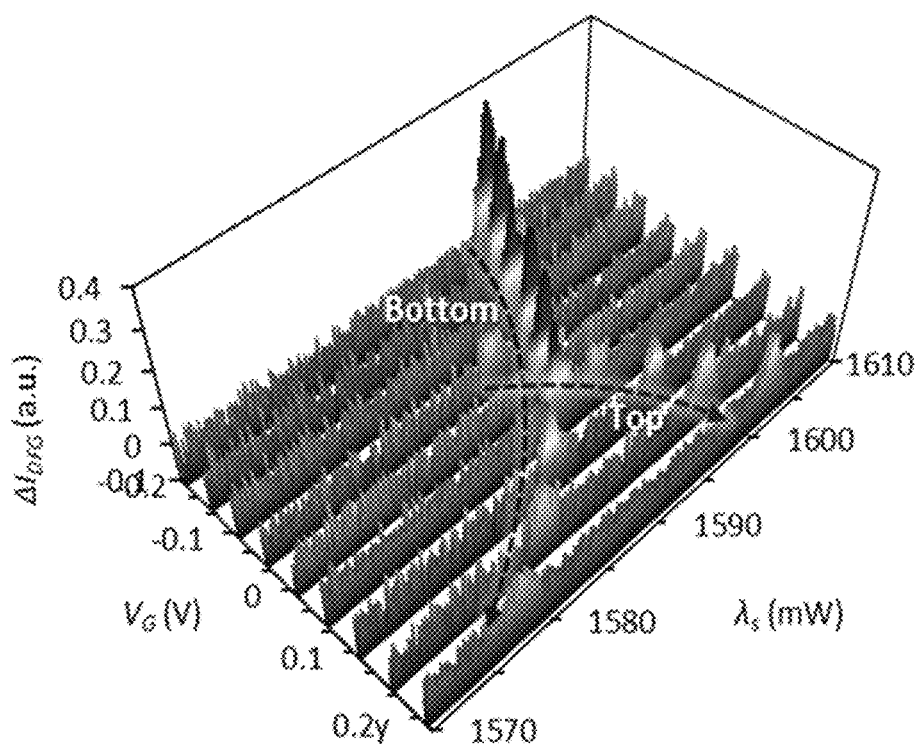

Gate tunability of apparatus in accordance with embodiments is well verified by measuring the DFG enhanced signal spectra, as shown in FIGS. 5C and 5D. In FIG. 5C, it is shown that when $V_G$ is increased from −0.7 V to −0.3 V, the DFG enhanced signal peak of the bottom layer ($\lambda s_{,Bot}$) blue shifts from 1607.2 nm to 1601.3 nm, with the intensity increasing from 0.28 a.u. to 0.37 a.u (at $V_G$=−0.4 V), then decreasing back to ~0.32 (at VG=−0.3 V). Simultaneously, $I_{,Top}$ and intensity of the top layer decreases faster. In FIG. 5D, it is show that when $V_G$ increases from −0.2 V to 0.2 V, the signal peak generated by the bottom layer graphene plasmons blue shifts from 1598.6 nm to 1578.1 nm, with intensity decreasing from 0.35 a.u. to 0.09 a.u. However, the signal peak generated by the top layer graphene plasmons begins to appear from −0.05 V and then red shifts to 1601.6 nm with intensity increasing to 0.11 a.u.

In FIGS. 5C and 5D, measured $\Delta I_{DFG}$ of the bottom (top) layer graphene is 0.37 a.u. at $V_G$~−0.4 V (0.11 a.u. at $V_G$~0.4 V). $\Delta I_{DFG}$ of the top layer graphene is ~3 times weaker than the $\Delta I_{DFG}$ of the bottom layer, because the top layer graphene is farther from the core, where the evanescent fields of the pump and the signal are weaker. Spectra of these two maps are provided in the Exemplary Embodiments.

Figure 5E:
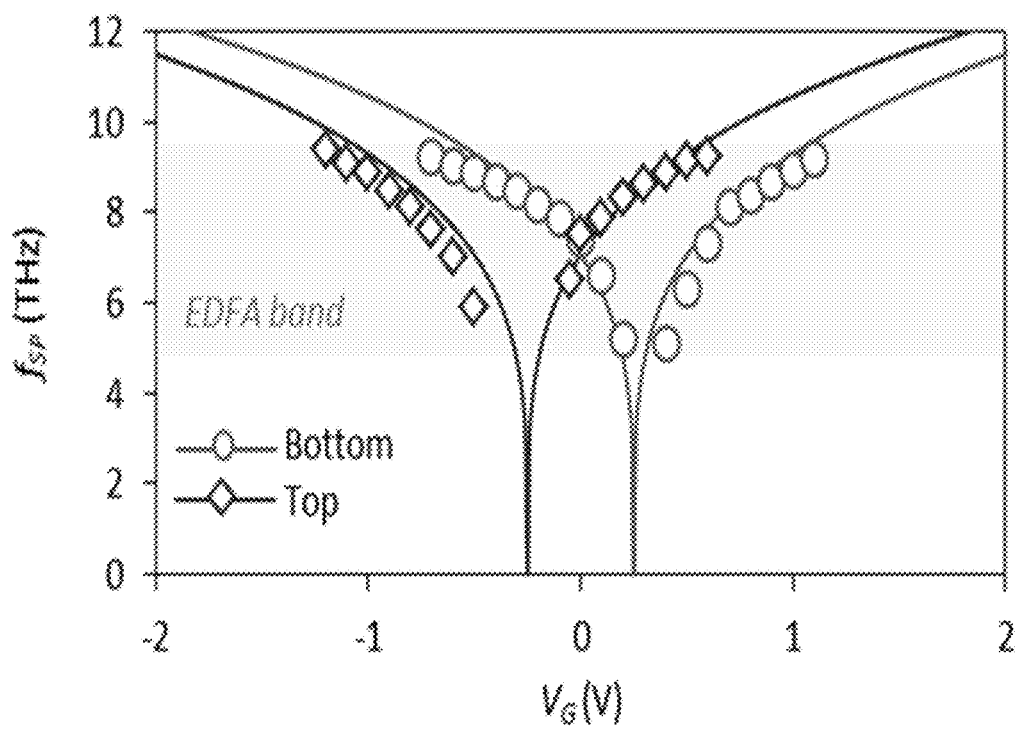
FIGS. 5E and 5F provide data plots showing that fSP and plasmon intensity is tunable via VG in accordance with embodiments, where 5E shows the effective band of the L-band EDFA (1570 nm-1610 nm) and 5F the noise up to ~±0.04 a.u. marked by a grey area and error bars.
Figure 5F:
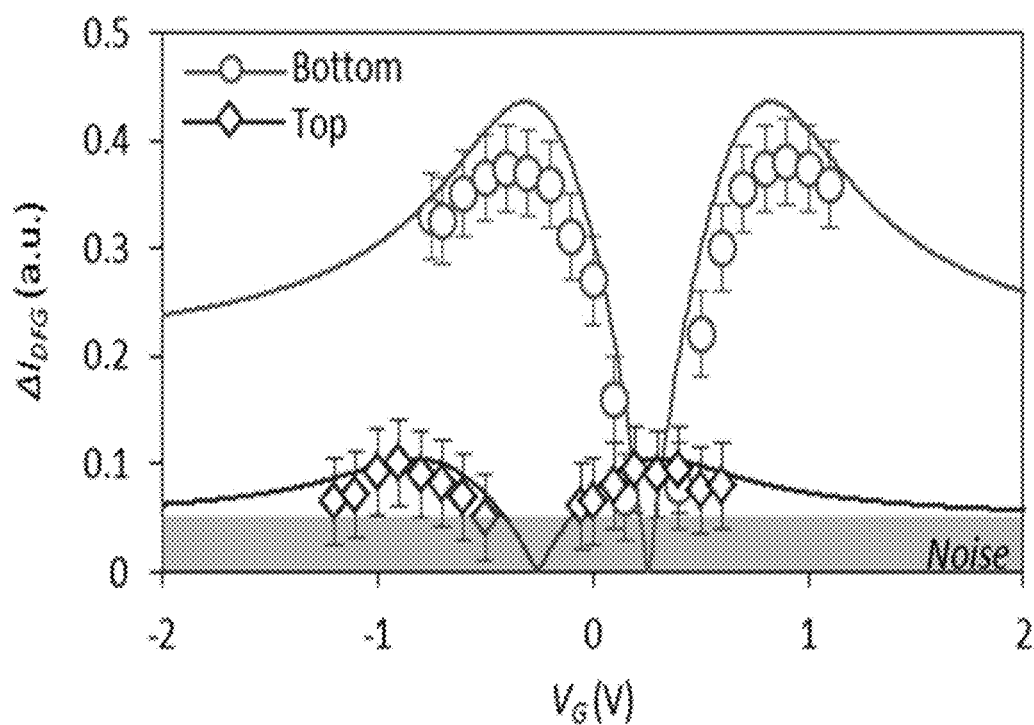

FIGS. 5E and 5F concludes the gate tuning of the GSiNW. Here the dots and diamonds are measured results while the solid curves are theoretical fittings. Due to the transistor structure, the bottom layer graphene and the top layer graphene have symmetrical curves. Limited by the amplification window of the L band EDFA, and the ±0.04 a.u. noise, plasmons with $f_{SP}$ higher than 9.4 THz or lower than 4.7 THz is difficult to measure rigorously. (In FIG. 5E, the effective band of the L-band EDFA (1570 nm-1610 nm) is marked by the shaded region, while in 5F, noise up to ~±0.04 a.u. is marked by a grey area and error bars.)

Figure 6A:
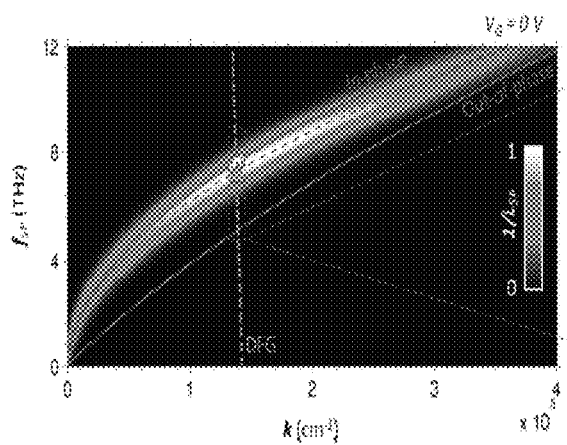
FIGS. 6A to 6D provide data plots on backward phase matching conditions for the graphene plasmonic dispersion in accordance with embodiments, where 3A shows the calculated dispersion of the graphene plasmon at $V_G$=0 V, 3B is a zoom in of 3A, where grey dashed lines: show that by tuning Ap from 1532 nm to 1542 nm, $f_{SP}$ changes from 7.5 THz to 7.4 THz, and 3C and 3D show that under $V_G$=−0.7 V and 0.2 V, dispersions of the bottom layer graphene and the top layer graphene DFG happens on the graphene layers (In all the plots 1/LSP is normalized).
Figure 6B:
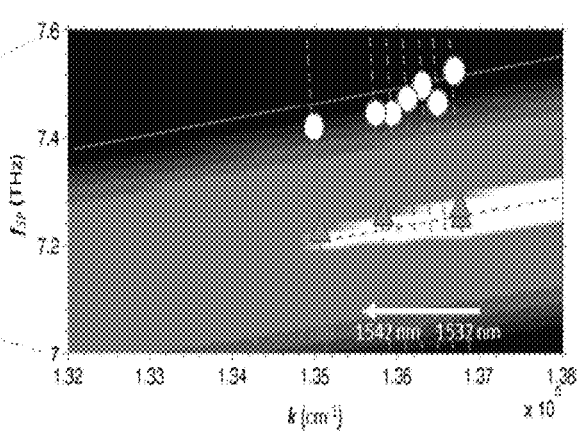

To understand the gate tunable plasmon generation in depth, the phase matching conditions were investigated as shown in FIGS. 6A to 6D. In the GSiNW apparatus, to generate THz graphene plasmons, phase matching conditions of backward DFG and dispersion of the plasmonic mode are satisfied simultaneously. By using random phase approximation (RPA), it is possible to map the graphene plasmonic dispersion at $V_G$=0 V, as shown in FIGS. 6A and 6B. Here the photon-electron interaction loss LSP is normalized, and the plasmon-phonon coupling at 14.55 THz (Si—O) is taken into consideration. Referring to graphene's nature, when $f_{SP}$ is much lower than the Landau damping regime, dispersion of graphene plasmons $k_{SP}(f_{SP})$ behaves approximately as a quadratic function ($k_{SP} \propto f_{SP}^2$). (More details are discussed in the Exemplary Embodiments, below.)

Figure 6C:
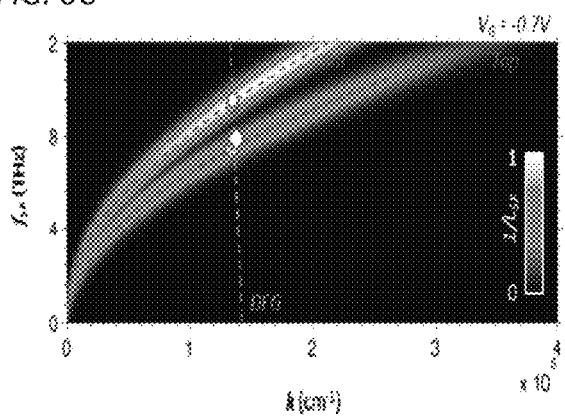
Figure 6D:
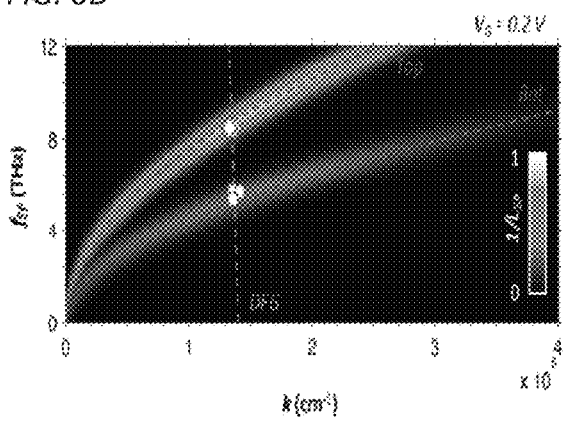

In the '$k_{SP} \propto f_{SP}$' map, phase matching condition of the DFG could be written as $(c/2\pi)k_{SP}=-f_{SP}n_s+f_p+n_s)$, as the dashed line plots. Here $n_s$, $n_p$ are the effective indexes of the pump and signal, which are calculated in the Exemplary Embodiments. Hence, plasmons are only generated at the intersections of the graphene dispersion curves and the DFG phase matching lines. As the dots show, measured $f_{SP}$ is ~7.5 THz, which is ≠0.3 THz higher than the calculated curve, which might be induced by the plasmonic coupling between the bottom and top layer graphene. In various embodiments the thickness of $Al_2O_3$ is 30 nm, the calculated dispersions of the optical mode (in-phase) and the weak acoustic mode are marked by curves. As a comparison, the $f_{SP}$ at $V_G=0$ V in another GSiNW sample, with a 60 nm $Al_2O_3$ layer (negligible coupling), as triangles note. (Discussed in the Exemplary Embodiments.) Moreover, to certify fSP matches the plasmonic dispersion curve, the $f_p$ was made to vary the DFG phase matching point, as shown in FIG. 6B. By tuning $\lambda_p$ from 1532 nm to 1542 nm (195.8 THz to 194.6 THz), the enhanced signal peak locations $\lambda_s$ can be changed from 1593.2 nm to 1603 nm (188.3 THz to 187.2 THz). Hence, $f_{SP}$ decreases from 7.5 THz to 7.4 THz, the trace follows the graphene plasmonic dispersion well. Measured spectra and the '$\lambda_p$-$\lambda_s$' correlation are demonstrated in the Exemplary Embodiments. When the gate voltage is tuned, the dispersion curve of the bottom and top layer graphene moves independently. As a result, generated plasmons on the bottom layer and top layer graphene have different $f_{SP}$, as detected in FIG. 5. For instance, FIGS. 6C and 6D show the conditions where $V_G=-0.7$ V and $V_G=0.2$ V. Here $f_p$ is fixed at 195.8 THz, dots and diamonds show the measured results of the bottom and the top layer graphene respectively.

Apart from $f_{SP}$, it is also necessary to determine the intensity of the DFG plasmons ($I_{SP}$). In the DFG process, $I_{SP}$ is proportional to the intensity of the pulsed pump $I_p$ and the intensity of the CW signal $I_s$, as Eq. (2) shows. More theoretical derivations are shown in the Exemplary Embodiments. In the experiment, $I_{SP}$ could be directly estimated from the measured $\Delta I_{DFG}$. As signal and plasmon get the same number of photons from pump, this relationship can be written as provided in Eq. (3).

$$I_{SP} = \frac{(\chi_{eff}^{(2)})^2 I_p I_s}{L_{SP}^2} \quad (EQ.\ 2)$$

$$I_{SP} = \Delta I_{DFG} \frac{f_{SP}}{f_p - f_{SP}} \quad (EQ.\ 3)$$

Figure 7A:
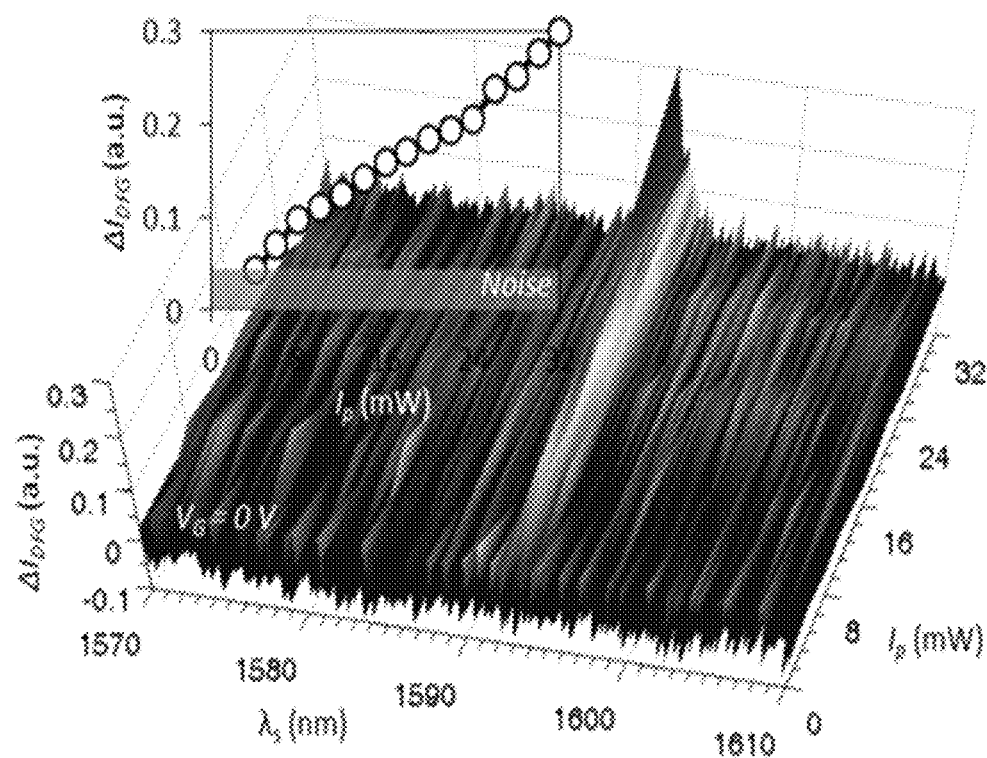
FIGS. 7A to 7D provide data plots on conversion efficiency in accordance with embodiments, where 7A is under $V_G$=0 V, 7B is under $V_G$=−0.7 V, 7C is the calculated $x_{eff}^{(2)}$ and $1/L_{SP}$ during the gate tuning, and 4D is the conversion efficiency of the DFG graphene plasmon on chip (Note: dots illustrate the measured results, and has a maximum number ~0.6×10$^{-4}$).
Figure 7B:
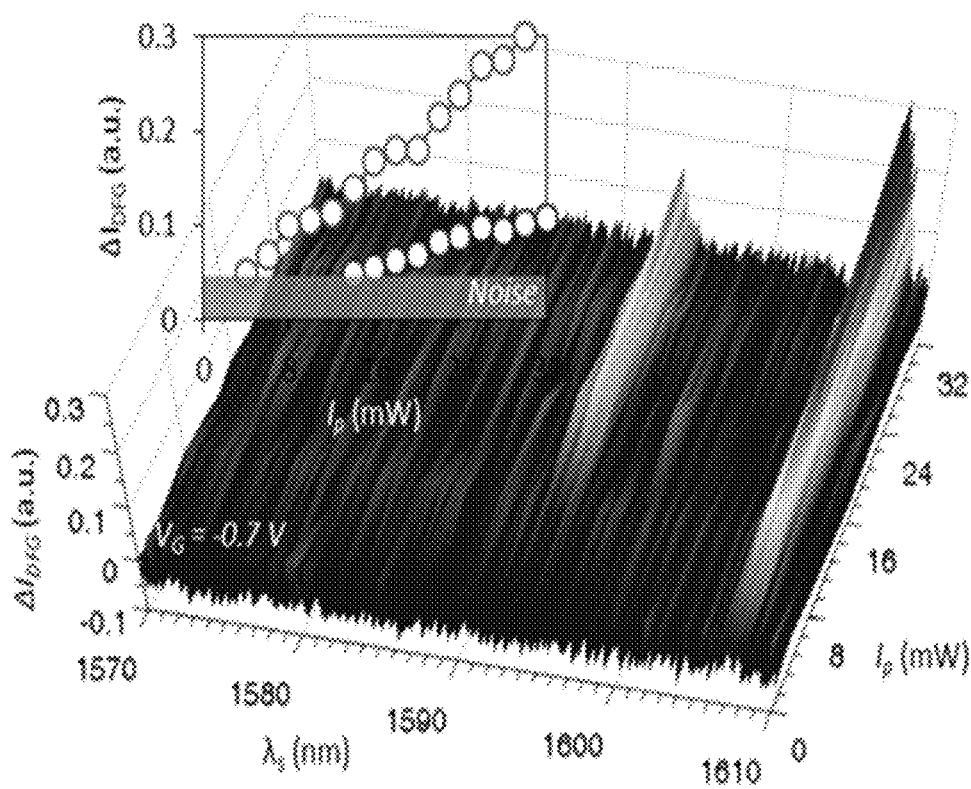

By fixing the signal intensity 1.4 W and $f_p$ 195.8 THz, exemplary spectra of the $\Delta I_{DFG}$ are illustrated in FIGS. 7A and 7B. In FIG. 7A, $V_G=0$ V, while in FIG. 7B, $V_G=-0.7$ V. For either bottom or top layer graphene, $\Delta I_{DFG}$ increases linearly when $I_p$ increase from 0 to 32 mW. Insets in FIGS. 7A and 7B conclude the $\Delta I_{DFG}/\Delta I_p$ correlations, on $10^{-3}$ a.u./mW level. Considering the optical loss, optoelectronic transform ratio and amplifications, the plasmons generated on the GSiNW are shown to be in single nW order.

Figure 7C:
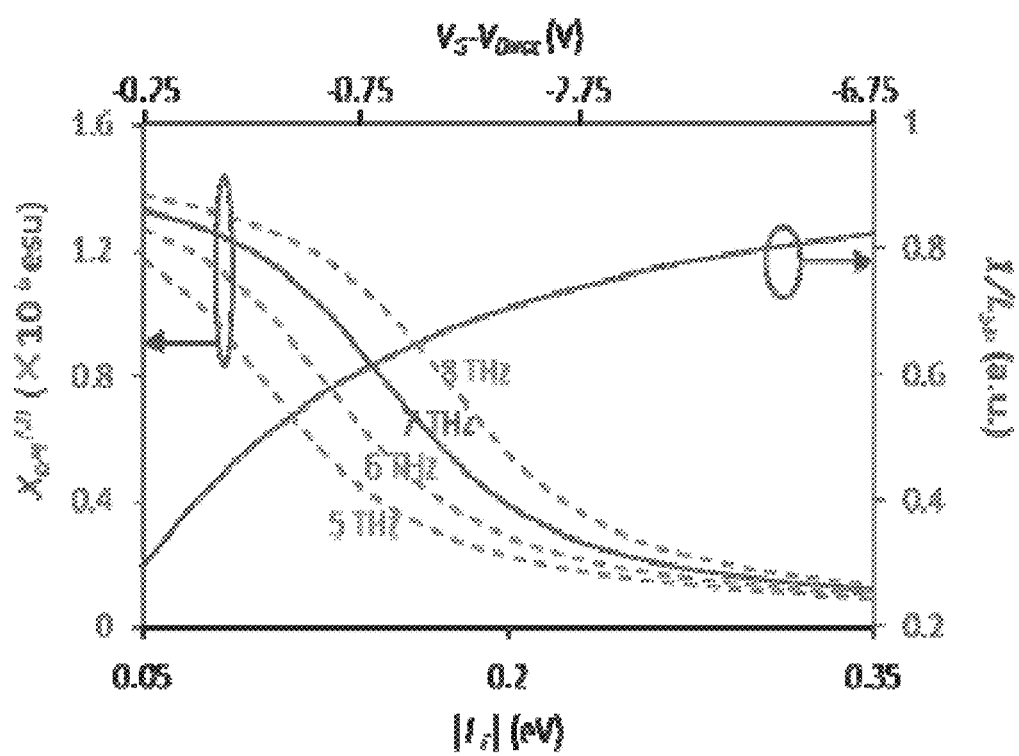
Figure 7D:
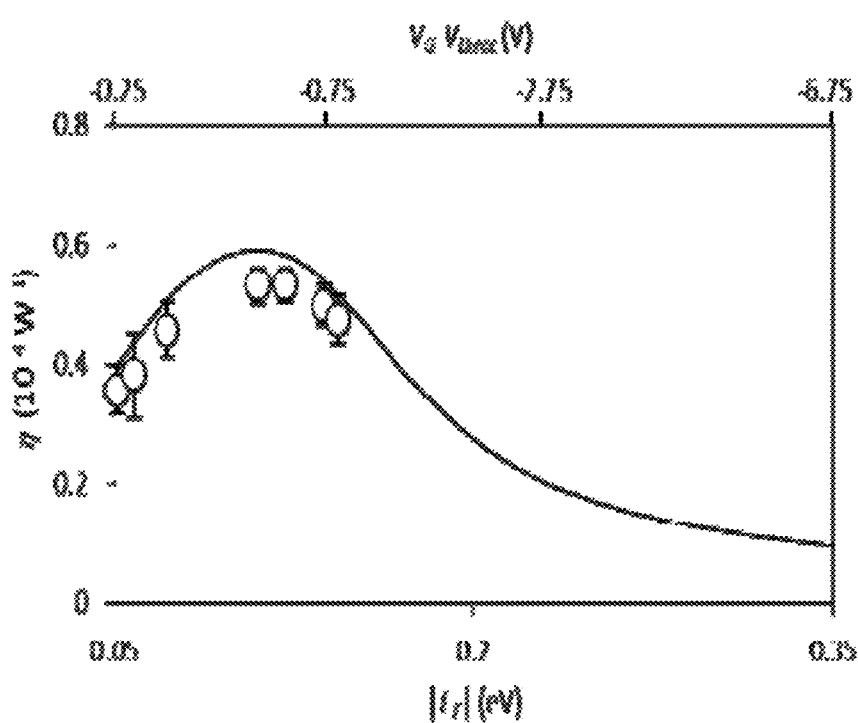
Figure 8A:
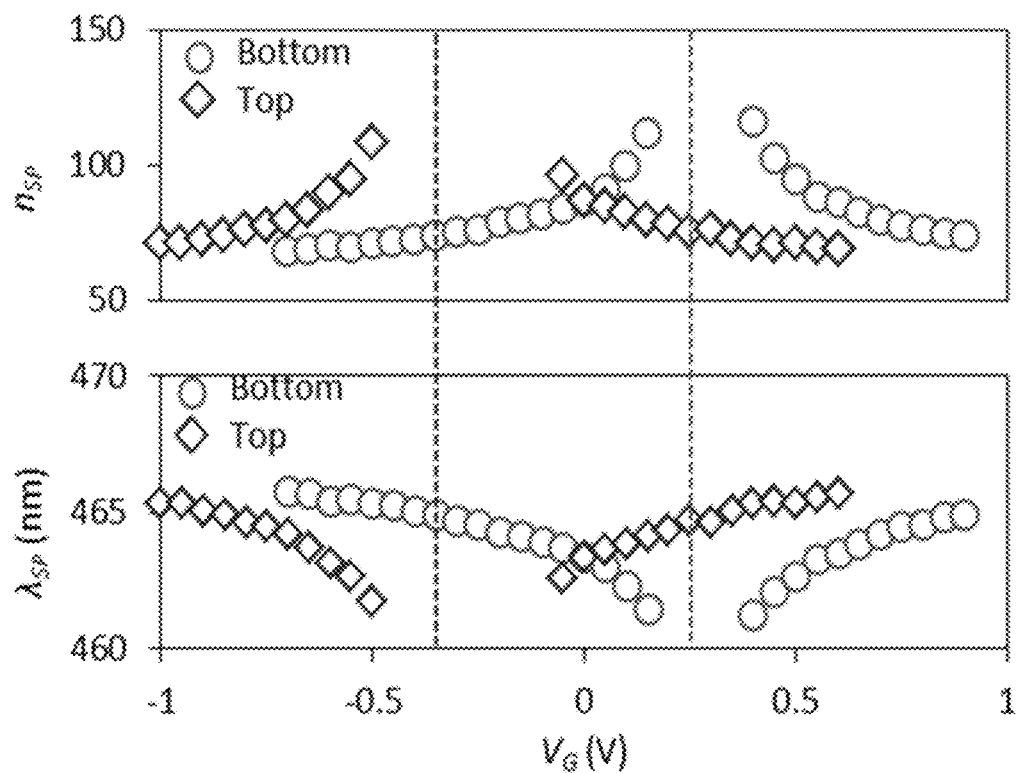
FIGS. 8A to 8D provide data plots on the properties of the tunable plasmons in accordance with embodiments, where 8A shows the effective index ($n_{SP}$) and wavelength ($\lambda_{SP}$) of the generated graphene plasmons by tuning $V_G$ in ±1 V; 8B shows (Left) measured linewidth of the enhanced peaks locating in 1570 nm to 1610 nm, it keeps stable with the gate tuning, (Middle) life time ($T_{SP}$) of the plasmons, which is on femtosecond level, and (Right) Q factor of the generated plasmons; 8C shows the simulated plasmon propagations, where curves show the plasmons with different wavelengths; and 5D shows plasmonic switching for $f_{SP}$=8.4 THz.
Figure 8B:
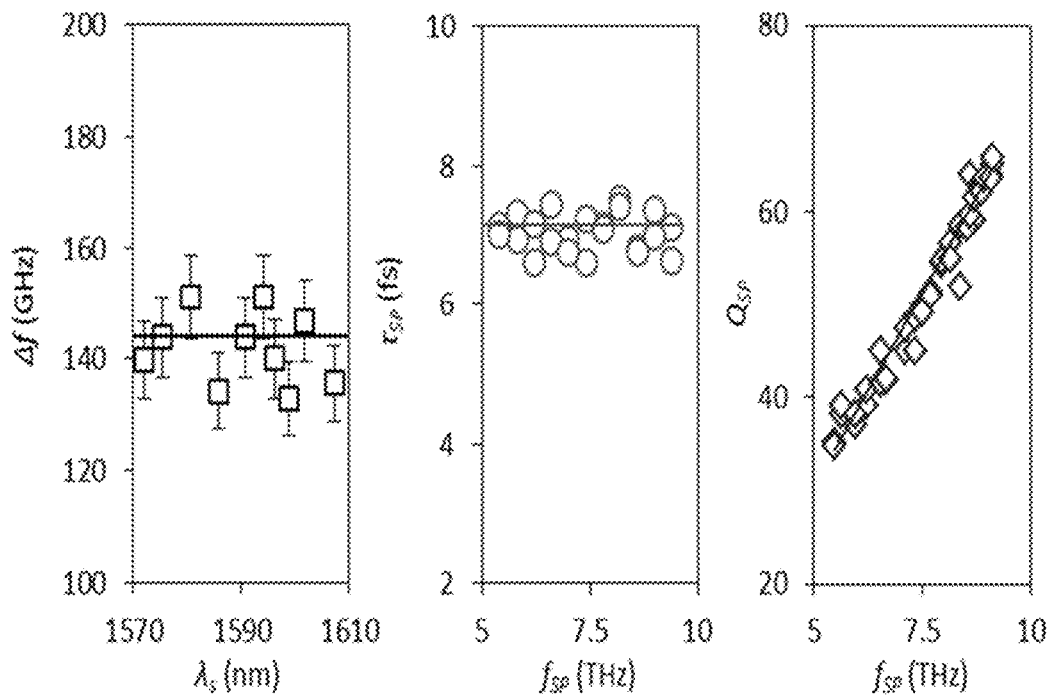
Figure 8C:
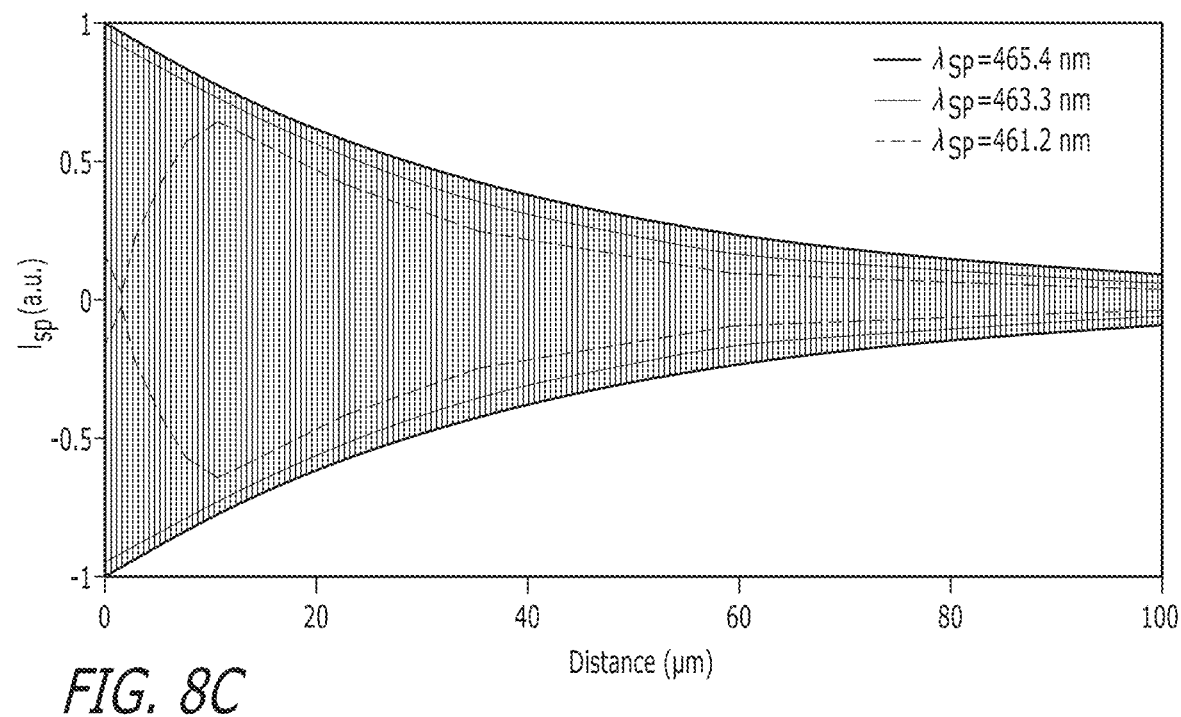
Figure 8D:
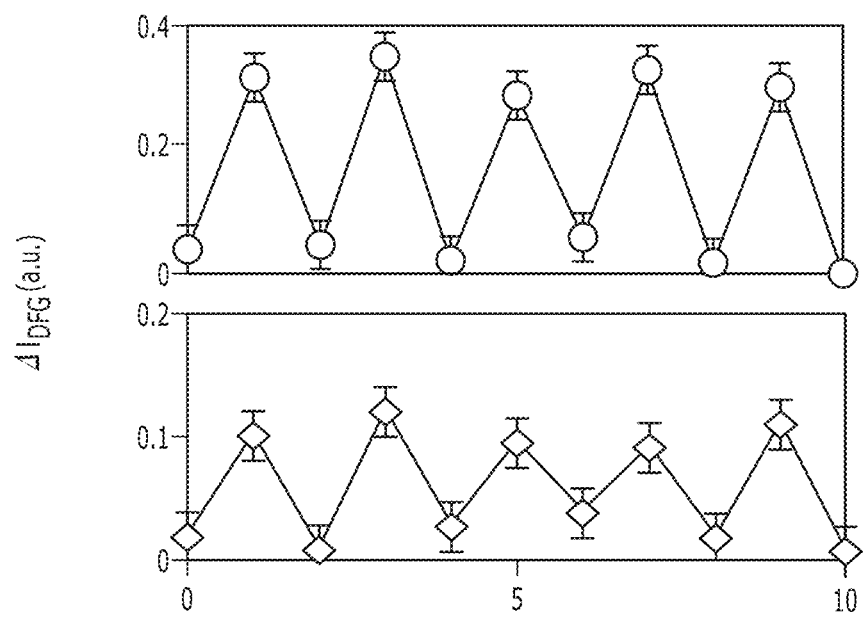

The conversion efficiency of the $2^{nd}$ nonlinearity based plasmon generation in accordance with embodiments is provided in FIGS. 7C and 7D. Here the conversion efficiency is defined as $\eta=I_{SP}/I_s I_p$. According to Eq. (1), by normalizing pump power, $\eta=(X_{eff}^{(2)}/L_{SP})^2$. For $f_p \approx f_s \gg f_{SP}$, $\eta$ could be approximately written as:

$$\eta = \frac{e^3}{2\pi^3 \hbar^2 k_{sp} \sqrt{f_s f_p}} \left\{ \frac{\pi}{2} + \arctan\left(\frac{2\pi \sqrt{f_s f_p} - 2v_F \sqrt{2m_s E_F}}{\gamma}\right) \right\} \arctan\left(\frac{E_F}{\varepsilon_w \gamma}\right) \quad (EQ.\ 4)$$

Here $m_e=9.109\times10^{-31}$ kg, $\gamma$ is the scattering rate, $\varepsilon_w$ is the reduced Plank's constant, and $V_F=1.1\times10^6$ m/s is the Fermi speed. In the GSiNW, $X_{eff}^{(2)}$ and $1/L_{SP}$ are of opposite trend: When $E_F=0$ eV, graphene has a largest $X_{eff}^{(2)}$, however its carrier density is 0, $L_{SP}\rightarrow\infty$, graphene plasmon is completely damped. When $E_F$ is high, thanks to the high carrier density, $L_{SP}$ could be low but $X_{eff}^{(2)}$ approaches 0. As a balance, with Fermi level increasing, $\eta$ rises first, and then drops gradually when $E_F>0.13$ eV. That means, by selecting a proper $|V_G-V_{Dirac}|\sim0.5$ V to ensure $E_F\sim0.13$ eV it is possible to find a highest $\eta\sim6\times10^{-5}$ $W^{-1}$. Under a certain $E_F$, $\eta$ of the bottom layer or the top layer graphene is the same.

Graphene Plasmon Properties

Next several properties of the graphene plasmons generated on chip in accordance with embodiments are described in relation to FIGS. 7A to 7D. First, the upper panel of FIG. 7A demonstrates the measured $n_{SP}$ of the SPs, by referring $n_{SP}=(f_p n_p+f_s n_s)/(f_p-f_s)$. Here $f_p$ is fixed 195.8 THz. For the bottom layer graphene when $V_G$ approaching $V_{Dirac}$, $n_{SP}$ increases from ~69 to ~116. As expected, the top layer graphene has a symmetrical '$n_{SP}$-$V_G$' curve. This result verifies that a lower Fermi level (closer to the Dirac point) could bring a better plasmonic confinement. In the lower panel, the wavelengths of the SPs are also estimated, by considering $\lambda_{SP}=c/(f_{SP} n_{SP})$. Determined by the DFG phase matching results in $\lambda_{SP}=c/l(f_p n_p+f_s n_s)$, which changes in range of 460 nm to 466 nm during gate voltage modulation.

The linewidth ($\Delta f_{SP}$), lifetime ($\tau_{SP}$) and quality factor ($Q_{SP}$) of plasmons in accordance with embodiments are examined in FIG. 7B. For the DFG, $\Delta f_{SP}=\Delta f_{pump}+\Delta f_{signal}+\min[\Delta f_G, \Delta f_{DFG}]$. Here $\Delta f_{pump}\sim60$ GHz and $\Delta f_{signal}\sim0.5$ GHz are the linewidths of the pulsed pump laser and the CW signal laser, $\Delta f_G\sim1$ THz is the width of the graphene plasmonic dispersion, $\Delta f_{DFG}$ is the acceptable detuning of the DFG. In practice, $\Delta f_{SP}$ is approximately equal to the measured linewidth of the enhanced signal peak, which keeps ~140 GHz during the tuning. Hence, the lifetime of the plasmons $\tau_{SP}=1/\Delta_{SP}$ is ~7 fs. Besides, $Q_{SP}$ is estimated over 60 when $f_{SP}$ is higher than 8.6 THz.

Based on the measured results, several plasmons propagating along the GSiNW are simulated in FIG. 7C. A smaller $\lambda_{SP}$ brings a shorter propagation length. For $\lambda_{SP}=465.4$ nm, 463.3 nm and 461.2 nm, propagation length of them are ~29 µm, ~22 µm and ~18 µm, respectively. It suggests that the every plasmon generated by the DFG propagates tens of periods along the GSiNW in average.

One exemplary application of the GSiNW, in accordance with embodiments, is as a plasmon switcher, by using a specific filter and modulating $V_G$ conveniently. For example, by using a bandpass filter to focus on $\lambda s=1600.9$ nm ($f_{SP}=8.4$ THz), when $V_G$ turns between 0.25 V and 0.8 V, the bottom layer graphene plasmons is off and on (~0.3 a.u.) Similarly, for $f_{SP}=8.4$ THz as well, by tuning $V_G$ between -0.25 V and -0.9 V, top layer graphene plasmons are also off-on switchable.

In conclusion, taking advantage of the art of backward different-frequency-generation, THz plasmons are successfully generated on a double layer graphene based semiconductor chip, for the first time. This plasmon generation has an efficiency approaching $10^{-4}$, as shown in FIG. 7D, with a quality factor up to 60. Most attractively, these graphene plasmons are widely and effectively gate tunable, in both frequency and gain. Such a graphene plasmnoic manipulation on chip opens a new window for integrated photonics and optoelectronics.

EXEMPLARY EMBODIMENTS

Experiments were conducted to demonstrate the capabilities of the tunable plasmon generators in accordance with embodiments. These results and discussion are not meant to be limiting, but merely to provide examples of operative devices and their features.

Methods and Materials

Preparation of the graphene based semiconductor chip. The chip with silicon nitride cores is chemically etched by using the buffer oxide etching (BOE) to make sure it will produce evanescent field propagations. After etching, the distance between the core to the top surface is <20 nm, ensuring the strong light-graphene interaction. Then, a monolayer graphene grown by chemical vapor deposition (CVD) method is transferred on to the chip using conventional wet transfer technique, followed by patterning by photo-lithography and oxygen plasma etching. This graphene layer is regarded as the 'bottom layer graphene' with a size of 100 μm×40 μm. After that, a Ti/Au (20/50 nm) pad is deposited using e-beam evaporation, working as source-drain electrodes. By using the source and drain, resistance of the bottom layer graphene could be measured. Afterwards, a thin layer (40 nm) of $Al_2O_3$ is deposited using atomic layer deposition (ALD), providing sufficient capacitance for the graphene based semiconductor chip. Finally, on the top of the $Al_2O_3$ insulator, another graphene layer is covered, linked with the 'gate'.

Figure 9:
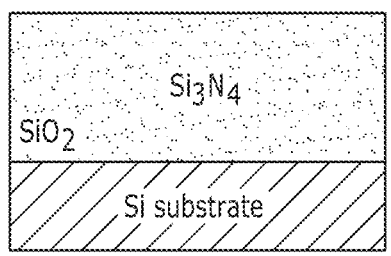
FIG. 9 provides schematic diagrams of a fabrication process in accordance with embodiments.
Figure 9:
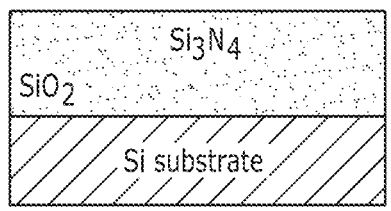
Figure 9:
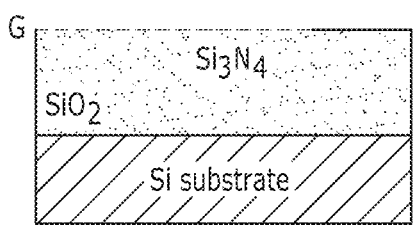
Figure 9:
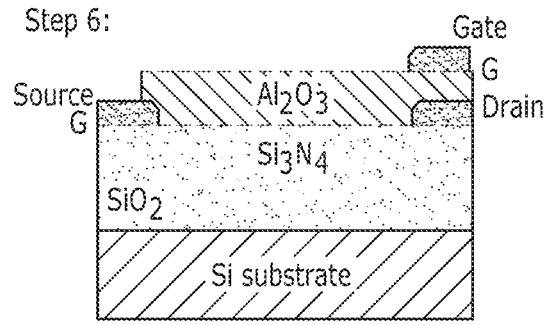
Figure 9:
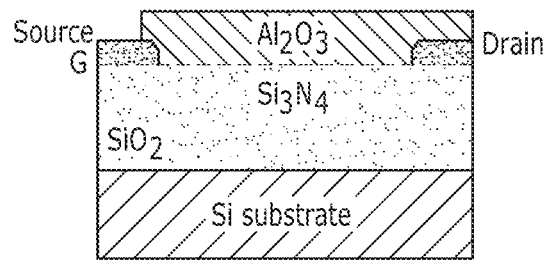
Figure 9:
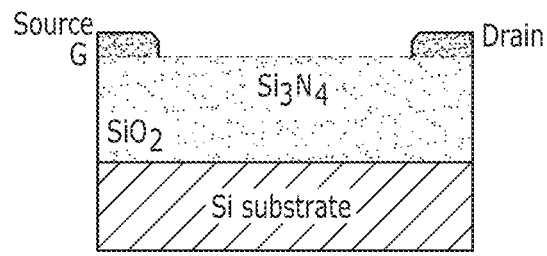

Preparation of the graphene based silicon nitride waveguides. FIG. 9 shows the fabrication steps of the graphene based silicon nitride waveguides (GSiNWs) in accordance with embodiments. As shown in step 1, the chips are fabricated at the Institute of Microelectronics (IME, Singapore), with silicon nitride waveguide buried in $SiO_2$ cladding, which is deposited on bulk silicon substrate. There are 4 straight waveguides in every chip with a width of 1000 nm, and length ~3 mm. Within this chip, oxide thickness from the Si substrate to the bottom of the $Si_3N_4$ cores is 3000 nm, and the height of the cores is 725 nm, oxide thickness from the top of the core to the surface of the chip is 2500 nm. The chip is chemically etched by using the buffer oxide etching (BOE) method in step 2 (plasma based dry etching is also available). Before the etching, optical microscope is used to ensure the chips are well cleaned. After etching, the distance between the core to the top surface is <20 nm, ensuring the strong light-graphene interaction. As shown in step 3, a monolayer graphene grown by chemical vapor deposition (CVD) method is transferred on to the chip using conventional wet transfer technique, followed by patterning by photo-lithography and oxygen plasma etching. This graphene layer is regarded as the 'bottom layer graphene' with a size of 100 μm×40 μm. After that, Ti/Au (20/50 nm) pad is deposited using e-beam evaporation, working as source-drain electrodes. By using the source and drain, resistance of the bottom layer graphene could be measured. In step 5, thin layer (40 nm) of $Al_2O_3$ in deposited using atomic layer deposition (ALD), providing sufficient capacitance for the graphene based semiconductor chip. Finally, as shown in step 6, on the top of the $Al_2O_3$ insulator, another graphene layer is covered, linked with the 'gate'.

Figure 10A:
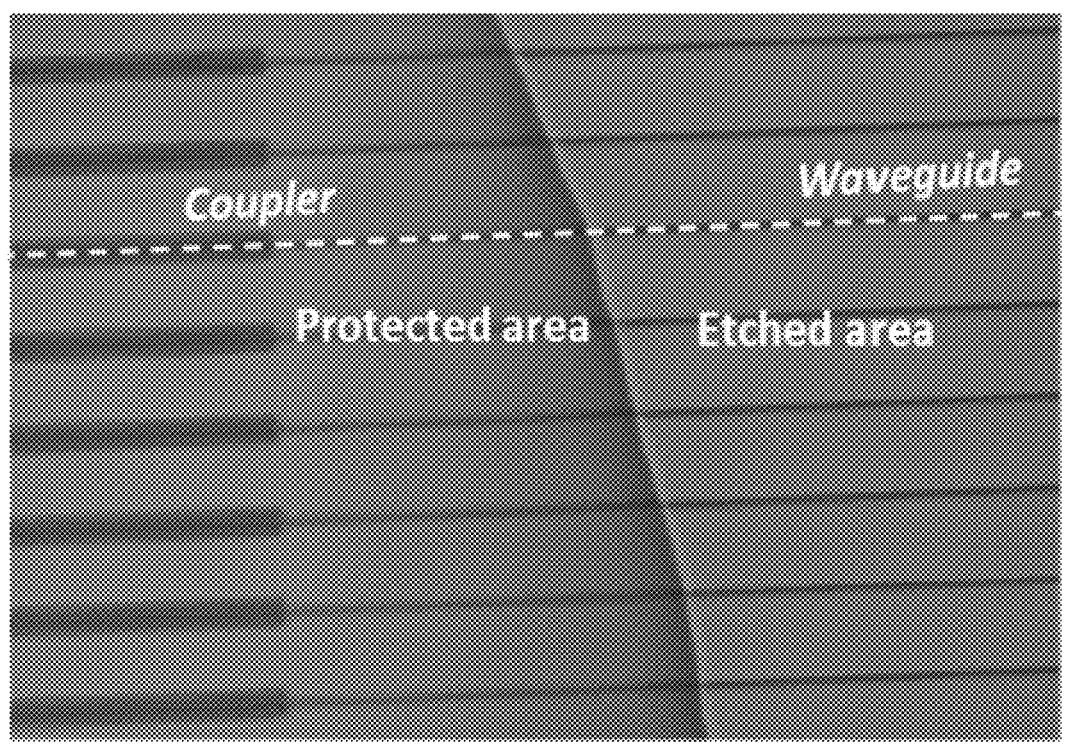
FIGS. 10A to 10F provide diagrams and data plots demonstrating chip etching in accordance with embodiments, where 10A shows an optical microscope image of an etched chip; 10B provides measured oxide thickness after etching (Inset shows the SEM image, the etched boundary is clear); 10C shows the etching speed of the dry etching method (circles) and the wet etching method (diamonds); 10D provides transmission spectra, when there is no coupler protection; 10E shows a microscope image of the mask used in lithography; and 10F provides Raman spectra (the background noise is normalized).

Characterizations and measurements during the device fabrication. FIG. 10A illustrates a top-view optical microscope image of the etched silicon nitride waveguides (SiNWs) in accordance with embodiments. In this image, the edge of the etched area and the non-etched area is clear. To reduce the scattering and coupling loss of the etched waveguides, the air-gaped couplers (at the two sides of the chips) are carefully protected by photoresist. After the etching, photoresist is released by using alcohol and acetone.

Figure 10B:
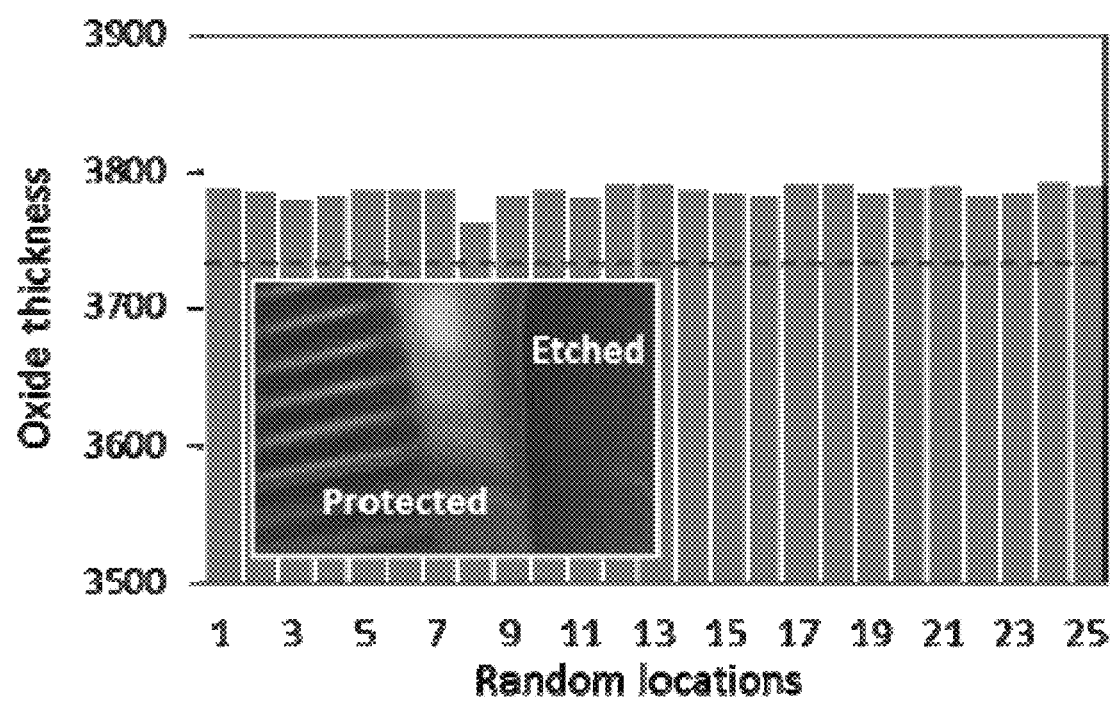

FIG. 10B plots the oxide thickness after the etching measured at random locations, with error ±10 nm. The oxide thickness refers the distance between the top surface and the bottom Si substrate of a chip. The thickness data is measured by using an optical interferometer and a 480 nm, with index of $SiO2$ is fixed 1.4594. Inset is the SEM image focusing on the etching edge.

Figure 10C:
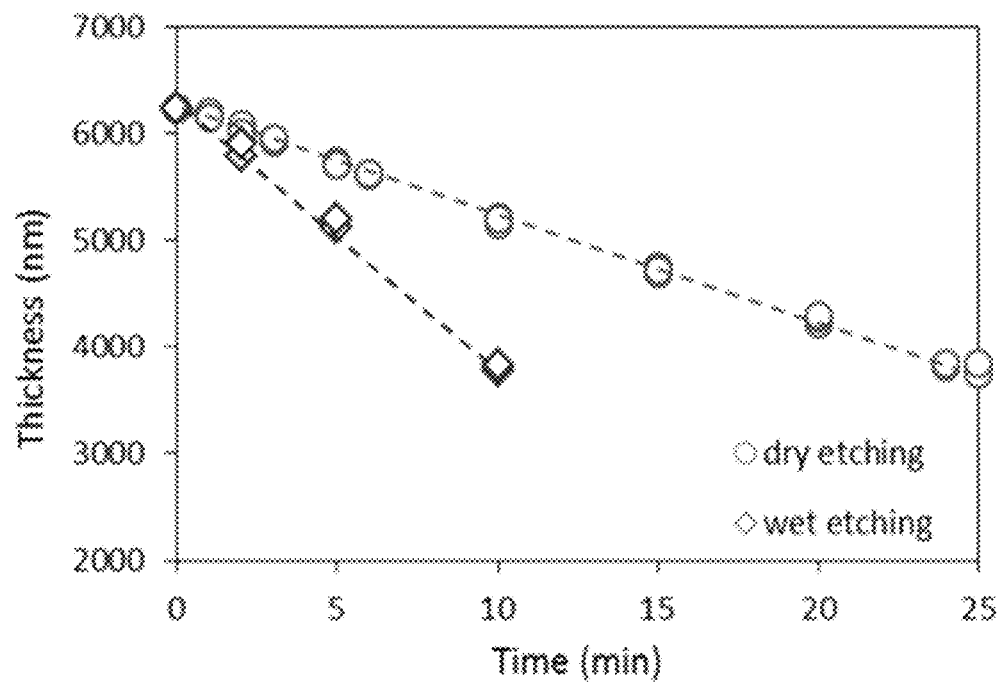
Figure 10D:
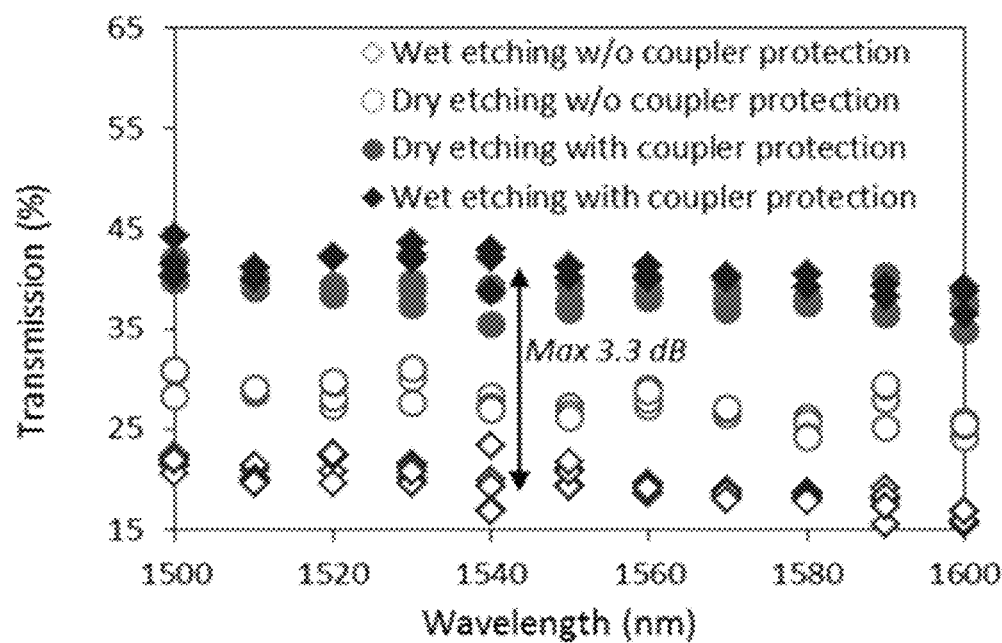

In the experiment, two etching methods were applied: dry etching (via oxygen plasma) and wet etching (via hydrofluoric acid). FIG. 10C compares the etching speed of them. When the chip is clean enough, wet etching has a smoother etched surface, while the etching depth of dry etching could be controlled more accurately. FIG. 10D compares the losses of the devices with the same etched depth ~2.5 μm, with couplers protected or not. It shows that it is possible to get etched chips of acceptable loss (<4 dB), via either dry etching or wet etching, but the coupler protection is necessary.

Figure 10E:
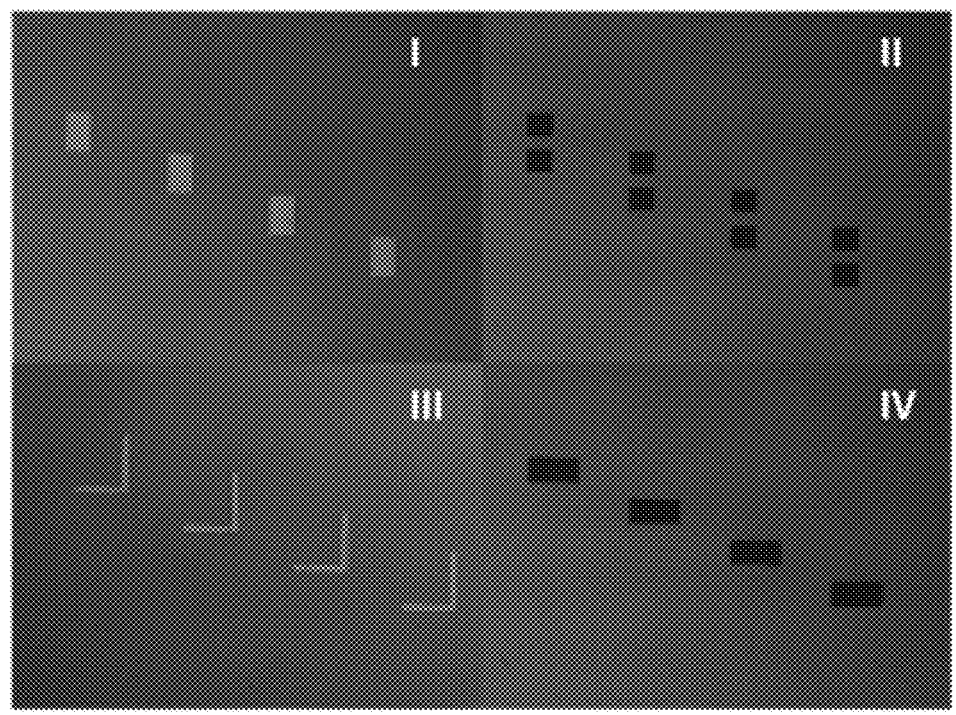
Figure 10F:
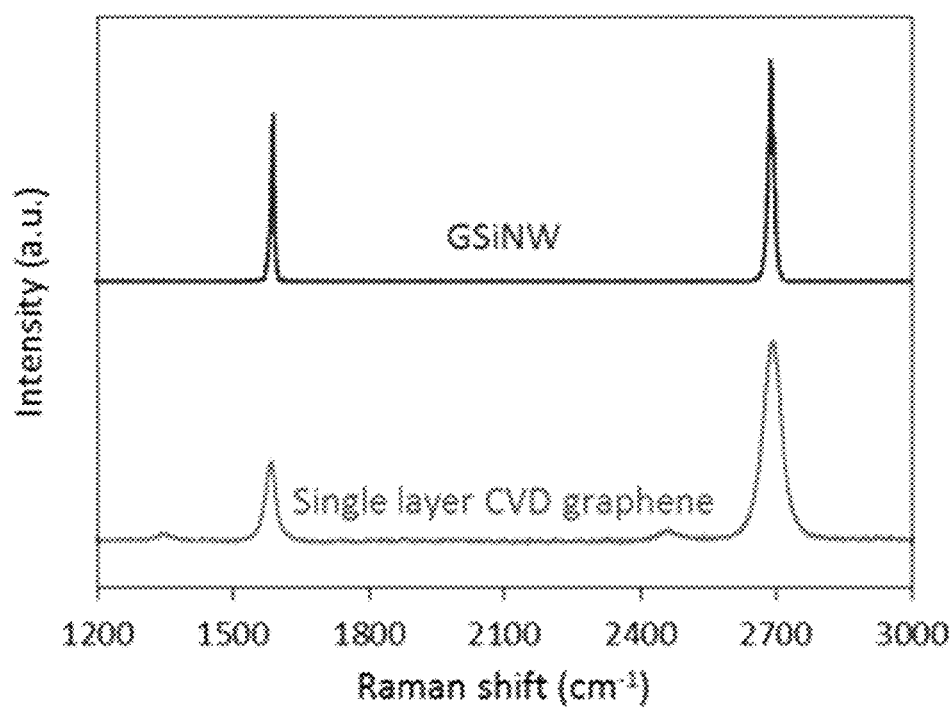

FIG. 10E provides a microscope image of the mask for the fabrication of the graphene-$Al_2O_3$-graphene structures on the silicon nitride chips. Patterns marked by I, II, III, IV are for lithography operations of the bottom layer graphene, bottom layer Au electrodes, top layer graphene, and top gate respectively. FIG. 10F illustrates measured Raman spectrum of the GSiNW. Measured by a 514 nm laser, D peak is ignorable, G peak width is ~6 $cm^{-1}$, 2D peak width is ~14. Intensity ratio of G to 2D is ~0.75. In comparison, Raman spectra of a monolayer CVD graphene, and a double layer graphene is also provided.

Experimental Arrangements

To make the weak DFG detectable well, four specific techniques are used here: (i) Both the pump and the signal are transverse magnetic (TM) polarized, maximizing the graphene-light interaction; (ii) A high power picosecond pulsed laser is applied as the pump, the maximum effective energy density in the GSiNW reaches 7 $J/cm^{-2}$, ensuring the DFG is fully excited; (iii) The CW signal is amplified to have a maximum power of 1.6 W, which can effectively pre-saturate the graphene layers, further increase the nonlinear efficiency, decrease the loss, and reduce the effect of high-power pulse induced optical modulation; and (iv) The slight change of the signal is precisely detected by a balanced photodetector (BPD), so that the original DC background of the signal is well eliminated, then the balanced signal is further filtered and accumulated (integration time 100 μs) in a lock-in amplifier, amplifying the selected signal dramatically (up to 60 dB) and suppressing white noise effectively. The bandwidth of exemplary BPD and Lock-in amplifier is hundreds kHz, hence a 100 kHz sinusoidal waveform is used to modulate the pump pulses in a slow envelope first, to make it well detectable and lockable finally.

Figure 11A:
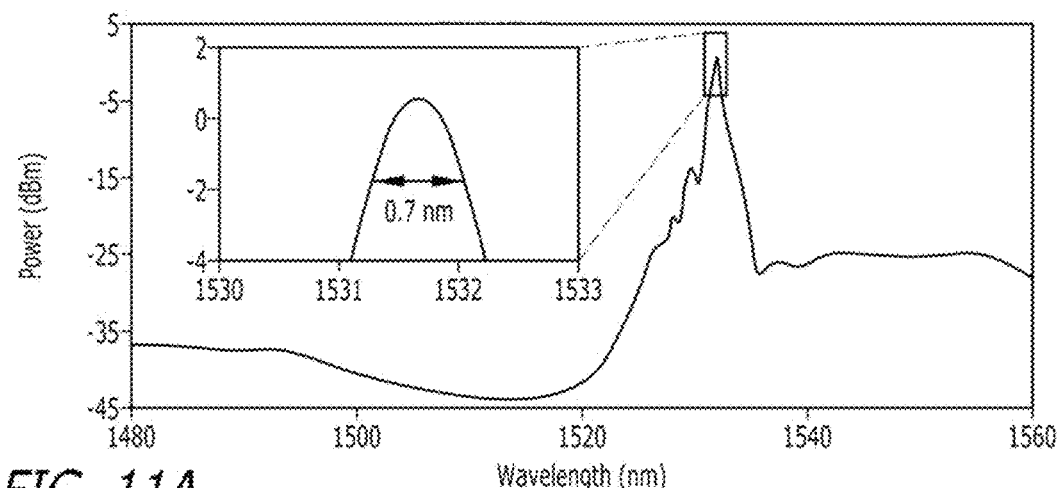
FIGS. 11A to 11E provide pump filtering and modulating data in accordance with embodiments, where 11A provides spectra of the ps pulsed pump; 11B provides the pulse width of the pulsed pump, measured using FROG; 11C provides the measured average power of the ps pulsed pump; 11D provides a temporal profile modulated by a 100 kHz sinusoidal signal, 40 MHz pulses can be found in the zoomed in figure; and 11E provides the ESA of the modulated pump of 11D, where 39 MHz peaks with 100 kHz harmonics are shown.
Figure 11B:
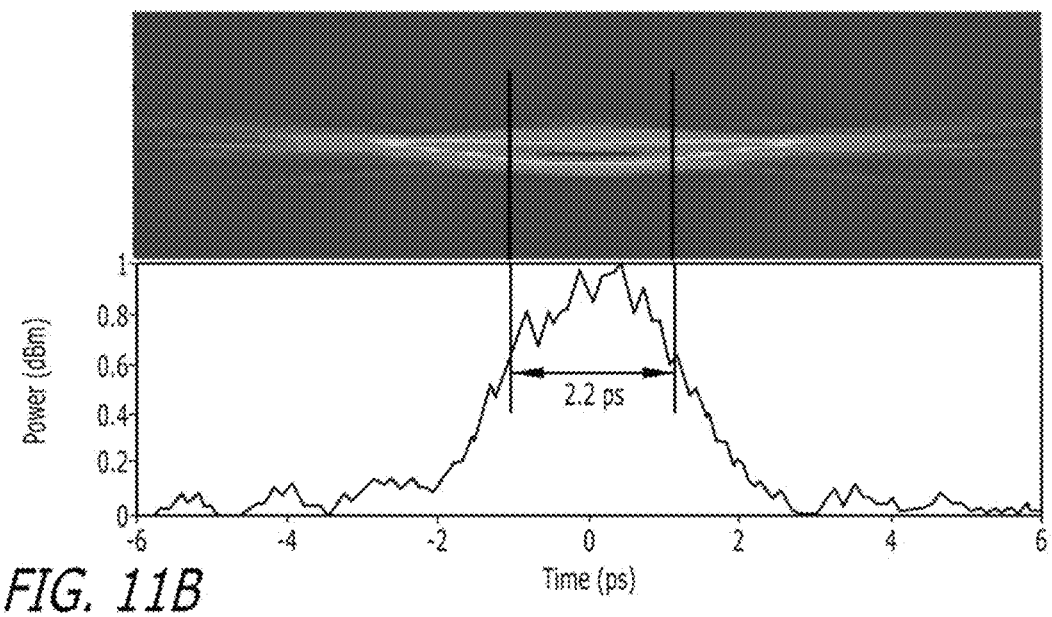
Figure 11C:
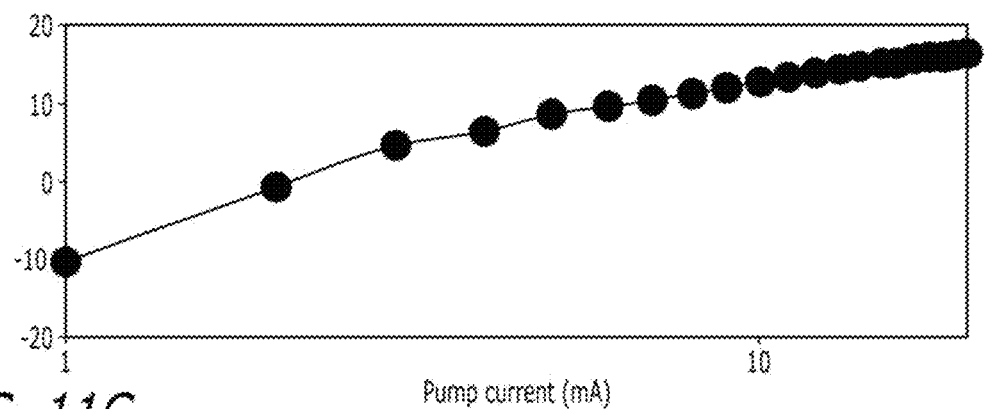
Figure 11D:
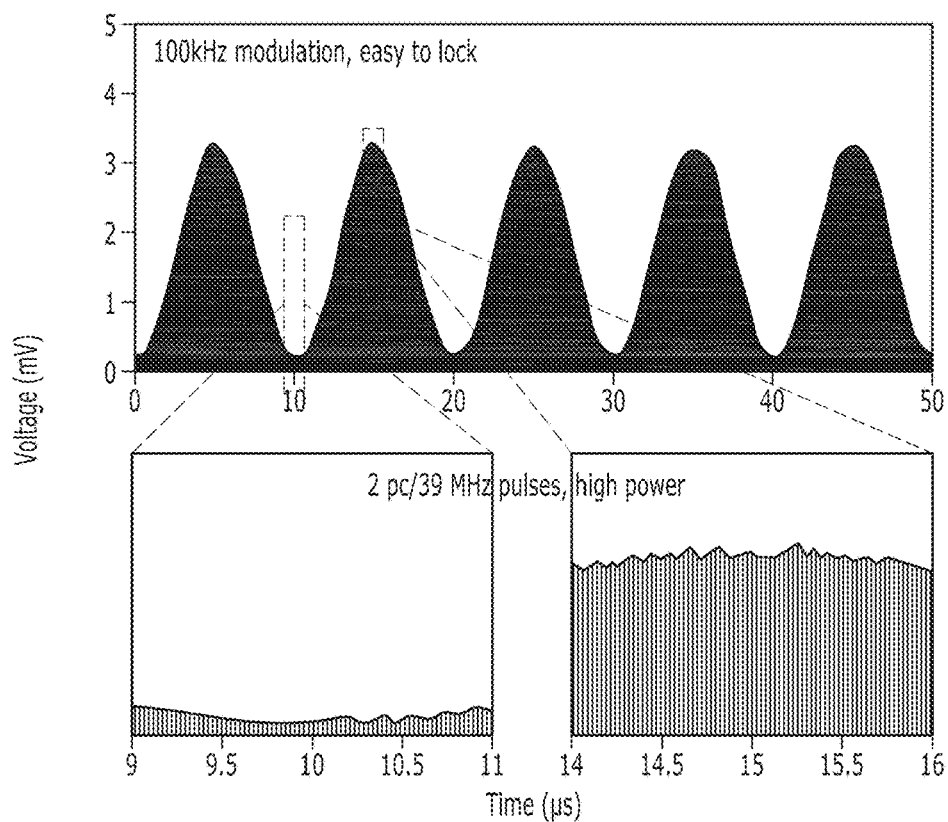
Figure 11E:
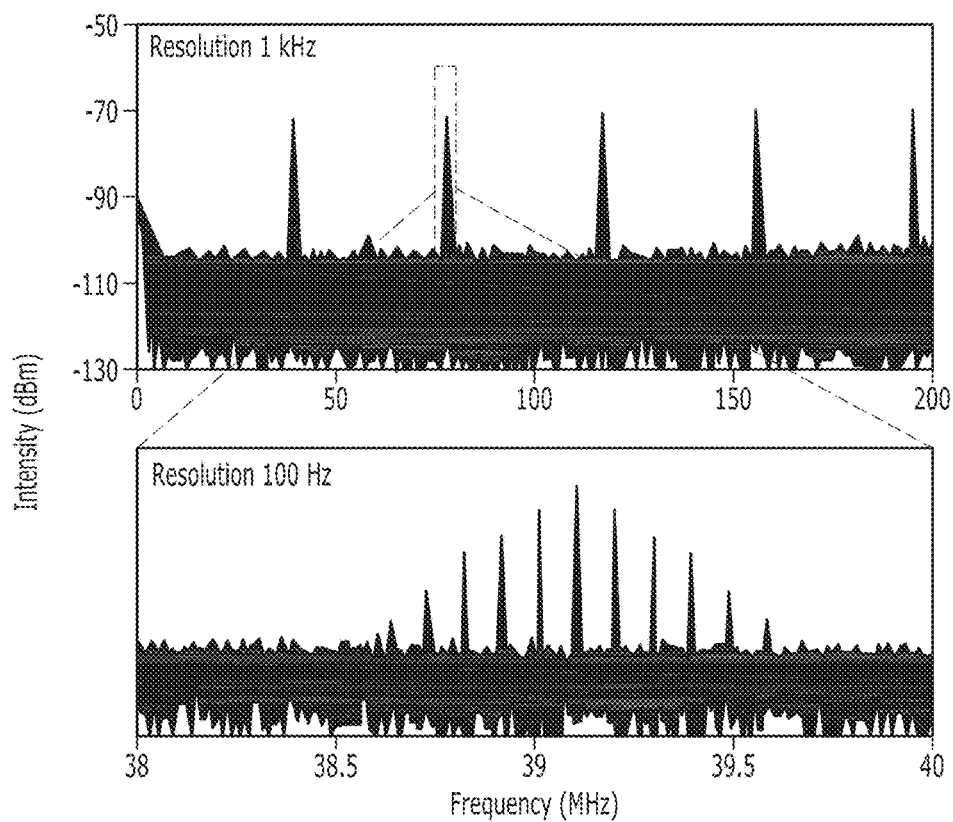

Pulsed pump and its modulation. To make the DFG nonlinear effect clear and detectable, the picosecond pulsed pump is pre-filtered and modulated. Spectrum and temporal profile of the pump light launched into the chip is demonstrated in FIGS. 11A to 11E. As FIG. 11A shows, the central wavelength of the pump is located at 1531.8 nm (195.8 THz) spectrally, and its linewidth is ~0.7 nm. FIG. 11B shows the temporal profile of a pulse of the ps laser, measured by the frequency-resolved optical gating (FROG). FWHM width of a single pulse is ~2.2 ps. FIG. 11C shows the average power of the pulsed pump measured after the filter. When increasing the current, the average power of the 1531.9 nm pulsed pump increases quasi-linearly. The maximum average power of the laser is 16.1 dBm (40.7 mW). FIG. 11D shows the modulation of the pulsed pump, which has a slow envelope (100 kHz) while keeps 40 MHz pulses inside. FIG. 11E shows the corresponding electronic spectrum.

Figure 12A:
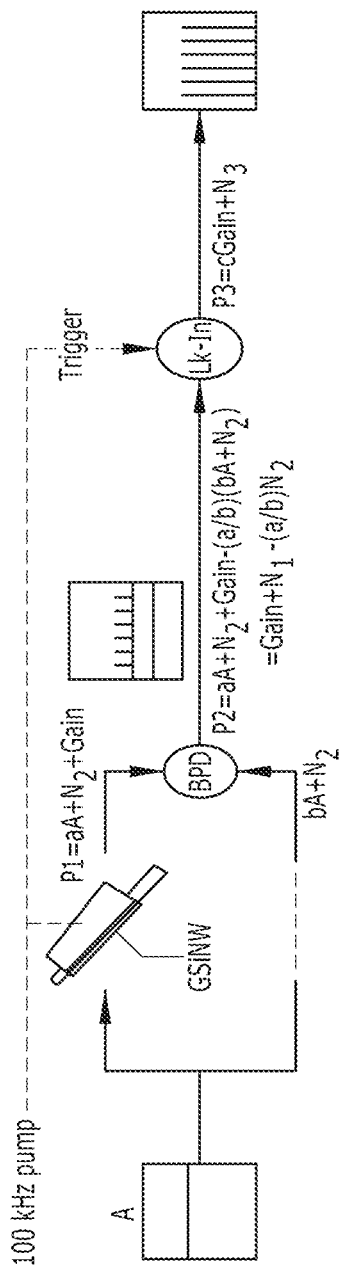
FIGS. 12A and 12B provide diagrams and data demonstrating signal balanced detecting and locked-in amplifying in accordance with embodiments, where 12A provides a technical schematic of the CW signal processing; and 12B provides comparisons: DC component (original CW light), noise, 100 kHz gain, and SNR. (Here P1,2,3 corresponds to the points in 12A).
Figure 12B:
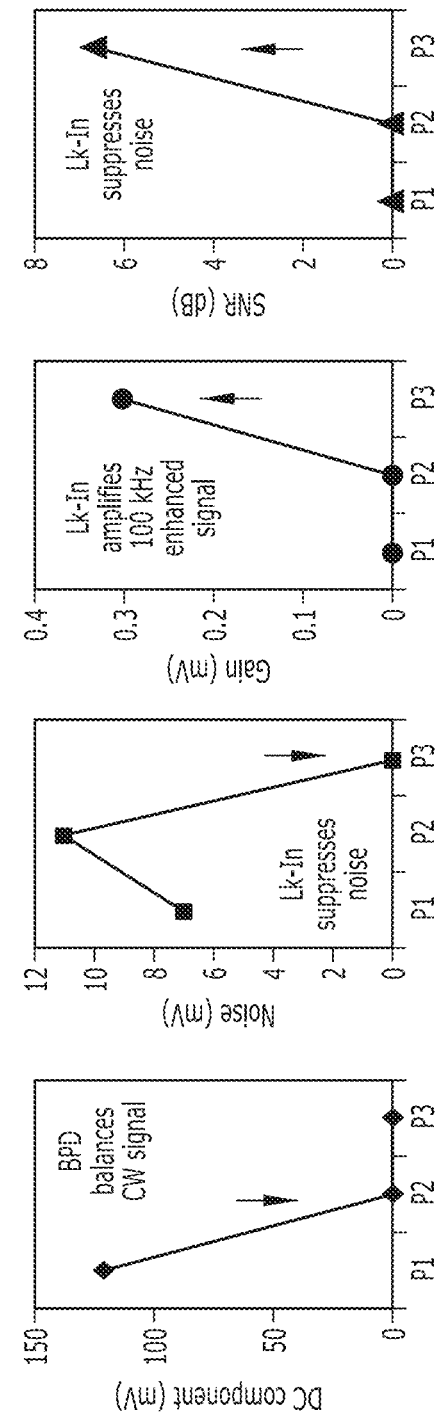

CW signal light balanced detection and locked in amplification. FIG. 12A demonstrates the idea that to detect the weak DFG (with a 100 kHz modulation) from a strong background signal (CW) schematically. A CW tunable laser with intensity A is divided to be two paths. One passes the GSiNW, while the other one is a reference. Then the DFG enhanced path with a 100 kHz gain is balanced by the reference, eliminating the CW component A. The dynamic intensity of the balanced signal is 'Gain+noise'. Sometimes, noise is stronger than gain, to extract gain from noise, we use a Lock-in amplifier, which could be regarded as an electronic 'Filter+Averager+Amplifier'. Only the gain with 100 kHz frequency is locked and amplified, and all the noises are suppressed. Here, $N_{1,2,3}$ means noises, while a, b, c are attenuation/amplification factors. Accordingly, FIG. 9b compares the measured intensities of CW signal (the DC component), the noise, the new generated signal (from the DFG process, with 100 kHz oscillation), and the SNR before the BPD (P1), after the BPD (P2), and after the lock-in amplifier (P3). FIG. 12B demonstrates that the BPD is primarily used for DC balancing, while the lock-in amplifier is applied to lock and dramatically amplify the 100 kHz gain.

Figure 13A:
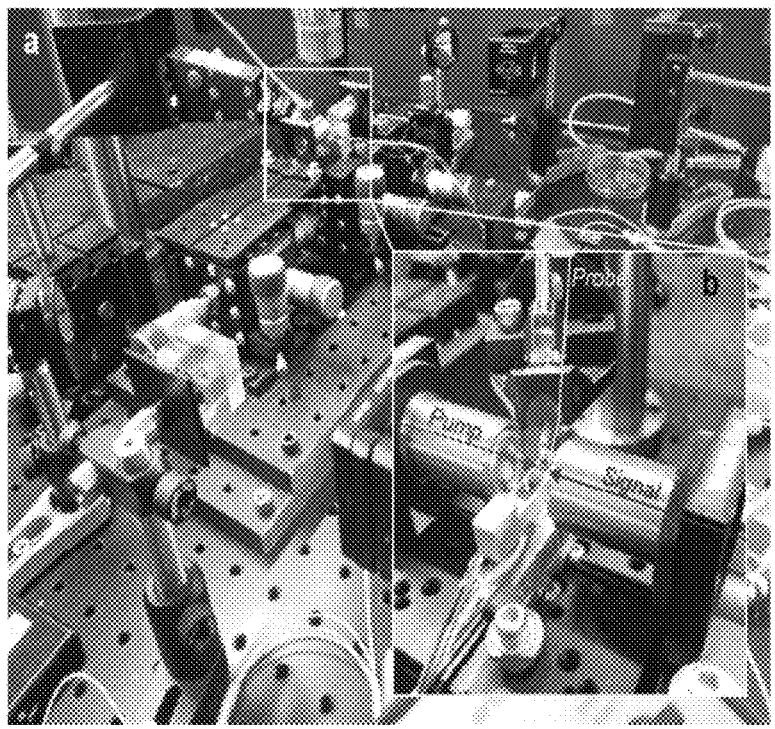
FIGS. 13A to 13C provide signal balanced detecting and locked-in amplifying diagrams and data in accordance with embodiments, where 13A and inset provide images of exemplary gating of the graphene based semiconductor chip; 13B provides an image of a hysteresis loop of the GSiNW; and 13C provides data plots of a hysteresis loop, $V_G$ that increases from −4 V to 4 V then decreases back.
Figure 13B:
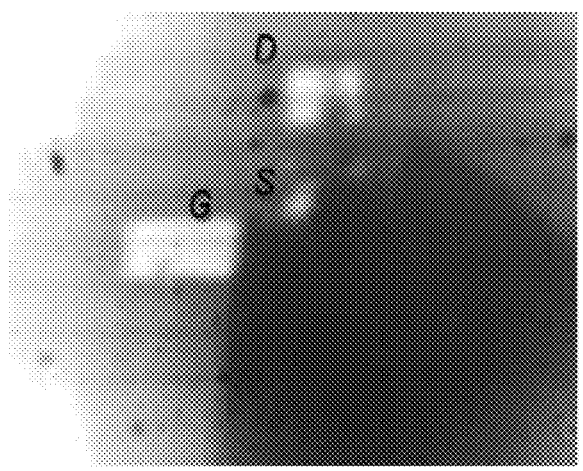
Figure 13C:
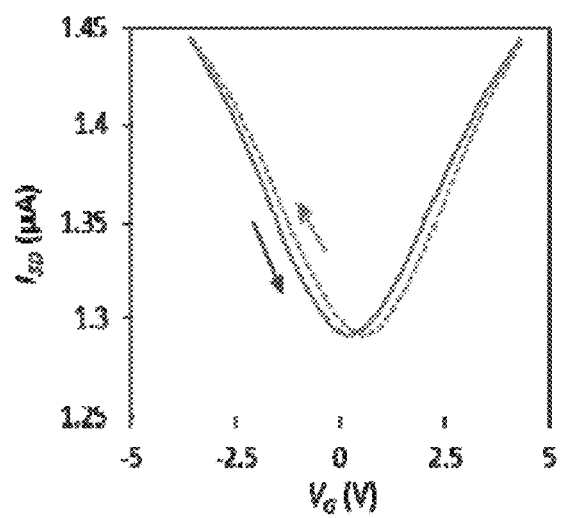

Gating the graphene based semiconductor chip. FIG. 13A shows the picture of an exemplary optoelectronic setup. FIGS. 13B and 13C show the operation to gate the GSiNWs on chip, by using micro-probes. In the experiment, a stable power supplier (tuning range ±4 V, accuracy 10 mV) is applied as the $V_G$ provider. FIG. 13D illustrates the hysteresis loop of the GSiNW, by using $V_{SD}$=10 mV. When $V_G$~0.25 V, bottom layer graphene approaches Dirac point.

Measured Results

Figure 14A:
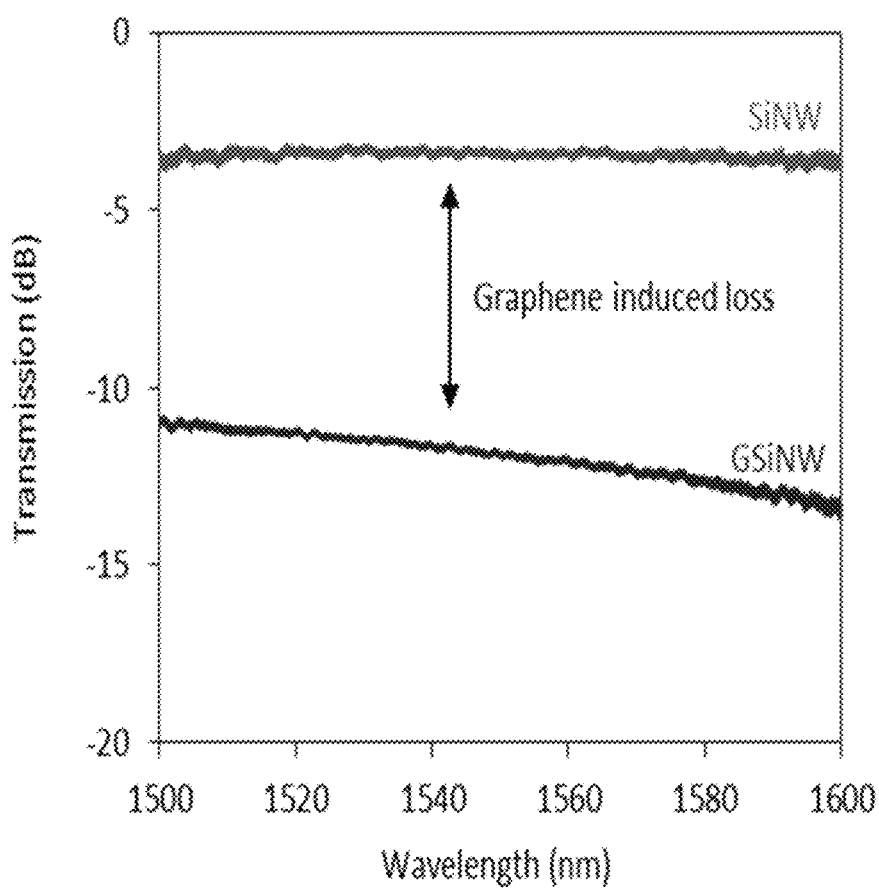
FIGS. 14a and 14b provide data from transmission measurements in accordance with embodiments, where 14A provides a continuous-wave signal transmissions: silicon nitride waveguide (SiNW) without graphene layers and the GSiNW; and 14B provides data points of when pump and signal varies their polarizations, only TM-TM could generate DFG based plasmon on graphene.
Figure 14B:
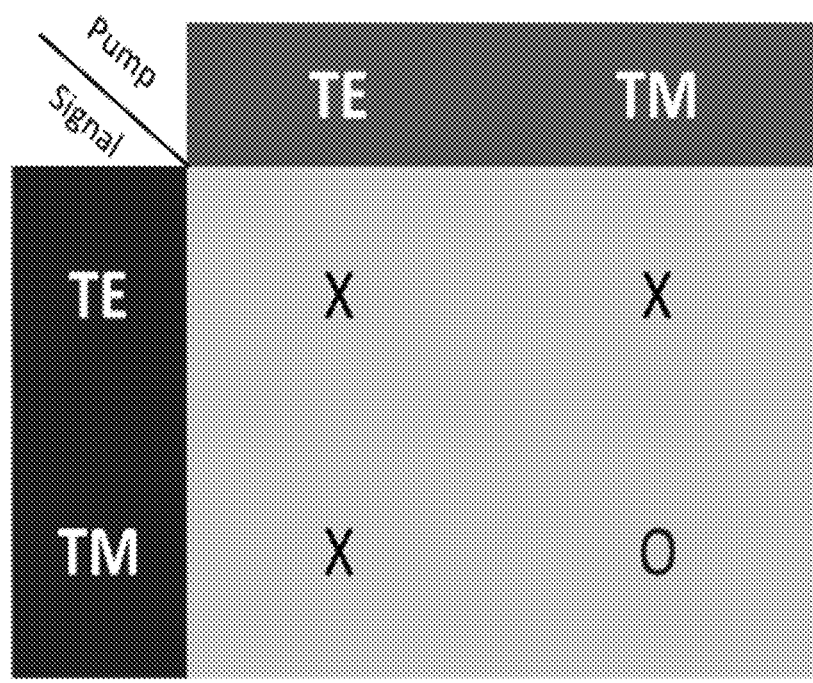

Transmission of the GSiNW. FIG. 14A demonstrates the 1500 nm~1600 nm spectral transmission of a GSiNW, before and after covering the graphene-$Al_2O_3$-graphene hybrid layer. Here the transmission of the nitride waveguide before etching is normalized as 0 dBm, and the launched power is ~1 mW (much lower than saturated threshold). Because of the etching, ~3.4 dB insertion loss is induced due to the evanescent field scattering. Afterwards, graphene coverage brings additional loss due to its broadband optical absorption. As the curve shows, loss of a higher frequency might be lower, due to its better mode field confinement. In details, graphene induced loss is ~7.3 dB at 1500 nm (0.09 dB/pm), ~8.3 dB at 1550 nm (0.1 dB/μm), and ~9.5 dB at 1600 nm (~0.12 dB/μm). FIG. 14B shows the situations if the polarization of the pump and signal changes, the DFG could be detected or not. It is obvious that only both the pump and signal are of TM polarization, DFG could be excited.

Figure 15A:
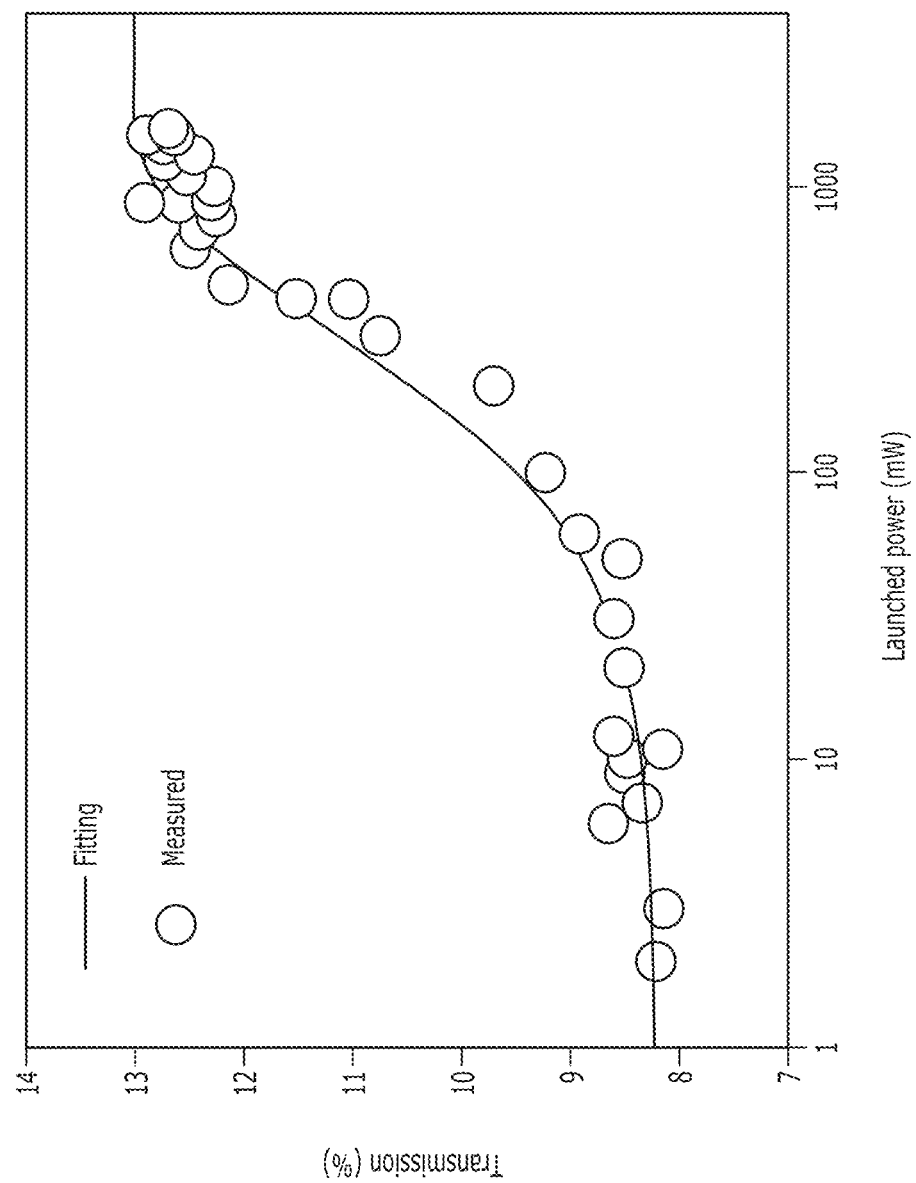
FIGS. 15A to 15C provide data plots of the saturable absorption induced modulation in accordance with embodiments, where 15A provides saturable absorption of the GSiNW; 15B provides the modulated signal; and 15C provides the modulation enhanced 100 kHz signal, amplified by the lock-in amplifier, when the CW signal itself is 1 W, 1.2 W and 1.4 W.
Figure 15B:
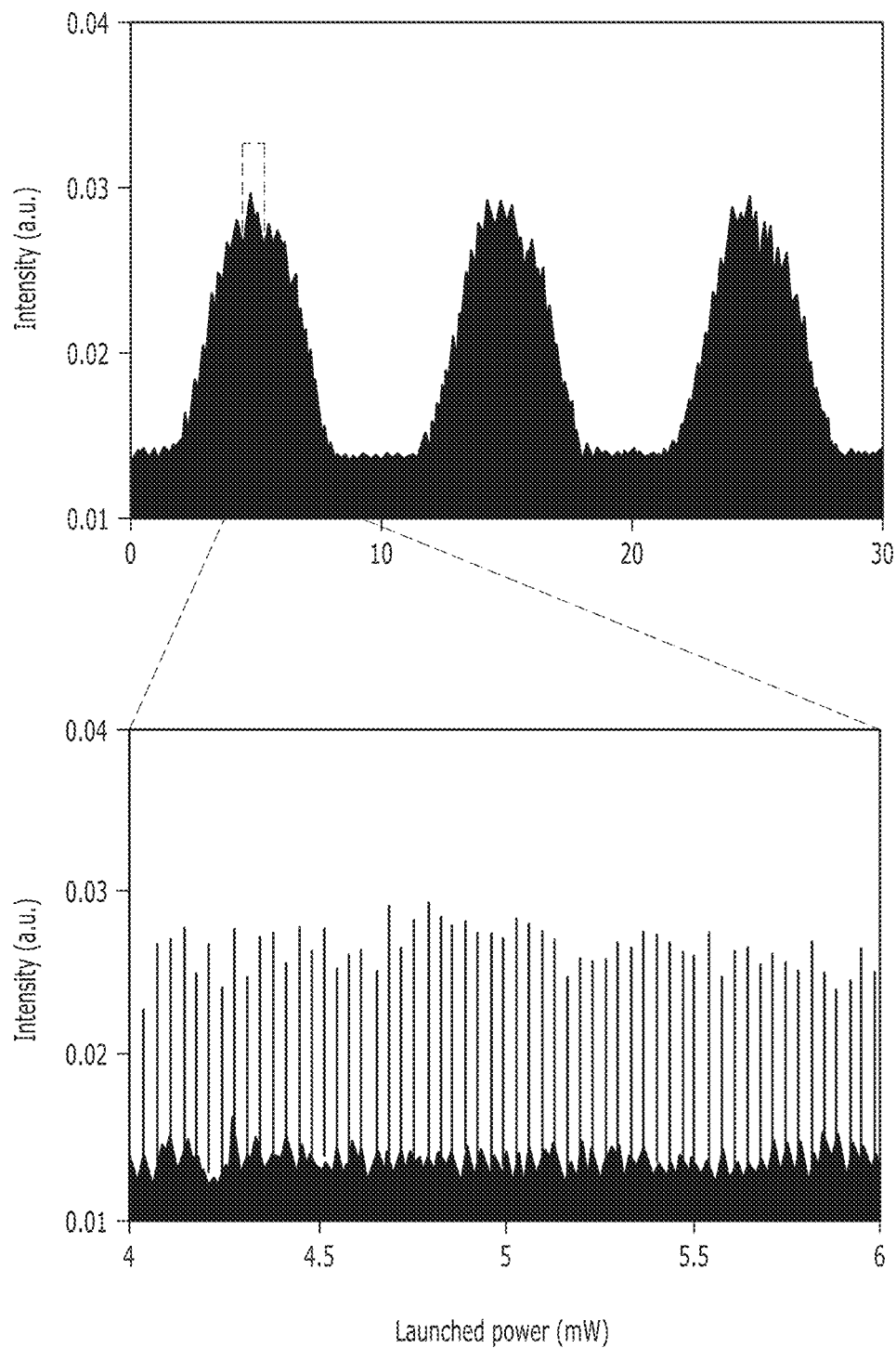
Figure 15C:
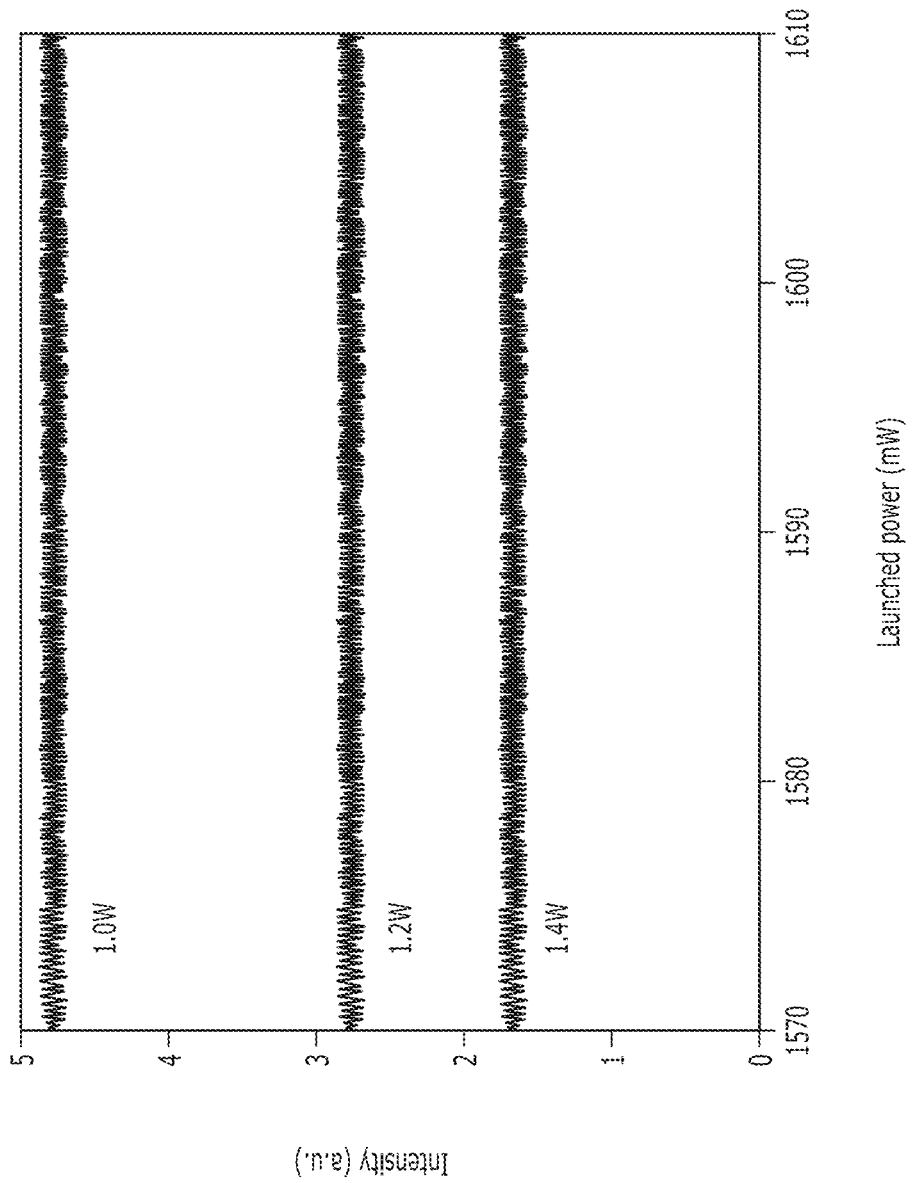

Pre-saturation of the GSiNW by using CW signal. FIG. 15A plots the correlation of launched power and transmission, of 4 GSiNW samples. Here the dots are the measured result while the curve is a fitting, the grey region along the curve provides the noise width. Saturable absorption of the GSiNW starts from ~100 mW (20 $MW/cm^2$), and the GSiNW is almost fully saturated when launched power is over 1 W (0.2 $GW/cm^2$). Saturable absorption induced transmission increase is ~5%. Because of the saturable absorption, high power pulsed pump can modulate the low power CW signal. FIG. 15B shows the modulated CW signal measured after the BPD. Here the launched power of the CW signal is 1 mW, the launched pump is 32 mW. The modulated CW is of the same temporal profile and the same repetition rate of the pulsed pump. Hence, the lock-in amplifier cannot filter off the modulation induced signal enhancement. That means, after the lock-in amplifier, the background of the enhanced signal spectrum is not 0. For pristine graphene, it can be 3 orders larger than the DFG based enhancement. When the modulation is too large, it might saturate the detector, resulting that the DFG enhanced peak undetectable. To suppress this modulation, it is possible to use high power CW signal to pre-saturate the graphene layers. FIG. 15C shows the lock-in amplified signals, by using CW laser with power of 1.2 W, 1.4 W and 1.6 W.

Figure 16A:
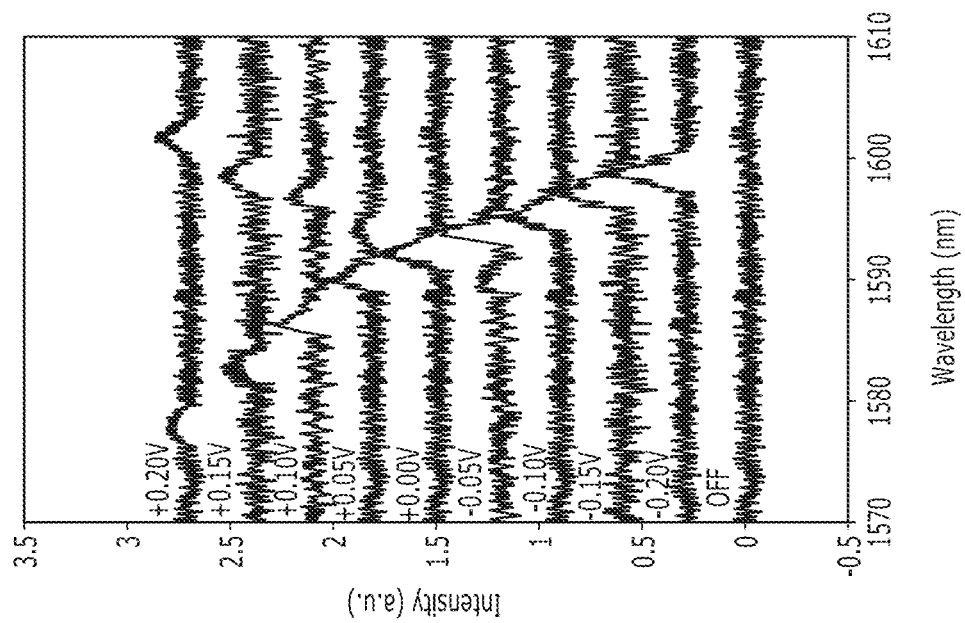
FIGS. 16A and 16B provide data plots of measured spectra in accordance with embodiments, where 16A provides enhanced peaks for −0.7 V to −0.3 V; and 16B provides enhanced peaks for −0.2 V to +0.2 V, where the grey curve is the background illustrating noise intensity ~±0.05 a.u.
Figure 16B:
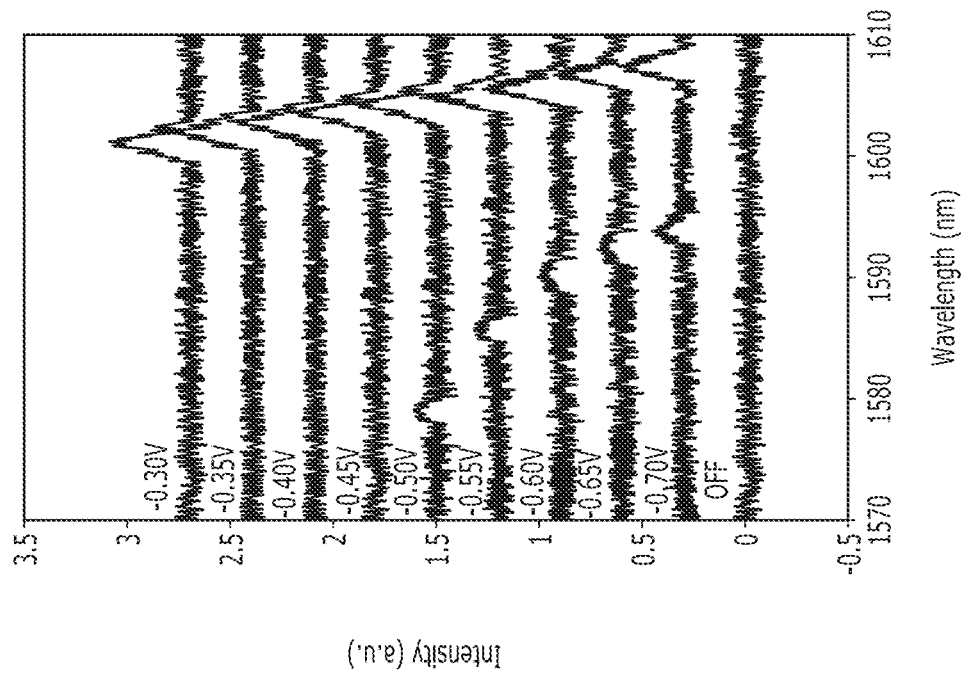

Spectral demonstration of the enhanced signals. Several selected spectra of enhanced signal, under $V_G$ of −0.7 V~−0.3 V and −0.2 V~0.2 V are provided in FIGS. 16A and 16B. In these spectra, parameters such as peak locations, intensities, linewidths, and signal-to-noise-ratio are estimated accordingly.

Figure 17:
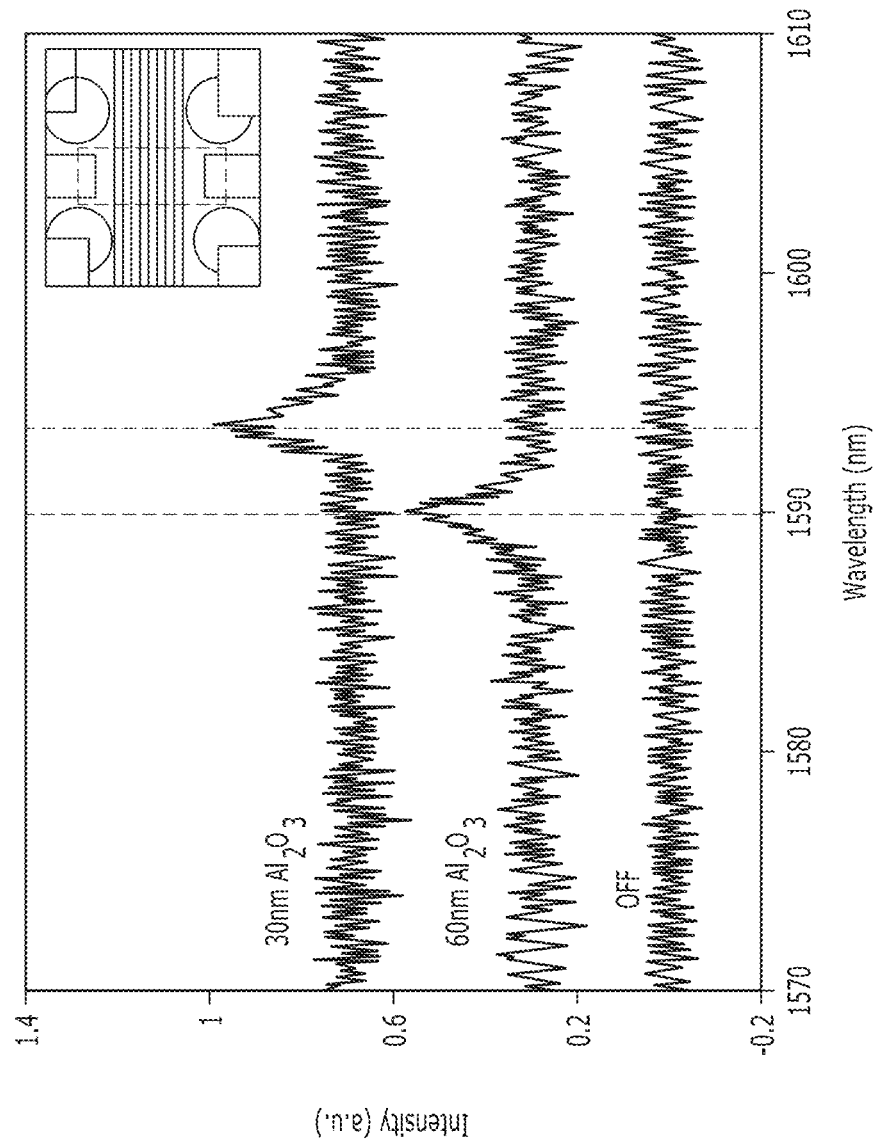
FIG. 17 provides enhanced spectra in accordance with embodiment, with: pump off; GSiNW with 30 m thick $Al_2O_3$; GSiNW with 60 nm thick $Al_2O_3$, and where the Inset provides an image of the GSiNW with 60 nm thick $Al_2O_3$.

DFG enhanced signal of a GSiNW with 60 nm thick $Al_2O_3$. Thickness of the $Al_2O_3$ layer not only determines the $V_G$-$I_{SD}$ curve of the graphene-$Al_2O_3$-graphene transistor, but also influences the plasmon coupling. FIG. 17 shows the DFG enhanced signal at $V_G$=0 V, when thickness of the $Al_2O_3$ is 60 nm. Compared to the GSiNW with 30 nm thick $Al_2O_3$ (blue curve, peak location 1593.7 nm, $f_{SP}$=7.4 THz), the GSiNW with 60 nm thick $Al_2O_3$ (red curve) has a peak location at 1589.9 nm, hence $f_{SP}$=7.1 THz. There is little plasmon coupling in a 60 nm graphene-$Al_2O_3$-graphene system.

Figure 18A:
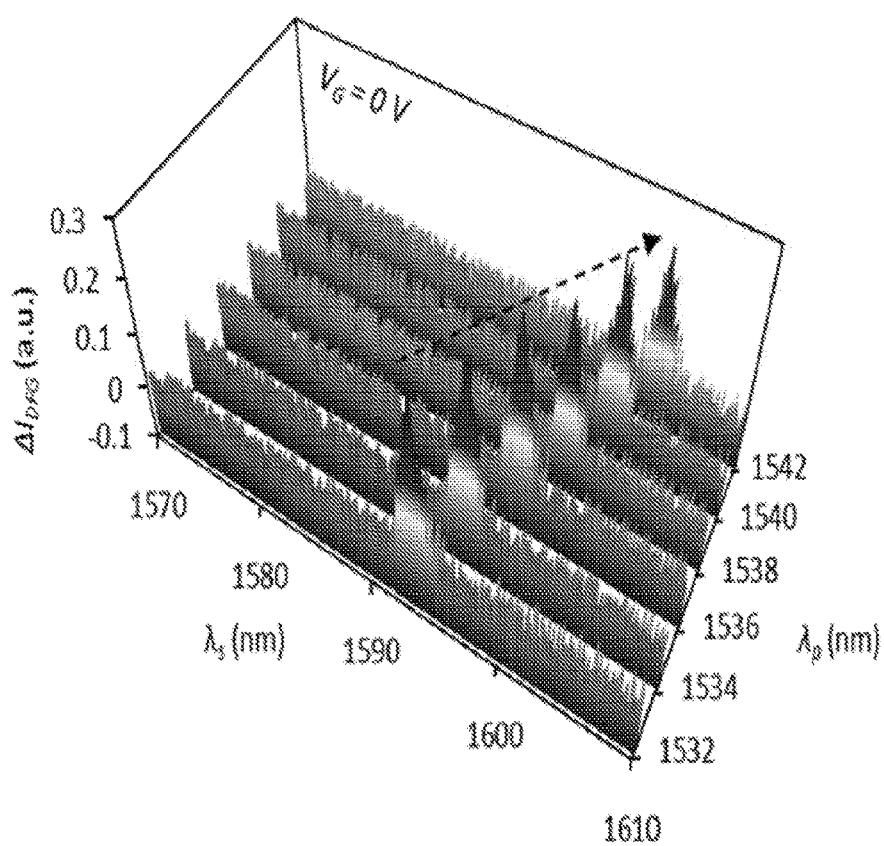
FIGS. 18A and 18B provide tuning pump frequencies in accordance with embodiments, where 18A provides a spectra of the enhanced signal, when $\lambda_p$ changes from 1532 nm to 1542 nm; and 18B provides a map of the '$\lambda_p$-$\lambda_s$' correlation when $\lambda_p$ is 1532 nm, $f_{SP}$ is ~7.5 THz, when $\lambda_p$ is 1542 nm, $f_{SP}$ turns to be ~7.4 THz.
Figure 18B:
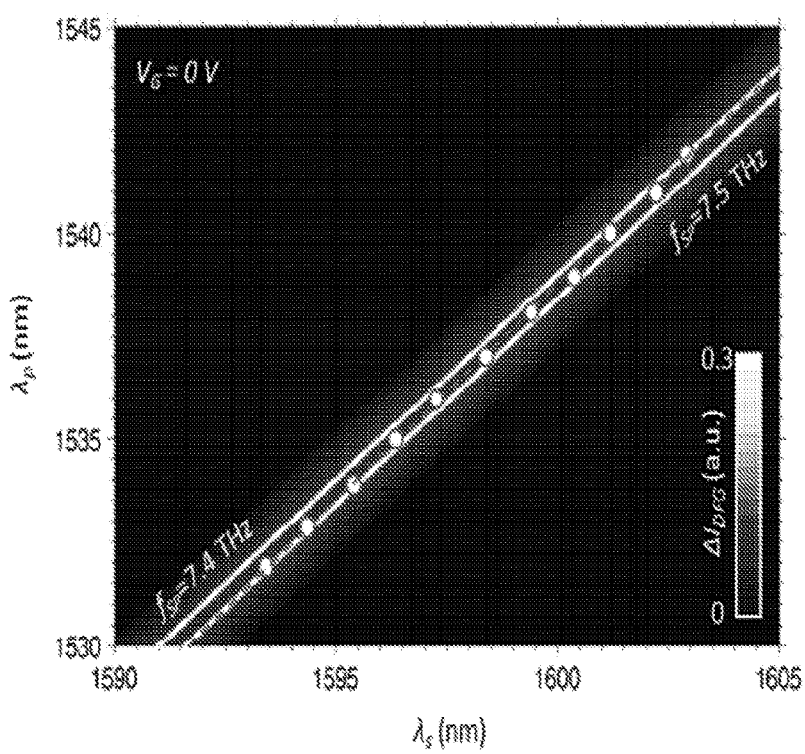

Measurement of the plasmons with pump frequency tuning. As FIGS. 18A and 18B show, the enhanced signal peak locations A changes from 1593.2 nm to 1603 nm (188.3 THz to 187.2 THz), with $\lambda_p$ changes from 1532 nm to 1542 nm (195.8 THz to 194.6 THz). During this process, $f_{SP}$ decreases from 7.5 THz to 7.4 THz. The trace of the $f_{SP}$ follows the graphene plasmonic dispersion well, as the main text demonstrates clearly.

Analysis: Plasmon Generation Via Backward $X^{(2)}$ Nonlinearity

Embodiments of detailed theoretical analysis are also provided. These analysis include the dispersion of the silicon nitride waveguides, phase matching conditions on the GSiNWs, graphene index modulation, DFG process and efficiency, and double-layer graphene plasmonic couplings.

Figure 19A:
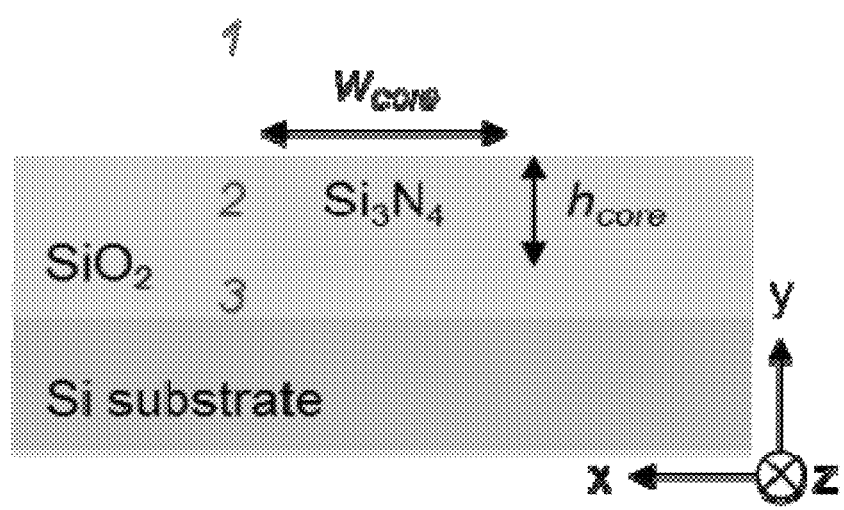
Figure 19B:
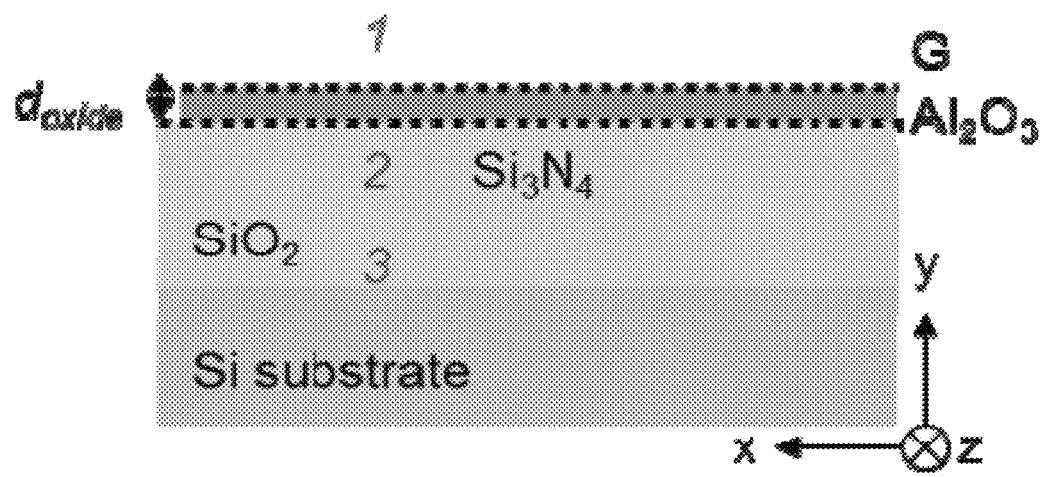
Figure 19C:
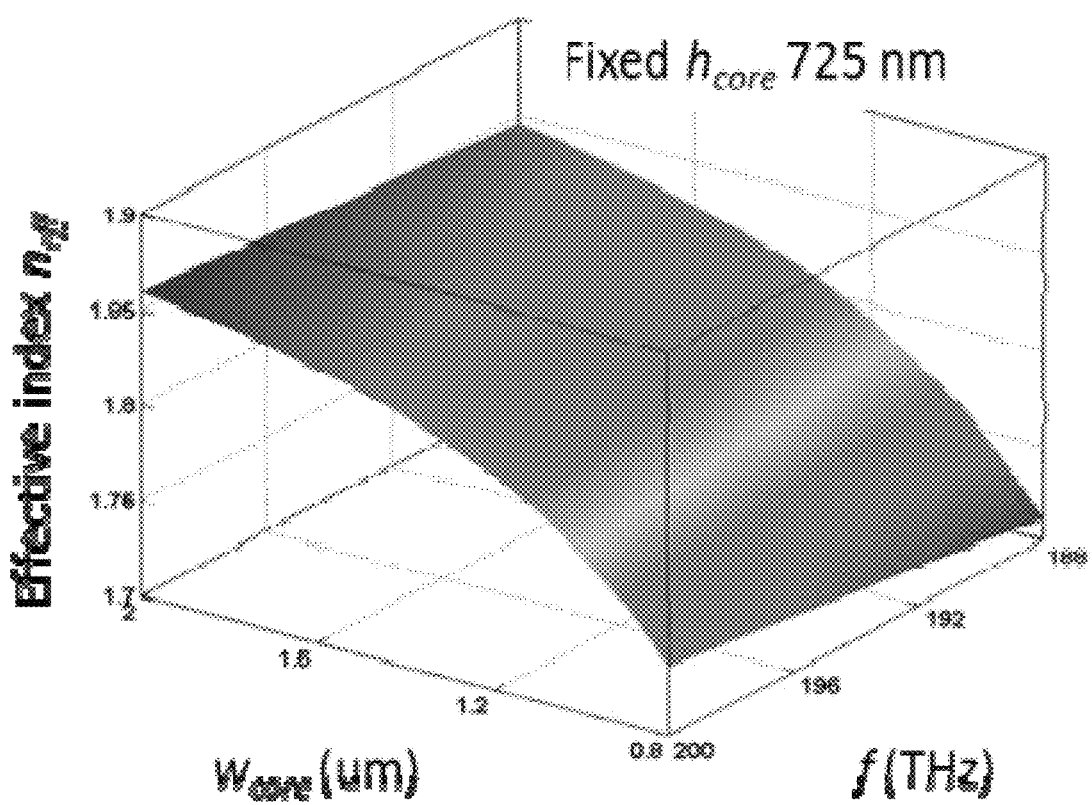

Graphene based light interaction enhancement. Sectional views of a conventional silicon nitride waveguide (without graphene) and a double layer graphene based silicon nitride waveguide are shown in FIGS. 19A and 19B. By using finite element method (FEM) via commercial software COMSOL, it can be shown that the effective index dispersion of the TM fundamental mode in graphene based silicon nitride waveguide in FIG. 19C. Here the index of silicon nitride material ranges from 1.9886 to 1.9904 (188 THz to 200 THz) (Eq. 5), the index of $SiO_2$ cladding is fixed at 1.4462, and the index of air is 1. By referring the optical waveguide theory and solving the Helmholtz's Eq. 6, the fields of the TM fundamental mode transmitting along the waveguide could be written as:

$$B_x = \begin{cases} B_1 e^{ik_z t}\cos\left(\frac{k_2 h_{core}}{2}-\varphi\right)\exp k_1\left(\frac{h_{core}}{2}-y\right), & y > \frac{h_{core}}{2} \\ B_2 e^{ik_z t}\cos(k_2 y - \varphi), & -\frac{h_{core}}{2} < y < \frac{h_{core}}{2} \\ B_3 e^{ik_z t}\cos\left(\frac{k_2 h_{core}}{2}+\varphi\right)\exp k_3\left(\frac{h_{core}}{2}+y\right), & y < -\frac{h_{core}}{2} \end{cases} \quad \text{(EQ. 5)}$$

-continued $$E_y = \begin{cases} \frac{ick_1B_1}{\omega\epsilon_1}e^{ik_zt}\cos\left(\frac{k_2h_{core}}{2}-\varphi\right)\exp k_1\left(\frac{h_{core}}{2}-y\right), y > \frac{h_{core}}{2} \\ \frac{ick_2B_2}{\omega\epsilon_2}e^{ik_zt}\cos(k_2y-\varphi), -\frac{h_{core}}{2} < y < \frac{h_{core}}{2} \\ -\frac{ick_3B_3}{\omega\epsilon_3}e^{ik_zt}\cos\left(\frac{k_2h_{core}}{2}+\varphi\right)\exp k_3\left(\frac{h_{core}}{2}+y\right), y < \frac{h_{core}}{2} \end{cases} \quad \text{(EQ. 6)}$$

Here the thickness of the graphene-$Al_2O_3$-graphene (~60 nm) is ignorable for a media mode with wavelength of 1550 nm. $B_{1,2,3}$ are the maximum magnetic field intensities in air, core and $SiO_2$ under the core, $k_2^2+k_z^2=\epsilon_2(\omega/c)^2$, $-k_1^2+k_z^2=\epsilon_1(\omega/c)^2$, $-k_3^2+k_z^2=\epsilon_3(\omega/c)^2$ are the propagation constants. $\epsilon_1, \epsilon_2, \epsilon_3$ are the permittivity of the zone 1, 2, and 3, respectively. In details, $\epsilon_{1,2,3}=n_{1,2,3}^2$. $\varphi$ is the phase constant, $\omega=2\pi f$ is the frequency. For the propagation mode, the propagation constant $k_y$ satisfies:

$$\tan(k_yh_{core}) = \left(\frac{k_y}{\epsilon_2}\frac{k_1}{\epsilon_1}+\frac{k_y}{\epsilon_2}\frac{k_3}{\epsilon_3}\right)\left(\frac{k_y}{\epsilon_2}\frac{k_y}{\epsilon_2}-\frac{k_1}{\epsilon_1}\frac{k_3}{\epsilon_3}\right) \quad \text{(EQ. 7)}$$

$$\tan(2\varphi) = \left(\frac{k_y}{\epsilon_2}\frac{k_3}{\epsilon_3}-\frac{k_y}{\epsilon_2}\frac{k_1}{\epsilon_1}\right)\left(\frac{k_y}{\epsilon_2}\frac{k_y}{\epsilon_2}+\frac{k_1}{\epsilon_1}\frac{k_3}{\epsilon_3}\right) \quad \text{(EQ. 8)}$$

Because the graphene is of considerable index ng and conductivity σg, it can dramatically modulate the boundary conditions. Referring the electromagnetic boundary conditions on the double layer graphene layer:

$$\epsilon_1E_1-\epsilon_2E_2=\rho_g, B_1-B_2=\sigma_gE_2 \quad \text{(EQ. 9)}$$

Here $\rho_g>0$ and $\sigma_g>0$ are the surface charge and conductivity of the layer. Compared to the waveguide without graphene coverage, the light-graphene interaction along the graphene based silicon nitride waveguide could be dramatically enhanced. Referring $z \to \infty$, the simulated electric field distributions of $E_y$ for the silicon nitride waveguides without graphene and for the graphene based silicon nitride waveguides are shown in FIGS. 19D and 19E. After covering a graphene-$Al_2O_3$-graphene layer (0.4 nm+30 nm+0.4 nm), more energy distributes in evanescent field, the mode effective indexes decrease.

Phase matching in the DFG based plasmon generation. In the DFG based plasmon generation, energy converts from a pump photon ($f_p$ in C band) to a signal photon ($f_s$ in C band) and a plasmon ($f_{SP}$ in THz band). During this process, momentums are conserved. Thus, we write the phase matching condition as:

$$hf_s+hf_{SP}=hf_p, \vec{k_s}+\vec{k_{sp}}=\vec{k_p} \quad \text{(EQ. 10)}$$

In this equation, h is the Planck constant, $k_s$, $k_{spp}$ and $k_p$ are the wave vectors of the signal, plasmon and pump. In optics, $k=2\pi/\lambda=2\pi n_{eff}cT=2\pi fn_{eff}/c$, here $n_{eff}$ is the effective index, c is the light speed in vacuum. Referring the geometry (the pump and the signal are of opposite directions), we rewrite Eq. 10 to be:

$$\begin{cases} f_sn_s - f_{SP}n_{SP} = -f_pn_p \\ f_s + f_{SP} = f_p \end{cases} \quad \text{(EQ. 11)}$$

Here $n_p$, $n_s$, and $n_{SP}$ are the effective indexes of the pump light, signal light, and the plasmon, respectively. To satisfy the equation, $f_p$, $f_s$ and $n_{SP}$ should be selected and adjusted carefully:

$$\frac{f_s}{f_p} = \frac{n_{SP}-n_p}{n_{SP}+n_s}, n_{SP} > n_p \quad \text{(EQ. 12)}$$

In the experiment, $f_p$ is fixed at 195.8 THz (1531.9 nm). The effective index of the silicon-nitride waveguide at $f_p$ is $n_p \sim 1.77$ (waveguide with $w_{core}=1.3$ μm, $h_{core}=0.725$ μm). On the other side, $f_p$ scans from 192.3 THz to 177.5 THz (1560 nm to 1690 nm). The effective index $n_s$ distributes in range of ~1.77 to ~1.75. The index of graphene $n_g=n_{g,r}+in_{g,i}$ plays the key role in this equation, One can derive $n_g$ from $\sigma_g$, as:

$$\sigma_g(f,\mu,\tau,T) = \sigma_{g,intra} + \sigma_{g,inter} = \quad \text{(EQ. 13)}$$
$$\frac{ie^2(2\pi f - i/\tau)}{\pi\hbar^2}\left\{\frac{1}{\left(2\pi f+\frac{i}{\tau}\right)^2}\int_0^\infty \epsilon\left[\frac{\partial f_d(\epsilon)}{\partial \epsilon}-\frac{\partial f_d(-\epsilon)}{\partial \epsilon}\right]d\epsilon - \int_0^\infty\left[\frac{f_d(-\epsilon)-f_d(\epsilon)}{(2\pi f+i/\tau)^2-4(\epsilon/\hbar)^2}\right]d\epsilon\right\}$$

Specifically:

$$\sigma_{g,intra} = \frac{ie^2\mu}{\pi\hbar\left(2\pi f+\frac{i}{\tau}\right)} \quad \text{(EQ. 14)}$$

$$\sigma_{g,inter} = \frac{ie^2\mu}{4\pi\hbar}\ln\left[\frac{2|\mu|-\hbar\left(2\pi f+\frac{i}{\tau}\right)}{2|\mu|+\hbar\left(2\pi f+\frac{i}{\tau}\right)}\right] \quad \text{(EQ. 15)}$$

Hence:

$$\epsilon_g = \frac{-\sigma_{g,i}+i\sigma_{g,r}}{2\pi f\Delta} \quad \text{(EQ. 16)}$$

$$(n_{g,r}+in_{g,i})^2 = \epsilon_{g,r}+i\epsilon_{g,i} \quad \text{(EQ. 17)}$$

$$n_{g,r} = sqrt\left(\frac{-\epsilon_{g,r}+\sqrt{\epsilon_{g,r}^2-\epsilon_{g,i}^2}}{2}\right), \quad \text{(EQ. 18)}$$

$$n_{g,i} = sqrt\left(\frac{-\epsilon_{g,r}+\sqrt{\epsilon_{g,r}^2-\epsilon_{g,i}^2}}{2}\right)$$

Figure 20A:
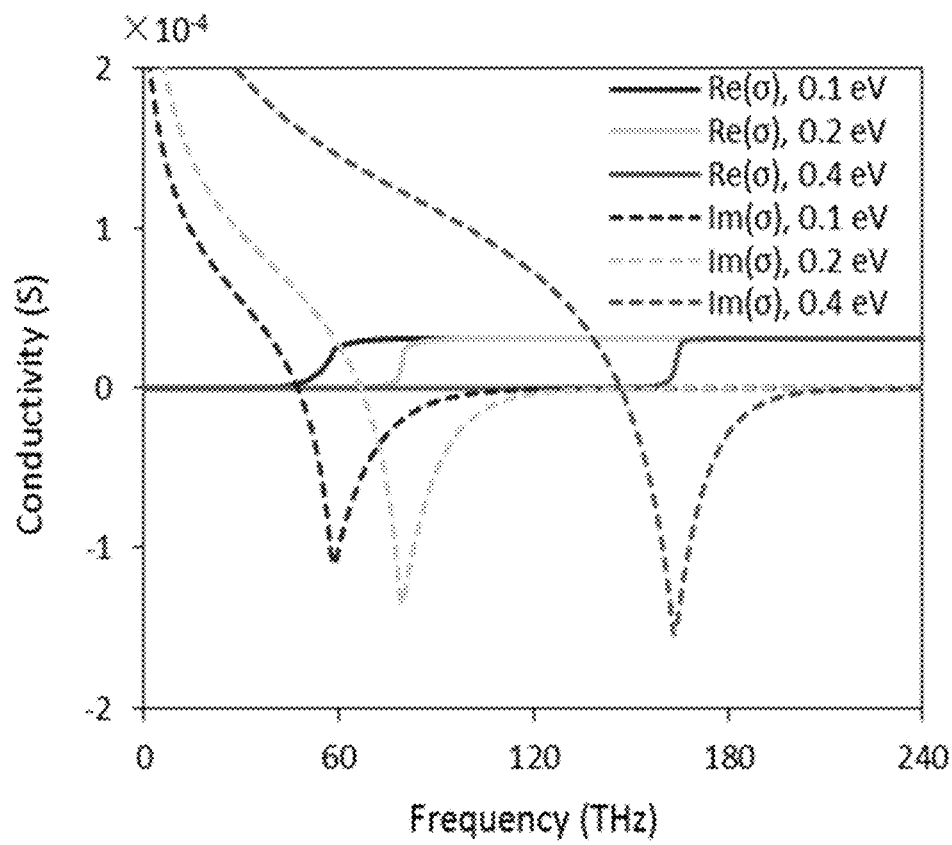
FIGS. 20A and 20B provide graphene conductivity and permittivity data results in accordance with embodiments, where 20A shows the calculated conductivity of graphene, with Fermi level 0.1 eV, 0.2 eV and 0.4 eV; and 20B shows the calculated permittivity of graphene, with Fermi level 0.1 eV, 0.2 eV and 0.4 eV, here the solid curves show the real parts, while dashed curves show the imaginary parts.
Figure 20B:
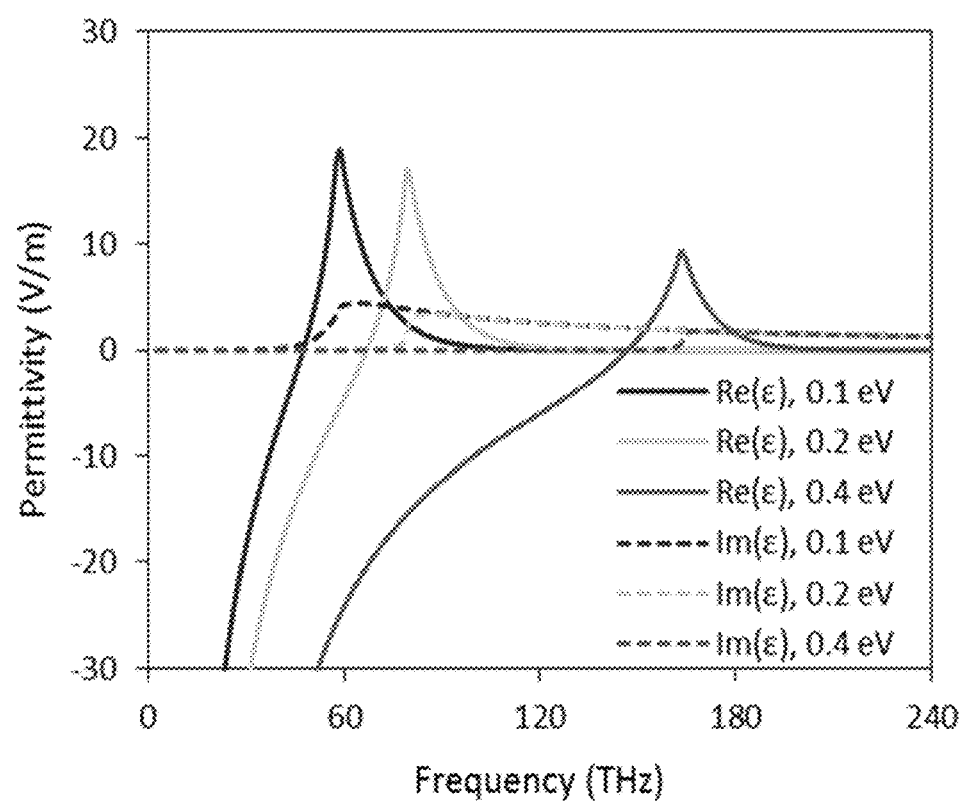

In above equations, μ is the chemical potential, $\tau \sim 10^{-13}$ s level is the relaxation delay, T is the temperature, $f_d(\epsilon)=\{\exp[(\epsilon-\mu)/k_BT]+1\}^{-1}$ is the Fermi-Dirac distribution, $\hbar=1.05\times 10^{-34}$ eV·s is the reduced Planck constant, $k_B=1.3806505\times 10^{-23}$ J/K is the Boltzmann's constant, and $e=-1.6\times 10^{-19}$C is the unit charge. When graphene is gated, $n_g$ is much higher than $n_p$ or $n_s$ (Eq. 7), corresponding to the $f_{sp}$ much smaller than $f_p$ or $f_s$. FIG. 20A and FIG. 20B calculate the conductivity and the permittivity of graphene, by using the Kubo formalism (Eq. 8-10). When $\sigma_{g,i}>0$, graphene can support SPPs.

When the plasmon frequency is lower than Landau damping regime, we get the momentum-frequency ($k_{SP}$-f) dispersion of graphene. Referring the boundary conditions, it could be approximately simplified as a quadratic function (EQ. 9-10).

$$k_{sp} = Af^2 \quad \text{(EQ. 19)}$$

$$A = \frac{(1+n_{sp}^2)\hbar\pi^2}{2\alpha c v_F} \quad \text{(EQ. 20)}$$

Figure 21A:
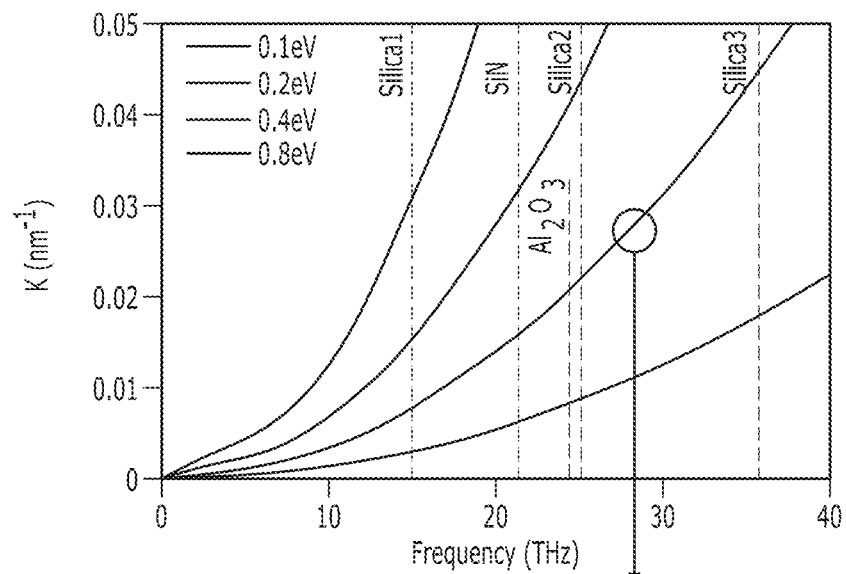
FIGS. 21A to 21C provide phase matching data in accordance with embodiments, where 21A provides graphene f-k dispersion, under Fermi level of 0.1 eV, 0.2 eV, 0.4 eV and 0.8 eV; 21B provides calculated $1/L_{SP}(k,f)$ of graphene with Fermi level 0.4 eV, based on RPA method; and 21C provides a $1/L_{SP}(k,f)$ map describing the plasmon-phonon couplings in the graphene based silicon nitride waveguide, where phonon frequencies are marked out by using dashed lines, and where in 21B and 21C the value of the $1/L_{SP}(k,f)$ is normalized to be 1.

Here α is the fine structure constant, $E_F$ is the Fermi level of graphene. Also referring the relationship of the $n_g$ and $E_F$, calculated $k_{SP}$-f curves of graphene with Fermi level ranging from 0.1 eV to 0.8 eV are shown in FIG. 21A. In FIG. 21A, grey lines show the phonon resonance locations of the $Si_3N_4$ and $SiO_2$. $f_{silica1}$=14.55 THz, $f_{silica2}$=24.18 THz, $f_{silica3}$=36.87 THz, $f_{siN}$=21.89 THz, $f_{Al2O3}$=22.4 THz (Eqs. 11-17)].

Furthermore, by using random phase approximation (RPA) method (Eqs. 15-18), it is possible to calculate the plasmon coupling based loss $L_{SP}(k,f)$ along the graphene based silicon nitride waveguide, with considering the phonon couplings.

$$L_{SP}(k,f) = -\text{Im}\left\{1 - \frac{e^2}{2k\epsilon_1}\prod_0(k,f) - \sum_j f_{ph,j}\prod_0(k,f)\right\} \quad \text{(EQ. 21)}$$

$$\prod_0(k,f) = -\frac{g_s}{4\pi^2}\sum_s \int \frac{f_d(\epsilon_s) - f_d(\epsilon_{sk})}{2\pi f\hbar + \frac{i\hbar}{\tau} + \epsilon_s - \epsilon_{sk}}dk F(s,k) \quad \text{(EQ. 22)}$$

Figure 21B:
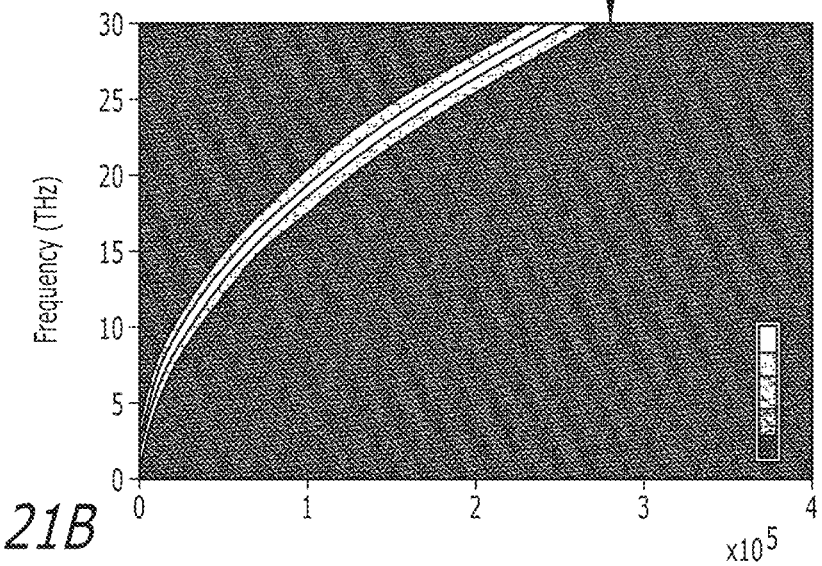
Figure 21C:
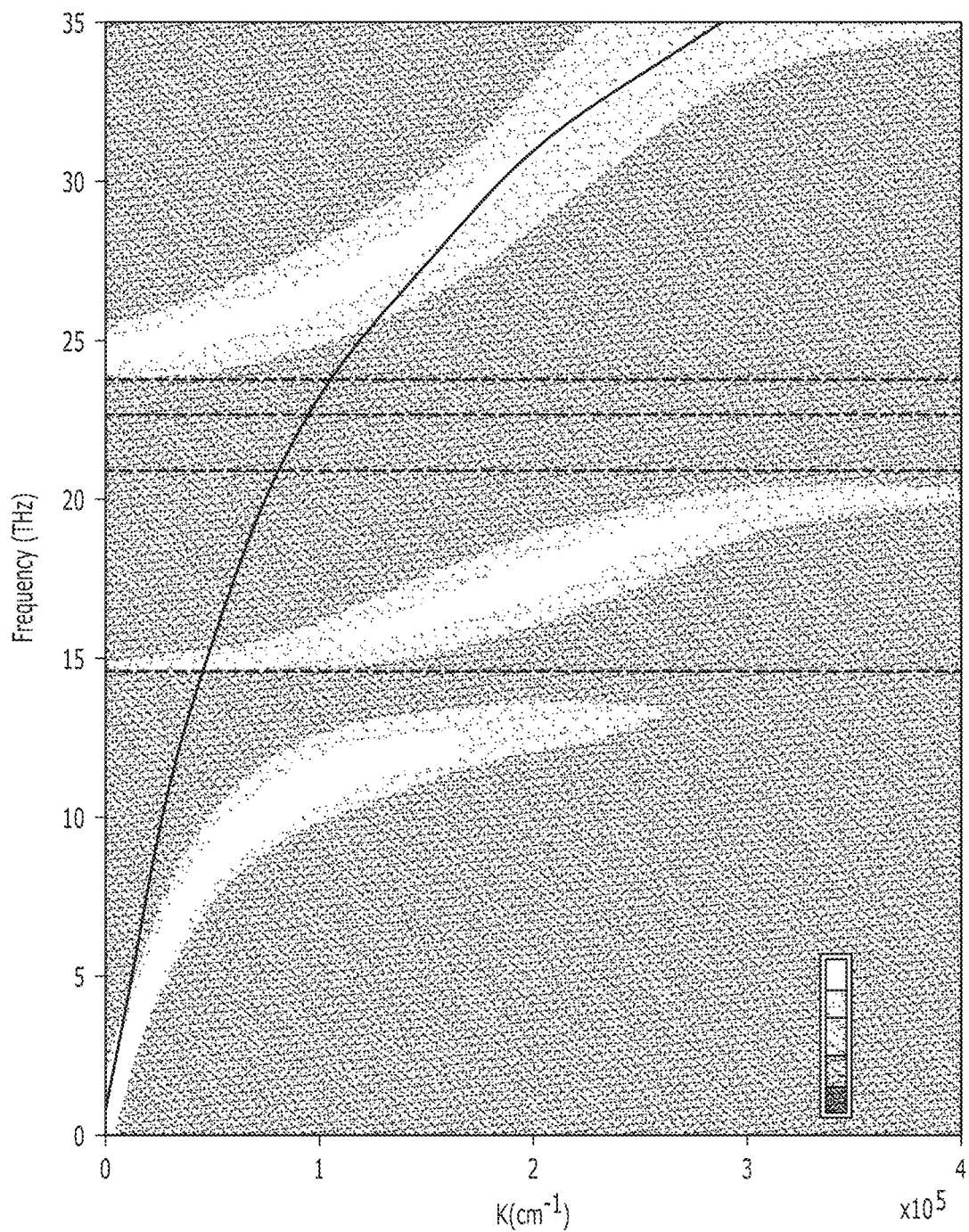

Here $f_{phj}$ is the phonon resonances, is$g_s$=4, $f_d(\epsilon)$ the Fermi-Dirac distribution, $\epsilon_s=sv_F$, $\epsilon_s k=sv_F k$, $s=\pm 1$, F(s,k) is the band overlap function of Dirac spectrum, which equals 1 for the waveguide geometry. FIG. 21B provides the simulated $1/L_{SP}(k,f)$ map of graphene, when the Fermi level is 0.4 eV, without considering the plasmon-phonon couplings. FIG. 21C shows the RPA map with considering the phonon couplings.

Plasmonic enhanced 2$^{nd}$ order nonlinearity and the THz frequency generation. Commonly, graphene is a centrosymmetric material with honeycomb structure, therefore, second-order nonlinear effects are forbidden by symmetry normally. However, when there is light transmitting along graphene, with a wave vector k parallel to the plane of the 2D layer, 2$^{nd}$ nonlinear coefficient xo could be a large number (Eq. 19-20). The $X^{(2)}$ in graphene could be written as:

$$\frac{\partial^2 \chi_{ijk}^{(2)}}{\partial k^2} = \frac{e^2}{4\pi^4 \hbar^2 f_p f_s} \quad \text{(EQ. 23)}$$

$$\left\{\left[\frac{f(k_1)-f(k_3)}{\omega_{31}-2\pi f_p - i\gamma} + \frac{f(k_1)-f(k_2)}{2\pi f_s - \omega_{21} - i\gamma}\right]\frac{\mu_{32}^i v_{31}^j v_{21}^k}{\omega_{32} - 2\pi f - i\gamma} - \right.$$
$$\left.\left[\frac{f(k_1)-f(k_3)}{\omega_{31}-2\pi f_p - i\gamma} + \frac{f(k_2)-f(k_3)}{2\pi f_s - \omega_{23} - i\gamma}\right]\frac{\mu_{21}^i v_{31}^j v_{32}^k}{\omega_{21}-2\pi f - i\gamma}\right\}$$

$$\mu_{ab} = \frac{iev_F}{\omega_{ab}}<a|\sigma_g|b>, \quad \text{(EQ. 24)}$$

$$v_{ab} = v_F <a|\sigma_g|b>, \quad \omega_{ab} = \frac{E(k_a) - E(k_b)}{\hbar}$$

Here f(k) is the occupation number state k, $k_1$, $k_1$ and $k_3$ satisfy $k_1+k_p=k_3$, $k_1+k_s=k_2$, σg is the 2D Pauli matrix vector. <a> and <b> are the states, γ is the scattering rate, $v_F=E_F/\hbar k$) is the Fermi velocity. By approximating $k_B T\to 0$, $2\pi f>>v_F k$, $f_p \approx f_s$, along the graphene, the 2$^{nd}$ nonlinear coefficient $X_{ijk}^{(2)}$ can be simplified as:

$$\chi_{eff}^{(2)} = \frac{e^3}{4\pi^2\hbar^2}\frac{1}{k\sqrt{f_s f_p}}\left[\frac{\pi}{2} + \arctan\left(\frac{2\pi\sqrt{f_s f_p} - 2v_F k_F}{\gamma}\right)\right] \quad \text{(EQ. 25)}$$

Figure 22A:
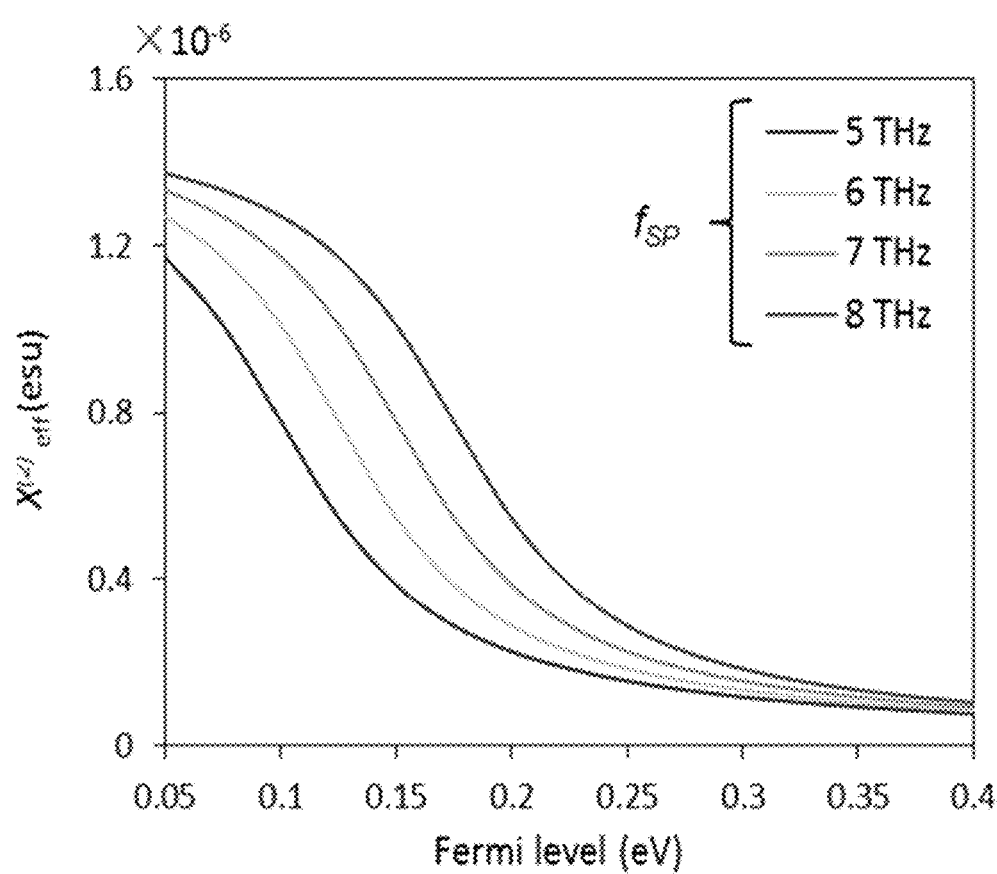
FIGS. 22A and 22B provide plots of $2^{nd}$ nonlinear coefficient and effective index of the SPPs in accordance with embodiments, where 22A provides calculated curves of the $x_{eff}^{(2)}$ when fixing $f_{SP}$~5 THz, 6 THz, 7 THz, and 8 THz; and 22B provides where $w_{core}$=1 µm, $h_{core}$=725 nm, to satisfy the phase matching, $n_{SP}$ relies to both $f_p$ and fs.

Here $k_F=(2m_e E_F)^{1/2}$ is the Fermi momentum. The simulated $X_{eff}^{(2)}$ is shown in FIG. 22A, a higher $E_F$ brings a lower $X_{eff}^{(2)}$. Here $f_p$ is fixed as 1.93 THz. Hence, the electric field intensity of the generated plasmon is written as:

$$E_{SP} = \frac{\chi_{eff}^{(2)} E_{p,y}\left(\frac{h_{core}}{2}\right) E_{s,y}\left(\frac{h_{core}}{2}\right)}{L_{SP}} \quad \text{(EQ. 26)}$$

Here $L_{SP}$ is shown in Eq. 19. Referring Eq. 5 and Eq. 6, here $E_{p,y}$, $E_{s,y}$ are the electric field of the pump and the signal, $z=ct/n_g$, $k_p=2\pi f_p n_{eff,p}/c$, $k_s=2\pi f_s n_{eff,s}/c$. The real part of Eq. 26 can be approximately simplified as:

$$E_{SP}(t) = \frac{1}{2}A_{SP}(t)\cos\left[2\pi\frac{(f_p n_p + f_s n_s)}{n_{SP}}t\right] + \quad \text{(EQ. 27)}$$
$$\frac{1}{2}A_{SP}(t)\cos\left[2\pi\frac{(f_p n_p + f_s n_s)}{n_{SP}}t\right]$$

$$A_{SP}(t) = \frac{A_p(t)A_s(t)\chi_{eff}^{(2)}}{L_{SP}}\exp(-n_{g,i}) \quad \text{(EQ. 28)}$$

$A_{SP}(t)$ determines the loss of the SP wave. Here $A_p(t)$ and $A_s(t)$ are the amplitude of the pump and the signal. In this equation, we get the frequency of the SPP $f_{SP}=(f_p n_p+f_s n_s)/n_{SP}$, and the frequency of beating $f_B=(f_p n_p+f_s n_s)/n_{SP}$. Referring the DFG energy balance $f_{SP}=f_p-f_s$, the effective in index of the plasmon $n_{SP}$ satisfies:

$$n_{SP} = \frac{f_p n_p + f_s n_s}{f_p - f_s} \quad \text{(EQ. 29)}$$

Figure 22B:
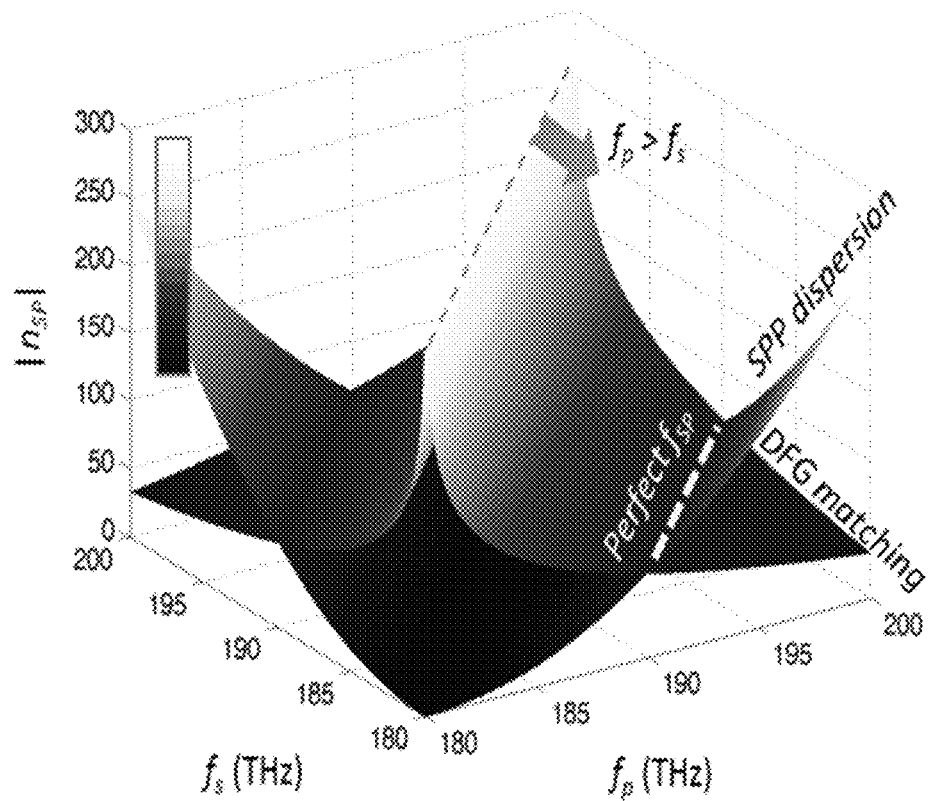

This equation corresponds to the Eq. 12 perfectly. For $f_p$ and $f_s$ located in 'C+L' band, with $f_{SP}$~8 THz, $n_{SP}$ satisfying the phase matching condition could be approximately calculated ~80. It also corresponds well to the previous researches. On the other hand, $n_{SP}$ is determined by the frequency $f_{SP}$ and Fermi level $E_F$ physically, referring Eq. 19. FIG. 22B maps the graphene dispersion $n_{SP}$ ($f_p$, $f_s$) at $E_F$=0.1 eV, and the DFG phase matching $n_{SP}$ from Eq. 29 together. This figure theoretically summarizes that the DFG based graphene plasmon generation is related to $E_F$, $f_p$, $f_s$ and waveguide structure synthetically.

Figure 23A:
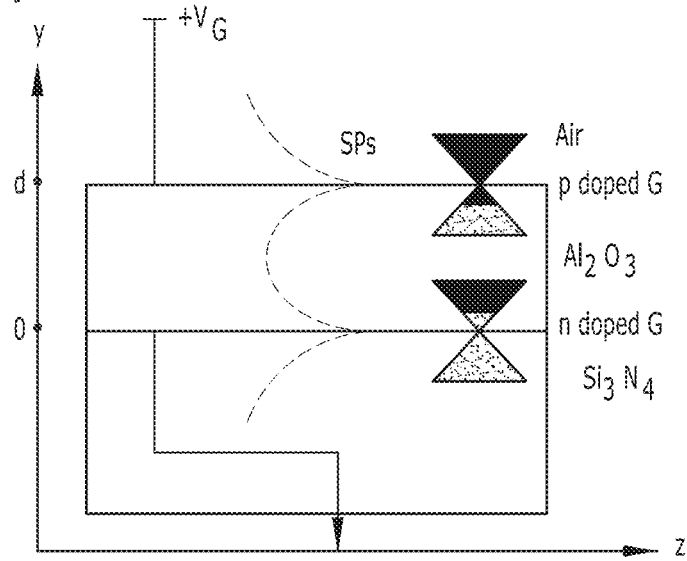
FIGS. 23A to 23F show data from an exemplary graphene-$Al_2O_3$-graphene system in accordance with embodiments, where 23A provides a schematic configuration; 23B provides a correlation of gate voltage and Fermi level; 23B provides simulated plasmon dispersions on the top and bottom graphene layer, when $V_G$=0 V, the two graphene layers have the same $E_F$ of ≈50 meV; 23D provides dispersions under different $V_G$, solid curves: bottom layer, dashed curves: top layer; 23E provides optical and acoustic plasmon modes; and 23F provides dispersions of coupled modes, which are further divided from the original ones, where the grey lines are the limit of the silica phonon coupling.

Double-layer graphene plasmon: coupling and gating. In previous sections, phase matching of DFG based on monolayer graphene was analyzed, without considering the possible plasmon coupling of the separated graphene layers in the grphene-$Al_2O_3$-graphene system. When the distance between the two graphene layers is small enough, the graphene-$Al_2O_3$-graphene could be regarded as a topological insulator like system in which plasmonic mode coupling might happen Eqs. 23-26. We schematically show the double layer graphene system in FIG. 23A. Here the thickness of $Al_2O_3$ is taken into consideration as d. Compared to single layer graphene, the situation in the gated graphene-$Al_2O_3$-graphene system could be regarded as a capacitor, when stable, the top layer graphene charges +Q, and the bottom layer graphene charges −Q. Assuming the size of the top layer graphene and the bottom layer graphene is the same as $S_g$, Fermi level of a monolayer graphene is written as:

$$E_F = \hbar |v_F| \sqrt{\pi n} \quad \text{(EQ. 30)}$$

Figure 23B:
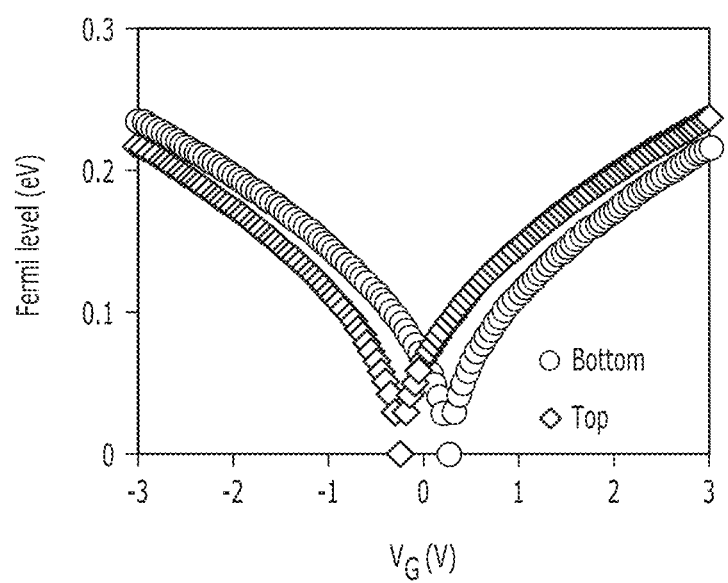
Figure 23C:
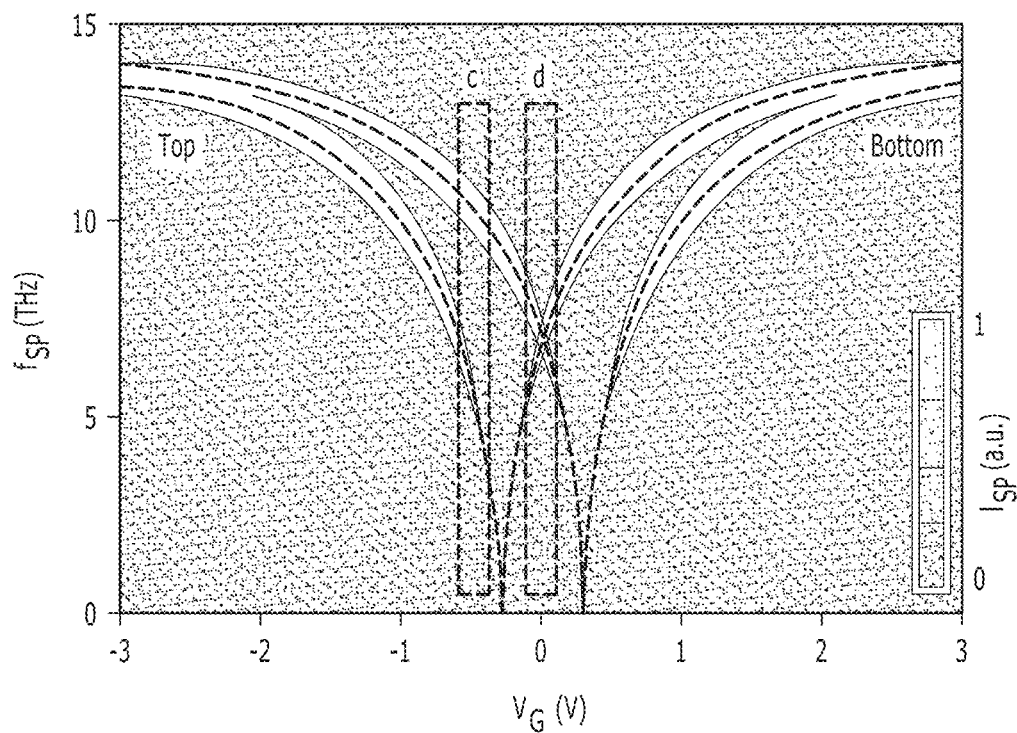
Figure 23D:
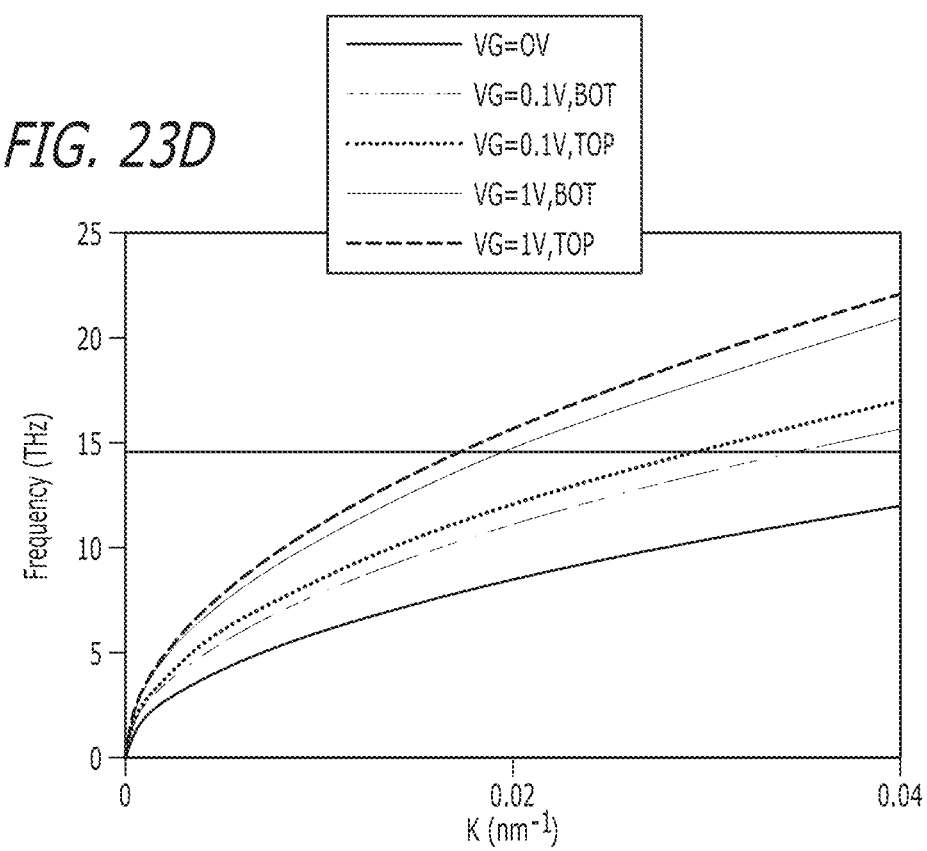

It is noted that the initial Fermi levels of the top and the bottom layer graphene would be different ($E_T$, $E_B$), once the graphene-Al$_2$O$_3$-graphene capacitor formed, the top layer graphene has more holes, while the bottom layer has more electrons, $n_{electron} = n_{hole} = Q/eS_g = C_G V_G/eS_g$. That means, the carrier densities of the top layer ($n_T$) graphene and the bottom layer graphene ($n_B$) would be different. Considering CVD graphene in air is p-doped initially [S24], $E_T > E_B$ when $V_G > 0$. Applying size of the two layer graphenes is $S_g = 80 \times 20$ μm$^2$, capacitance $C_G = 2 \times 10^{-7}$ F/cm$^2$, initial Fermi level $E_{T0} = E_{B0} = 0.05$ eV ($n_{hole\_0} \sim 2 \times 10^{11}$/cm$^2$) FIG. 20b calculates the '$V_G$-$E_F$' correlation. Since $E_F$ determines the dispersion of graphene plasmon, FIG. 23B predicts that two plasmons with different $f_{SP}$ could be generated simultaneously in the graphene-Al$_2$O$_3$-graphene system. Accordingly, FIG. 23C simulates the dispersions of the two-layer graphene. FIG. 23D simulates the dispersions of top/bottom graphene SPs, with reference to the initial one, $E_{T0} = E_{B0} = 0.05$ eV at $V_G = 0$ V, here h=30 nm (p-doped).

However, as FIG. 23D shows, when the distance d is small enough, the two independent plasmon modes would couple with each other to form two new modes, the optical plasmon (in phase) and the acoustic plasmon (out of phase). In the low-frequency regime, dispersion of the optical and acoustic plasmon could be written as:

$$f_{op} = \frac{1}{2\pi}\left[\frac{2e^2}{\epsilon}(E_{FT} + E_{FB})k\right]^{1/2} \quad \text{(EQ. 31)}$$

$$f_{ac} = \frac{1}{2\pi}\left[\frac{4e^2 E_{FT} E_{FB} d}{s(E_{FT} + E_{FB})}\right]^{1/2} k \quad \text{(EQ. 32)}$$

Figure 23E:
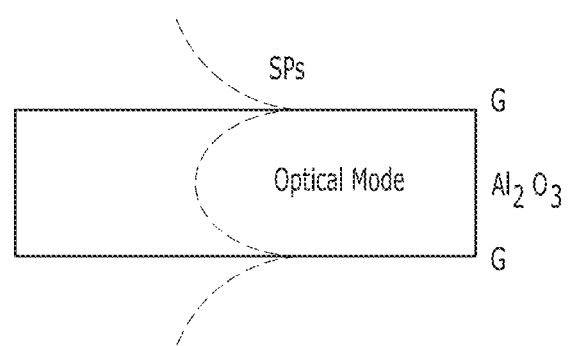
Figure 23E:
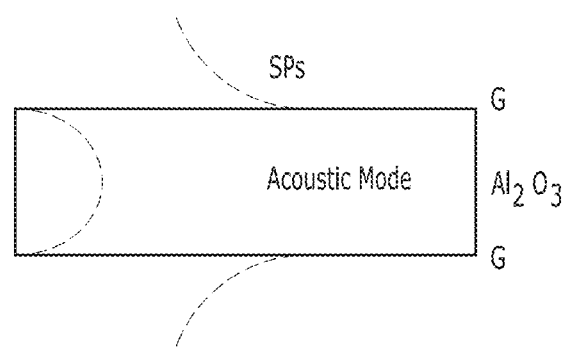
Figure 23F:
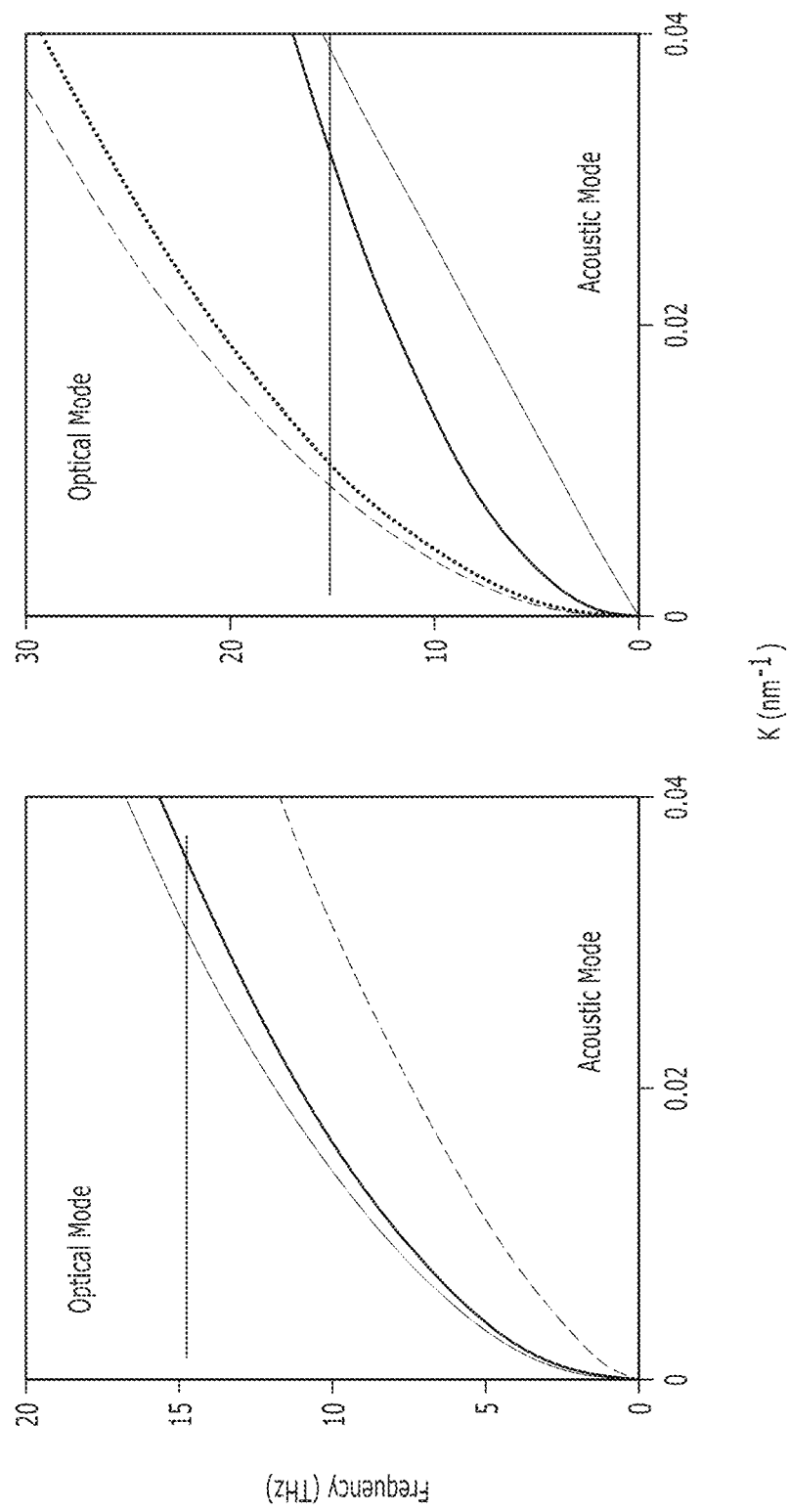

Here $\epsilon$ is the background permittivity. In FIGS. 23E and 23F, it is shown that the briefly calculated dispersions of $f_{op}(k)$ and $f_{ac}(k)$, regarding $e^2/\epsilon \sim 7 \times 10^5$ THz$^2$ nm·eV$^{-1}$, d=30 nm. Plasmon coupling would further divide the dispersion curves in THz region. Since there is a 14.55 THz SiO$_2$ phonon coupling, both $f_{op}(k)$ and $f_{ac}(k)$ would be lowered by 14.55 THz.

Difference of the DFG and the FWM. Graphene also has large X$^{(3)}$, which offers 3rd optical nonlinearity, e.g. four wave mixing (FWM). Hence, the enhancement of the signal might be caused by either FWM or DFG. Here analysis is shown theoretically to exclude the influence of FWM, in the pump-signal opposite launching configuration. In a typical degenerate FWM process, photonic energy transfers from pump to signal and idler, with energy and momentum matching. When the propagation directions of the pump and the signal are opposite, once FWM occurs:

$$2f_p = f_s + f_i \quad \text{(EQ. 33)}$$

$$2\vec{k}_p = -\vec{k}_s + \vec{k}_i \quad \text{(EQ. 34)}$$

Here, $f_p$, $f_s$ and $f_i$ are the frequencies of the pump, signal and idler, $k_p$, $k_s$ and $k_i$ are the momentums of the pump, signal and idler, $k = 2\pi f n_{eff}/c$. The dispersion could be written as:

$$2f_p(n_{eff,i} - n_{eff,p}) = f_s(n_{eff,i} + n_{eff,s}) \quad \text{(EQ. 35)}$$

Here $n_{eff,i}$, $n_{eff,p}$ and $n_{eff,s}$ are the effective indexes. To satisfy this equation when the frequency difference of $f_p$ and $f_s$ is smaller than 5 THz, $n_{eff,i}$ should be ~3 times larger than $n_{eff,p}$ or $n_{eff,s}$. However, for FWM generated media mode, its $n_{eff,i}$ cannot be larger than the index of the waveguide core. So, FWM cannot happen in the pump-signal opposite launching configuration in this case.

Doctrine of Equivalents

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A plasmon source comprising:
   a graphene based silicon nitride waveguide;
   at least one light source in optical communication with said waveguide;
   a gate electrode in conductive communication with the waveguide; and
   wherein the at least one light source is configured to emit at least a pump and a signal emission in opposite directions into the graphene based silicon nitride waveguide such that THz frequency graphene plasmons are excited within the waveguide via enhanced difference frequency generation and emitted therefrom.

2. The plasmon source of claim 1, wherein the THz frequency of the graphene plasmons are tunable via modulation by application of an external gate voltage through the gate electrode.

3. The plasmon source of claim 2, wherein a Fermi level of the gate electrode is maintained at around a Dirac point.

4. The plasmon source of claim 2, wherein further comprising a bandpass filter capable of configuring the plasmon source as a plasmon switcher.

5. The plasmon source of claim 1, wherein the waveguide comprises:
   a silicon nitride bus;
   a bottom graphene layer disposed atop the bus connecting a drain and a source electrode;
   an isolator/capacitance layer disposed atop the bottom graphene layer; and
   a top graphene layer disposed atop the isolator/capacitance layer connecting a gate electrode.

6. The plasmon source of claim 5, wherein a width of the silicon nitride bus is at least 1000 nm and the height is at least 725 nm.

7. The plasmon source of claim 5, wherein the silicon nitride is contained within an oxide material.

8. The plasmon source of claim 1, wherein an isolator/capacitance layer comprises alumina.

9. The plasmon source of claim 1, wherein the pump and signal emissions are polarized.

10. The plasmon source of claim 1, wherein the light source is a picosecond laser.

11. A plasmon source comprising:
    a graphene based silicon nitride waveguide comprising:
    a silicon nitride bus,
    a bottom graphene layer disposed atop the bus connecting a drain and a source electrode,
    an isolator/capacitance layer disposed atop the bottom graphene layer, and
    a top graphene layer disposed atop the isolator/capacitance layer;
    at least one light source in optical communication with said waveguide;

a gate electrode in conductive communication with the top graphene layer;

wherein the at least one light source is configured to emit at least a pump and a signal emission in opposite directions into the graphene based silicon nitride waveguide such that THz graphene plasmons are excited within the waveguide via enhanced difference frequency generation and emitted therefrom.

* * * * *